US012680246B2

(12) United States Patent
Dalhat et al.

(10) Patent No.: US 12,680,246 B2

(45) Date of Patent: Jul. 14, 2026

(54) TRAFFIC SIGN ADD-ON

(71) Applicant: Imam Abdulrahman Bin Faisal University, Dammam (SA)

(72) Inventors: Muhammad Abubakar Dalhat, Dammam (SA); Hassan Bassam, Dammam (SA); Naif Abdulkareem Aldalbahi, Dammam (SA); Abdulaziz Abdulkareem Aldalbahi, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 93 days.

(21) Appl. No.: 18/733,417

(22) Filed: Jun. 4, 2024

(65) Prior Publication Data

US 2025/0369200 A1 Dec. 4, 2025

(51) Int. Cl.

*E01F 9/615* (2016.01)
*G09F 13/16* (2006.01)

(52) U.S. Cl.

CPC .............. *E01F 9/617* (2016.02); *G09F 13/16* (2013.01)

(58) Field of Classification Search

CPC ............ E01F 9/617; E01F 9/615; G09F 13/16

USPC ............ 283/72, 74, 75, 94, 98, 101; 40/582, 40/584, 606.01, 606.03, 607.01, 607.05, 40/612, 618

See application file for complete search history.

(56) References Cited

U.S. PATENT DOCUMENTS

| | | | | |
|---|---|---|---|---|
| 8,915,045 | B2 | 12/2014 | Eaves et al. | |
| 9,881,526 | B2 | 1/2018 | Sakko | |
| 2020/0263374 | A1* | 8/2020 | Butterworth, III | E01F 9/688 |

FOREIGN PATENT DOCUMENTS

| | | | |
|---|---|---|---|
| CN | 201087327 | Y | 7/2008 |
| KR | 20-2010-0011399 | | 11/2010 |
| KR | 20-0455053 | | 8/2011 |
| KR | 200455053 | Y1 * | 8/2011 |
| KR | 10-2022-0141046 | | 10/2022 |

OTHER PUBLICATIONS

Reflector Posts & Reflective Strips for Sign Posts ; PEXCO ; Sep. 27, 2020 ; 3 Pages ; https://www.pexco.com/traffic/products/pedestrian-safety-products/sign-post-reflectors/.

Road Sign POLE ; VS Advertisers, Indiamart ; 5 Pages ; https://www.indiamart.com/proddetail/road-sign-pole-22489976273.html.

* cited by examiner

*Primary Examiner* — Justin V Lewis

(74) *Attorney, Agent, or Firm* — Oblon, McClelland, Maier & Neustadt, L.L.P.

(57) ABSTRACT

A traffic sign add-on includes a front layer made of a first fabric having one or more reflective sections and a back layer made of a second fabric having a slot extending along a long dimension of the back layer from a bottom end to a top end with a zipper in the slot. The zipper is capable of closing to seal the slot. The front layer and the back layer are connected along peripheral longitudinal edges and form a substantially flat form. Further, the front layer and the back layer are configured to accommodate a circumference of a pole of a traffic sign coaxially with the long dimension of the back layer and are substantially co-dimensional when the slot is sealed with the zipper.

17 Claims, 53 Drawing Sheets

500A

500B

600C

700

800C

800D

900B

900C

1400E

1500C

1500D

1500E

1600A

1600B

| | Completely stopped | Not stopping | slows down no vehicle | yield for vehicle |
|---|---|---|---|---|
| Jacket Only | 8 | 36 | 35.56 | 20.44 |
| Jacket-LED#1 | 6.19 | 25.77 | 45.36 | 22.68 |
| Jacket-LED#2 | 5.33 | 28 | 37.33 | 29.33 |
| No Jacket | 4.52 | 66.67 | 8.76 | 20.06 |

1700A

1700B

| | Completely stopped | Not stopping | Slows down no vehicle | Yield for vehicle |
|---|---|---|---|---|
| Jacket Only | 1.71 | 64.96 | 5.13 | 28.21 |
| Jacket-LED#1 | 6.38 | 59.57 | 8.51 | 25.53 |
| Jacket-LED#2 | 3.55 | 67.38 | 7.09 | 21.99 |
| No Jacket | 3.85 | 65.73 | 4.2 | 26.22 |

Jacket Only Jacket-LED#1 Jacket-LED#2 No Jacket

1800B

| | Completely stopped | Not stopping | slows down no vehicle | yield for vehicle |
|---|---|---|---|---|
| Jacket Only | 6.8 | 23.79 | 38.83 | 30.58 |
| Jacket-LED#1 | 7.02 | 26.32 | 38.6 | 28.07 |
| Jacket-LED#2 | 17.65 | 17.65 | 41.18 | 23.53 |
| No Jacket | 4.52 | 66.67 | 8.76 | 20.06 |

1900A

1900B

2000A

| | Completely stopped | Not stopping | slows down no vehicle | yield for vehicle |
|---|---|---|---|---|
| Jacket Only | 6.8 | 23.79 | 38.83 | 30.58 |
| Jacket-LED#1 | 7.02 | 26.32 | 38.6 | 28.07 |
| Jacket-LED#2 | 17.65 | 17.65 | 41.18 | 23.53 |
| No Jacket | 4.52 | 66.67 | 8.76 | 20.06 |

2000B

| | Completely stopped | Not stopping | slows down no vehicle | yield for vehicle |
|---|---|---|---|---|
| Jacket Only | 8 | 36 | 35.56 | 20.44 |
| Jacket-LED#1 | 6.19 | 25.77 | 45.36 | 22.68 |
| Jacket-LED#2 | 5.33 | 28 | 37.33 | 29.33 |
| No Jacket | 4.52 | 66.67 | 8.76 | 20.06 |

2100A

| | Completely stopped | Not stopping | slows down no vehicle | yield for vehicle |
|---|---|---|---|---|
| Jacket Only | 12.94 | 50.75 | 14.43 | 21.89 |
| Jacket-LED#1 | 3.3 | 64.84 | 7.69 | 24.18 |
| Jacket-LED#2 | 3.26 | 73.91 | 3.26 | 19.57 |
| No Jacket | 3.85 | 65.73 | 4.2 | 26.22 |

2100B

2200A

2200B

2400A

| | Day 0 (Instantly) | Day 1 (48 hr) | Day 2 (72 hr) | Day 7 (168 hr) |
|---|---|---|---|---|
| Completely stopped | 10.32 | 0.35 | 0.56 | 0 |
| Not stopping | 37.42 | 72.57 | 73.74 | 65.56 |
| Slows down no vehicle | 33.55 | 4.51 | 3.35 | 3.31 |
| Yield for vehicle | 18.71 | 22.57 | 22.35 | 31.13 |

2400B

TRAFFIC SIGN ADD-ON

STATEMENT REGARDING PRIOR DISCLOSURE BY THE INVENTORS

Aspects of the present disclosure are described in Dalhat, M. A. et al., "Design and Validation of Traffic Sign Add-on to Boost Compliance with Prohibitory Road Signs" published in a thesis for the Transportation and Traffic Engineering Department of the College of Engineering at Imam Abdulrahman Bin Faisal University, which is incorporated herein by reference in its entirety.

BACKGROUND

Technical Field

The present disclosure is directed to the field of road safety, particularly to an add-on device for traffic signs aimed at improving visibility and compliance.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Traffic accidents have long been recognized as a serious global issue, killing about 1.3 million people each year and incurring enormous economic and social losses throughout the world. There are about 700,000 police reports that vehicle accidents happen frequently at a stop sign, and about one-third of the accidents cause injuries with more than 3,000 being fatal. From 1996 to 2000 in four US states there were 1,788 accidents at intersections with two stop signs, 70% of which are violations of laws. Two-thirds of the drivers who caused accidents claimed they stopped before entering the intersection, and 17% claimed they did not stop. There are more than 1500 traffic accidents in Saudi Arabia every day. More than 40,000 people have been affected annually. Around 80% of these cases are related to speed (Traffic Violation Points In Saudi Arabia|Saudi Arabia|Arab Local, 2020). A study was conducted on 88 sites on the Gulf Cooperation Council Road and King Fahd Road, and the results showed there is a danger due to speed on some of these sites. The average speed for 85th percentile is 127.69 km/h. The rate of drivers exceeding the speed varies from one location to another, with the average rate exceeding 20% [Osman, S. A., Alluqmani, A. E., and Sindi, W. K., GIS Analysis and Evaluation of Speed Characteristics Causing Crash Accidents in Eastern Province, KSA, *Journal of Engineering and Computer Science,* 14, 2, 2022].

Road signs are any traffic control device that uses a phrase, symbol, and/or arrow legend to convey specific information to drivers (Manual on Uniform Traffic Control Devices, 2009). Road signs serve the purpose of informing drivers of rules, cautions, and instructions. The messages are sent through words, symbols, and arrows. Usually, signs are not utilized to confirm traffic complaints. Each standard sign must only be displayed for the designated purpose and for the selection of the specific signs to be used in a certain circumstance. Road condition or road limitation-related signs may be taken down when they no longer apply or the restrictions are lifted. The information on road signs can be used by drivers and other road users. They serve as a reminder of the rules put in place to safeguard safety and assist in delivering information to vehicles and pedestrians that can support the maintenance of order and a reduction in accident rates. A prohibitory sign informs drivers of the rules or laws governing traffic. Road signs may be used to alert drivers to traffic laws or rules and to indicate when and where the legislation is applicable; however, stop signs at intersections without speed bumps to enforce the driver to stop or limit speed have been found to be ineffective. This may increase the possibility of traffic accidents.

The Kingdom of Saudi Arabia (KSA) faces challenges in road safety. The high rate of serious and fatal accidents in KSA are due to non-compliance with prohibitory road signs. The fatality rate from road accidents is about 20 deaths per 100,000 population, as reported by the World Health Organization in 2021. This rate is notably higher than in many other countries, underscoring the urgent need for effective road safety interventions. A factor identified in the occurrence of these accidents is the non-compliance of drivers and pedestrians with road traffic controls. Approximately 43% of traffic accidents in KSA are because of non-compliance with road signs [Osman, S. A., Alluqmani, A. E., and Sindi, W. K., GIS Analysis and Evaluation of Speed Characteristics Causing Crash Accidents in Eastern Province, KSA, *Journal of Engineering and Computer Science,* 14, 2, 2022].

There is difficulty at night or in bad weather to see and identify road signs [Foomani, M., Alecsandru, C., and Awasthi, Safety Performance Assessment of Stop-Operated Intersection Equipped with Active Road Sign, 2015]. Two factors for violating road signs, especially stops sign, include: (i) a deliberate violation in which the driver does not obey the sign, and (ii) unintended violation due to lack of attention or lack of understanding of the road sign. Effort, such as use of light-emitting diodes (LEDs), has gone in to making road signs more visible to drivers. Flashing LEDs and LEDs with messages, such as "STOP," "LOOK BOTH WAYS," and the like, have also been implemented in an effort to increase vehicle stoppage.

Correlation between a believable speed restriction, risk perception, and driving speed supports that driving speed is influenced by dependability and risk perception. Based on assessments of the risk and plausibility of the speed limit, drivers' attitudes can be projected to evaluate the amount of compliance with the speed limit for particular road users. The drivers' attitude, which affects how they drive, is correlated to how they view the road, the surroundings along the roadside, and the posted speed limit.

Dynamic speed display signs (DSDS) have been shown to affect drivers' compliance with stated speed restrictions. Speed change with DSDS, upstream speed limit compliance, time of day, and day of the week all had an influence on speed compliance, in addition to DSDS. DSDS may be employed in high-risk areas where accidents are likely or safety is needed, such as work and school zones.

Full voluntary compliance with stop signs is steadily decreasing and is now practiced by less than 20 percent of road users [Mounce, J. M., Driver compliance with stop-sign control at low-volume intersection. *Transportation Research Record,* 1981, 808, 30-37]. This low compliance rate indicates a misapplication of traffic engineering principles.

There is a universal consensus on the direct impact of non-compliance with road traffic signs on traffic accident rate. Strategies, such as variable massage signs, dynamic speed display signs, LED with stop-signs, and the like, have been used to boost compliance with traffic signs. None of the current solutions are retrofittable and comprehensive.

Some further solutions have been developed to address related challenges. For instance, US Patent Reference No. U.S. Pat. No. 8,915,045B2 discloses a sleeve system for sign-posts. This reference presents a system comprising a sign-post and a sleeve with multiple flat panels forming a C-channel, with openings for fasteners and retroreflective materials for visibility; however, this reference does not integrate a traffic sign add-on with a front layer made from a reflective fabric, back layer with a zipper for easy installation, and LED lighting for enhanced visibility.

KR Patent Reference No. 200455053Y1 pertains to a replaceable rod case. This reference provides that the retro-reflective sheet is rolled to form a cylindrical shape with incision lines and a locking mechanism, designed for visibility enhancement; however, this reference does not integrate a traffic sign add-on with a front layer made from a reflective fabric, back layer with a zipper for easy installation, and LED lighting for enhanced visibility.

Each of the aforementioned references suffers from one or more drawbacks hindering their adoption. Accordingly, an object of the present invention to provide a cost-effective supplementary intervention to improve compliance with road signs that addresses the shortcomings of existing techniques by enhancing driver attention. The present invention provides a solution that emphasizes and makes road signs more visible to drivers to overcome shortcomings of the existing technologies.

SUMMARY

In an embodiment, a traffic sign add-on is provided. The traffic sign add-on comprises a front layer. Herein, the front layer is made of a first fabric. Further, herein, the first fabric has one or more reflective sections. The traffic sign add-on further comprises a back layer. Herein, the back layer is made of a second fabric. Further, herein, the back layer has a slot extending along a long dimension of the back layer from a bottom end to a top end wherein a zipper is disposed in the slot. The zipper is capable of closing to seal the slot. The front layer and the back layer are connected along peripheral longitudinal edges and form a substantially flat form. Further, the front layer and the back layer are configured to accommodate a circumference of a pole of a traffic sign coaxially with the long dimension of the back layer. Herein, peripheral latitudinal edges at the bottom end and the top end of the front layer and back layer are at least partially unconnected. Further, the front layer and the back layer are substantially co-dimensional when the slot is sealed with the zipper.

In some embodiments, the front layer has a fabric lining made of a third fabric and the third fabric has a same length and a same width of that of the front layer.

In some embodiments, the fabric lining is located between the first fabric and the second fabric.

In some embodiments, the fabric lining is attached to the front layer with stitches.

In some embodiments, the third fabric is the first fabric without the one or more reflective sections.

In some embodiments, the first fabric comprises a first material and a second material. Herein, the second material is configured in a rectangular form and is located in a middle of a front face of the first material.

In some embodiments, the second material extends along a long dimension of the first material from a bottom end to a top end.

In some embodiments, the one or more reflective sections are in accordance with EN ISO 20471.

In some embodiments, the front layer and the back layer are separated by one or more add-on structures which are located perpendicular to the pole of the traffic sign.

In some embodiments, the one or more add-on structures are cube-shaped and located at a top end and bottom end of the pole of the traffic sign.

In some embodiments, the front layer and the back layer are connected along the peripheral longitudinal edges and to the one or more add-on structures to form a rectangular shape.

In some embodiments, the front layer of the first fabric comprises at least four pieces of the first fabric. Herein, the back layer comprises at least two pieces of the second fabric. Further, a first piece of the at least two pieces of the second fabric is attached to a second piece of the at least two pieces of the second fabric by the zipper. Further, the at least two pieces of the second fabric are attached to one or more of the at least four pieces of the first fabric.

In some embodiments, the at least two pieces of the second fabric are attached to one or more of the at least four pieces of the first fabric by a hook and loop fastener along one or more edges.

In some embodiments, the traffic sign add-on further comprises one or more light-emitting diodes. Herein, the front layer and the back layer have a hook and loop fastener along one or more edges. The one or more light-emitting diodes are attached to the hook and loop fastener. The one or more light-emitting diodes protrude from the hook and loop fastener to an outside of the traffic sign add-on.

In some embodiments, the traffic sign add-on includes a photovoltaic panel attached to the light-emitting diodes.

In some embodiments, the back layer is covered with a flexible photovoltaic cell on an outer surface and a flexible battery on an inner surface. Herein, the flexible photovoltaic cell charges the flexible battery. The flexible battery provides power for the one or more light-emitting diodes.

In another embodiment, a method of traffic accident reduction is provided. The method comprises placing the traffic sign add-on on the pole of the traffic sign. Herein, the front layer is an outermost layer and facing an outside of the pole. Further, herein, the traffic sign is a speed limit sign or a stop sign. The method further comprises illuminating the light-emitting diodes.

In some embodiments, the light-emitting diodes are continuously illuminated.

In some embodiments, the traffic sign add-on extends at least 90% the length of the pole of the traffic sign.

In some embodiments, a constriction device is located at a top end of the front layer and the back layer and a bottom end of the front layer and the back layer. Herein, the constriction device holds the traffic sign add-on in place.

These and other aspects of the non-limiting embodiments of the present disclosure will become apparent to those skilled in the art upon review of the following description of specific non-limiting embodiments of the disclosure in conjunction with the accompanying drawings. The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of embodiments of the present disclosure (including alternatives and/or variations thereof) and many of the attendant advantages thereof will be readily obtained as the same becomes better understood by reference to the following detailed description when considered in connection with the accompanying drawings, wherein.

DETAILED DESCRIPTION

Figure 1A:
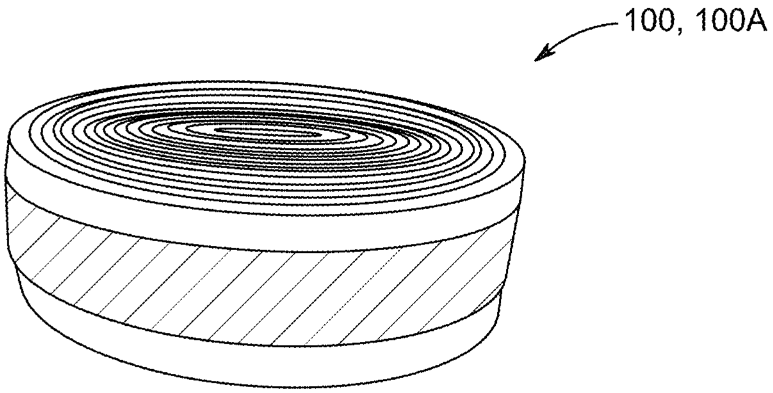
FIG. 1A is an exemplary diagrammatic view of reflective strip material of a traffic sign add-on, adapted as a green jacket, according to certain embodiments.

In the following description, it is understood that other embodiments may be utilized, and structural and operational changes may be made without departure from the scope of the present embodiments disclosed herein.

Reference will now be made to specific embodiments or features, examples of which are illustrated in the accompanying drawings. In the drawings, whenever possible, corresponding or like reference numerals will be used to designate identical or corresponding parts throughout the several views. Moreover, references to various elements described herein are made collectively or individually when there may be more than one element of the same type. However, such references are merely exemplary in nature. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an," and the like generally carry a meaning of "one or more," unless stated otherwise.

Furthermore, the terms "approximately," "approximate", "about," and similar terms generally refer to ranges that include the identified value within a margin of 20%, 10%, or preferably 5%, and any values therebetween.

Aspects of this disclosure are directed to a traffic sign add-on for traffic signs that enhances driver attention and compliance. The traffic sign add-on of the present disclosure aims to provide a simple, cost-effective design that aligns with specifications outlined in the Manual on Uniform Traffic Control Devices (MUTCD, Section 2A). The traffic sign add-on is implemented to increase the rate of compliance with road signs, improving the impact of these signs on driver visibility and, overall, enhance road safety with a straightforward and economical device. The traffic sign add-on is designed to be simple and economical to produce while adhering to the MUTCD recommendations.

Figure 1B:
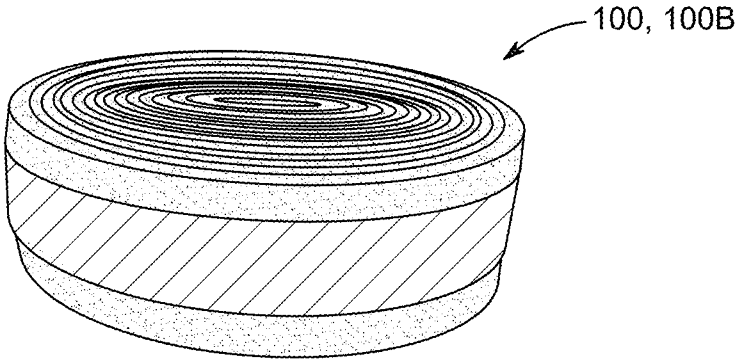
FIG. 1B is an exemplary diagrammatic view of reflective strip material of the traffic sign add-on, adapted as an orange jacket, according to certain embodiments.

Referring to FIGS. 1A and 1B in conjunction, illustrated are diagrammatic views of a traffic sign add-on (as represented by reference numeral 100, in general), as per embodiments of the present disclosure. Specifically, herein, the traffic sign add-on 100 is represented as a traffic sign add-on 100A (as shown in FIG. 1A) and a traffic sign add-on 100B (as shown in FIG. 1B), representing two distinct embodiments of the present disclosure. The traffic sign add-on 100 is designed to enhance the visibility of traffic signs. The traffic sign add-on 100 is configured to function as a supplementary device that wraps around a pole of a traffic sign (as depicted and discussed later in reference to FIGS. 3A and 3B) to increase its noticeability, especially in low-light conditions or from a distance. This way, the traffic sign add-on 100 aims to improve driver compliance with traffic control devices, thereby potentially reducing the rate of traffic incidents. In the illustrations of FIGS. 1A and 1B, the traffic sign add-on 100, or each of the traffic sign add-ons 100A and 100B, is depicted in the form of a roll. This configuration illustrates flexibility and ease of storage and transport for the traffic sign add-on 100, and further demonstrates the ease with which the traffic sign add-on 100 can be handled and installed in the field. When unrolled and applied to a traffic sign, the traffic sign add-on 100 serves as high-visibility jacket catering to different situational requirements for traffic sign visibility.

According to embodiments of the present disclosure, the traffic sign add-ons 100A and 100B are distinguished primarily by their color schemes. In the present illustrations, the traffic sign add-on 100A is a green jacket (illustrated with no hatch pattern) and the traffic sign add-on 100B is an orange jacket (illustrated with a hatch pattern, for distinction). These color variations are not aesthetic choices but are strategically selected for their high visibility and psychological impact on drivers. Both the traffic sign add-ons 100A and 100B, while differing in color, maintain the core functional attributes of the present disclosure, ensuring enhanced visibility and compliance with traffic signs. This color-based differentiation allows for the adaptability of the traffic sign add-ons 100A and 100B in various traffic scenarios, making it a solution for road safety enhancement. It may be appreciated that although the present disclosure provides the traffic sign add-ons 100A and 100B as the green jacket and the orange jacket, respectively, the scope of the present disclosure is not limited to these colors. The selection of colors for the traffic sign add-ons 100A and 100B can be varied based on requirements, traffic regulations, environmental considerations, and the like. The present disclosure contemplates the use of any suitable color that serves the purpose of enhancing visibility and compliance with traffic signs, allowing for customization and adaptability to situational needs and/or regulatory standards.

Referring to FIGS. 2A-2E, in combination, the design details of the traffic sign add-on 100 are provided. In the design of the traffic sign add-on 100, materials have been chosen aiming to find reasonable cost and good performance. As better illustrated in FIG. 2A, the traffic sign add-on 100 includes a front layer 110. The front layer 110 has a bottom end 110*a* and a top end 110*b*. The front layer 110 extends along peripheral longitudinal edges with a length 'L' (along a long dimension) and peripheral latitudinal edges with a width 'X' (along a short dimension). In an exemplary configuration, the length 'L' of the front layer 110 is 200 to 300 cm, preferably 210 to 280 cm, preferably 220 to 260 cm, more preferably 230 to 250 cm, and yet more preferably about 240 cm and the width 'X' of the front layer 110 is 10 to 30 cm, preferably 13 to 27 cm, preferably 15 to 25 cm, more preferably 16 to 20 cm, and yet more preferably about 18.2 cm. The front layer 110 is made of a first fabric (as represented by reference numeral 112). In the present configuration, the first fabric 112 is in the form of a rectangular strip, which may be a colored material (orange or green, as discussed above). In an example, the first fabric 112 is a standard road safety reflective strips usually employed for safety wears.

Herein, the first fabric 112 includes a first material (as represented by reference numeral 114) and a second material (as represented by reference numeral 116). As shown herein, the second material 116 is configured in a rectangular form and is located in a middle of a front face of the first material 114. Further, the second material 116 extends along the long dimension of the first material 114 from the bottom end 110*a* to the top end 110*b*. In the traffic sign add-on 100, the first fabric 112 has one or more reflective sections 118 made of a reflective material. In the present configuration, the reflective sections 118 are formed by the second material 116 itself (with the two elements being shown and labelled together in the illustrations). In other words, the second material 116 may constitute the reflective material and form the reflective sections 118 in the first fabric 112, to be part of the front layer 110 in the traffic sign add-on 100. In an embodiment, the one or more reflective sections 118 are in accordance with EN ISO 20471 (20471, 2013). As used herein, the "EN ISO 20471:2013" is an international standard that specifies the requirements for high-visibility clothing (Hi-Vis) used by workers in high-risk environments. The standard aims to improve the wearer's visibility in various lighting conditions, including daylight, dusk, dawn, and nighttime, thereby reducing the risk of accidents involving vehicles or machinery.

Figure 2A:
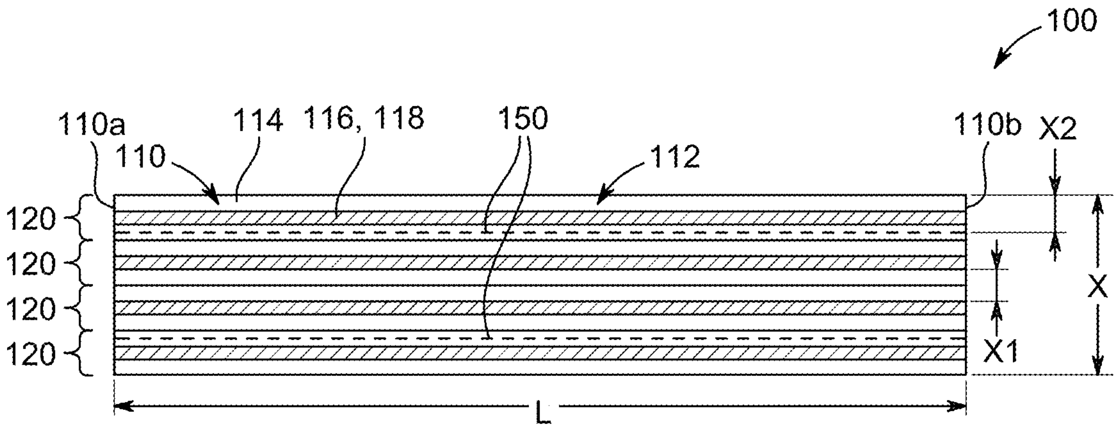
FIG. 2A is an exemplary planar view of a front layer of the traffic sign add-on, according to certain embodiments.

In the present embodiments, as illustrated in FIG. 2A, the front layer 110 of the first fabric 112 includes at least four pieces (each represented by reference numeral 120) of the first fabric 112. That is, the front layer 110 is constructed from four pieces 120 in the form of individual strips of the first fabric 112, arranged parallel to one another. The four pieces 120 are integral to the design of the traffic sign add-on 100, collectively achieving a minimum width of 1 to 10 cm, preferably 2 to 8 cm, preferably 3 to 7 cm, more preferably 4 to 6 cm, and yet more preferably about 5 cm along the short dimension of the front layer 110, as recommended by EN ISO 20471 standards. In some embodiments, the first fabric 112 may include 1 to 10 pieces 120, preferably 2 to 8 pieces 120, more preferably 3 to 5 pieces 120, and yet more preferably at least 4 pieces 120. The width of the front layer 110 of the first fabric 112 maintains sufficient reflectivity to alert and inform drivers both during the day and at night. The overall width of the traffic sign add-on 100, after accounting for the overlaps and seams, will depend on the width of the overlap and the construction method used. Herein, each of the four pieces 120 of the first fabric 112 is attached with an overlap of 1 to 10 mm, preferably 2 to 6 mm, and more preferably about 3 to 4 mm, ensuring that no gap exists between them. This overlap is secured using a double stitch line, providing both strength and a continuous reflective surface essential for visibility. Care is taken to space the needle punctures appropriately during stitching, preventing any undesirable gathering of the fabric at the seams, which could compromise the flatness and uniformity of the reflective surface. The spacing between two of the four pieces 120, denoted by 'X1', which is 0.5 to 5 cm, preferably 1 to 4 cm, more preferably 2 to 3 cm, and yet more preferably about 2.5 cm, is set to ensure that the non-reflective sections contribute to daytime visibility. This balanced design allows for clear day visibility while also catering to heightened reflection at night.

Figure 2B:
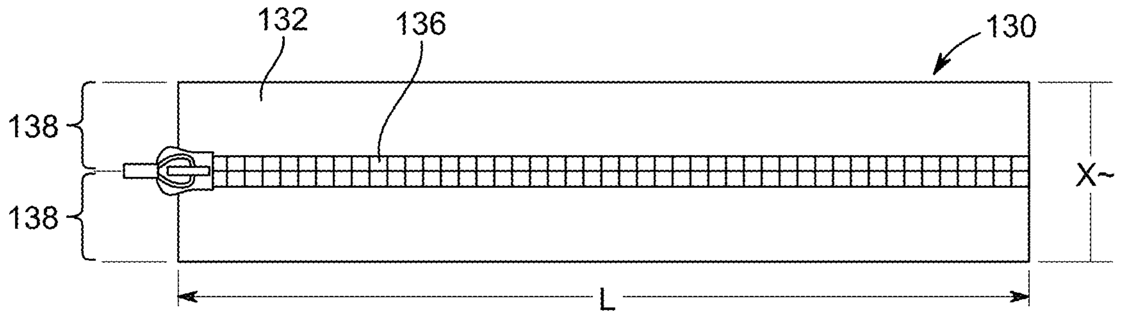
FIG. 2B is an exemplary planar view of a back layer of the traffic sign add-on, according to certain embodiments.

The traffic sign add-on 100 also includes a back layer 130 (as illustrated in FIG. 2B). Herein, the back layer 130 is made of a second fabric (as represented by reference numeral 132). Specifically, the back layer 130 of the traffic sign add-on 100 is formed of the second fabric 132 that complements functionality of the front layer 110. As shown, the back layer 130 also extends between a bottom end and a top end (the same as the bottom end 110*a* and the top end 110*b* of the front layer 110 and referred by same reference numerals hereinafter). Further, the back layer 130 has a same length 'L' along the long dimension, and a width 'X~' of 10 to 30 cm, preferably 13 to 27 cm, preferably 15 to 25 cm, more preferably 16 to 20 cm, and yet more preferably about 17.2 cm along the short dimension (which is shorter than the width 'X' of the front layer 110). The second fabric 132 is chosen for its stretchable properties, allowing the traffic sign add-on 100 to conform snugly to circumference of poles of various types of traffic signs. The elasticity of the back layer 130 ensures a tight fit to secure the traffic sign add-on 100 in place and preventing it from flapping or becoming a distraction to drivers. Moreover, the second fabric 132 may be selected in a color that blends with the environment or the traffic sign itself, such as gray, ash, and the like. This choice in color aims to render the backside of the traffic sign add-on 100 inconspicuous from the perspective of oncoming traffic from the opposite direction. The subtlety of the back layer 130 ensures that the traffic sign add-on 100 does not detract from the message of the traffic sign or create visual noise that could lead to driver confusion. Such functional design of the back layer 130 is focused on utility and efficiency, providing a reliable and unobtrusive means of enhancing the visibility of the traffic signs.

Figure 2C:
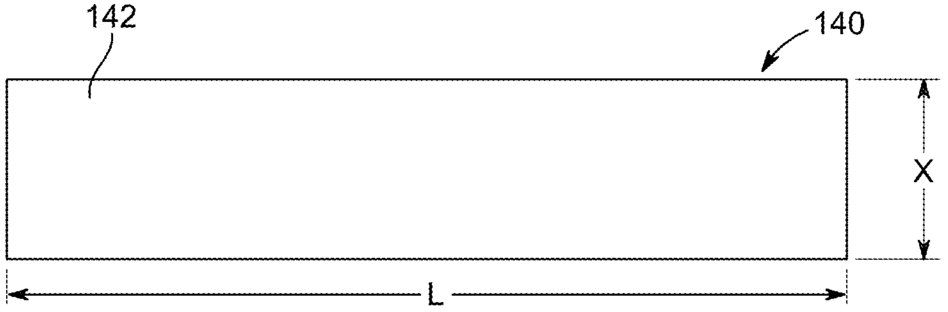
FIG. 2C is an exemplary planar view of a fabric lining of the traffic sign add-on, according to certain embodiments.

Further, the front layer 110 has a fabric lining 140 made of a third fabric (as illustrated in FIG. 2C and represented by reference numeral 142). Herein, the front layer 110 of the traffic sign add-on 100 is reinforced with the fabric lining 140. The fabric lining 140 is a single cut material without the need for lapping or joints unless there is a material shortage. The third fabric 142 has a same length 'L' and a same width 'X' of that of the front layer 110. The fabric lining 140 is located between the first fabric 112 and the second fabric 132. Positioned between the first fabric 112 of the front layer 110 and the second fabric 132 of the back layer 130, the fabric lining 140 contributes an additional layer of strength and stability to the traffic sign add-on 100. In an example embodiment, the fabric lining 140 is attached to the front layer 110 with stitches. That is, the fabric lining 140 is securely attached to the front layer 110 through a series of stitches, which not only binds these two layers together but also maintains the flatness and structural consistency for optimal performance. Herein, the third fabric 142 is the first fabric 112 without the one or more reflective sections 118. That is, the third fabric 142 is essentially the same as the first fabric 112 but omits the reflective sections 118, supporting that the entire assembly maintains uniformity in terms of texture and material behavior, while also contributing to the overall durability of the traffic sign add-on 100. In particular, the third fabric 142 under the front layer 110 is of same color as the first fabric 112 in the front layer 110 to maintain color; otherwise, the color of the first fabric 112 will be diluted by the underlying third fabric 142, be it the color of the signage support, the color of the second fabric 132, or any material of different color under it. This layering and stitching technique ensures that the traffic sign add-on 100 remains robust against environmental stresses while continuing to provide high visibility.

Further, in the traffic sign add-on 100, the front layer 110 and the back layer 130 are connected along peripheral longitudinal edges and form a substantially flat form. This interconnection of the front layer 110 and the back layer 130 of the traffic sign add-on 100 forms a cohesive and unified structure. The flatness ensures the traffic sign add-on 100 does not interfere with the legibility of the traffic sign or its structural integrity when mounted. The seamless connection also contributes to the profile of the traffic sign, reducing wind resistance and noise, which might otherwise be caused by any loose or flapping materials. Referring to FIG. 2B in combination with FIG. 2D, the back layer 130 has a slot 134 extending along the long dimension of the back layer 130 from the bottom end 110*a* to the top end 110*b*. That is, the slot 134 runs the entire length of the back layer 130. Herein, a zipper 136 is disposed in the slot 134. The zipper 136 is capable of closing to seal the slot 134. The front layer 110 and the back layer 130 are substantially co-dimensional when the slot 134 is sealed with the zipper 136. In other words, when the zipper 136 is closed, it ensures that the front layer 110 and the back layer 130 become substantially co-dimensional, further contributing to the aerodynamic and snug fit of the traffic sign add-on 100 on the traffic sign. The design, featuring the zipper 136, allows for quick and easy adjustments to be made on-site, facilitating adaptability of the traffic sign add-on 100 to a pole of the traffic sign of varying circumferences. Therefore, the zipper 136 serves a dual purpose of allowing ease of installation and securely sealing the traffic sign add-on 100 around the pole of the traffic sign, and the like.

Figure 2D:
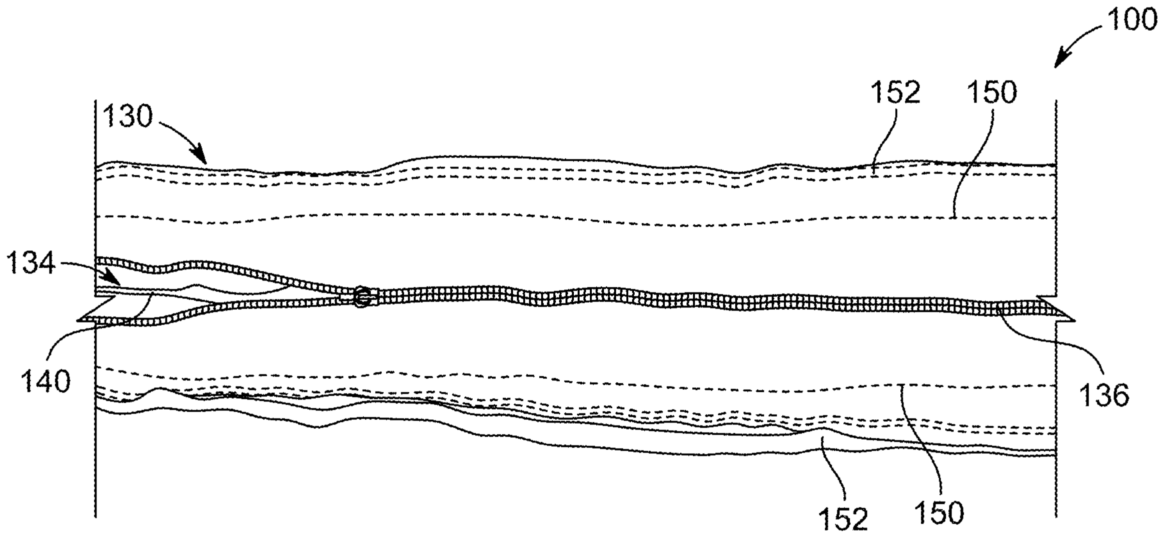
FIG. 2D is an exemplary diagrammatic view of the back layer of the traffic sign add-on with a zipper thereof in a partially opened state, according to certain embodiments.

As discussed, the front layer 110 of the first fabric 112 includes at least four pieces 120 of the first fabric 112. Also, as illustrated in FIGS. 2B and 2D, the back layer 130 includes at least two pieces (each represented by reference numeral 138) of the second fabric 132. That is, the back layer 130 of the traffic sign add-on 100 is constructed from the at least two pieces 138 of the second fabric 132. This design allows the back layer 130 to wrap around and conform to the contours of various signpost dimensions. The flexibility afforded by having separate pieces 138 contributes to the adaptability of the traffic sign add-on 100 to fit tightly on poles of differing circumferences and shapes. As shown, a first piece of the at least two pieces 138 of the second fabric 132 is attached to a second piece of the at least two pieces 138 of the second fabric 132 by the zipper 136. That is, the individual pieces 138 of the second fabric 132 are connected in a functional and accessible manner via the zipper 136. The zipper 136 acts as the joining mechanism between the first and second pieces 138 of the second fabric 132, providing a secure closure that maintains the integrity and tautness of the traffic sign add-on 100 once installed.

Further, the at least two pieces 138 of the second fabric 132 are attached to one or more of the at least four pieces 120 of the first fabric 112. In particular, the at least two pieces 138 of the second fabric 132 may be attached to top-most and bottom-most of the at least four pieces 120 of the first fabric 112 at the bottom end 110*a* and the top end 110*b*. As shown in FIGS. 2A and 2D, the at least two pieces 138 of the second fabric 132 are attached to one or more of the at least four pieces 120 of the first fabric 112 by stitches 150 which are located at a distance 'X2', which is 1 to 6 cm, preferably 2 to 5 cm, more preferably 3 to 4 cm, and yet more preferably about 3.75 cm, from the peripheral longitudinal edges of the front layer 110 and the back layer 130. In an example of the present embodiment, a distance given by '2X-4X2' should be less than a perimeter of the signage support for the traffic sign add-on 100 to cling tight on to it. Further, in the present embodiments, the at least two pieces 138 of the second fabric 132 are attached to one or more of the at least four pieces 120 of the first fabric 112 by a hook and loop fastener (generally represented by reference numeral 152 in FIG. 2D) along one or more edges, specifically the peripheral longitudinal edges 'L' of the front layer 110 and the back layer 130. That is, in addition to being coupled together by the stitches 150 (generally, at respective middles of the at least two pieces 138), the front layer 110 and the back layer 130 are also joined together by the hook and loop fastener 152, such as a Velcro strap and any other hook and loop fastener known in the art. This may be made possible due to shorter width 'X~' of the back layer 130 as compared to the width 'X' of the front layer 110. This fastening arrangement provides stability and ensures that the front layer 110 and the back layer 130 remain securely joined along their entire length, yet providing a flexible connection, contributing to overall structural integrity and durability of the traffic sign add-on 100. In some embodiments, the peripheral latitudinal edges at the bottom end 110*a* and the top end 110*b* of the front layer 110 and the back layer 130 are at least partially connected. In some embodiments, the bottom end 110*a* and the top end 110*b* of the front layer 110 and the back layer 130 may be connected by stiches, holes and buttons, hook and loop fasteners, and the like. In some embodiments, the bottom end 110*a* and the top end 110*b* of the front layer 110 and the back layer 130 may be connected to each other from the peripheral longitudinal edges to the distance 'X2' and the like.

Figure 2E:
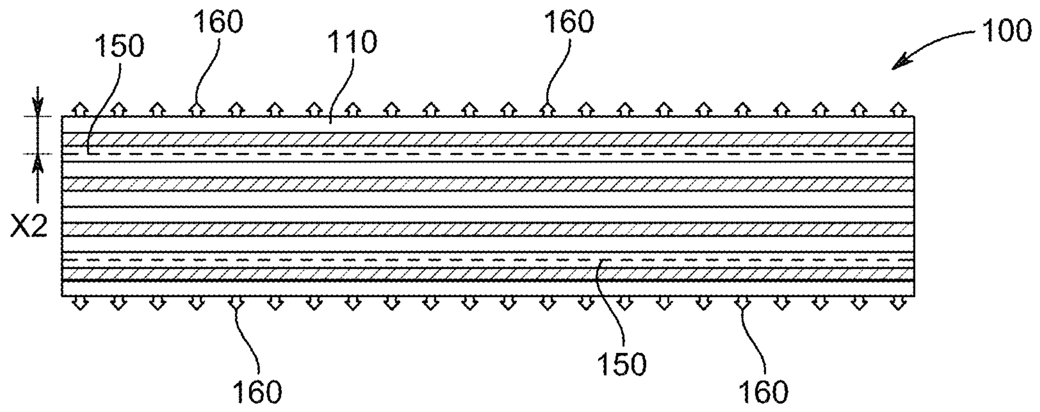
FIG. 2E is an exemplary planar view of the traffic sign add-on with one or more light-emitting diodes, according to certain embodiments.

Referring to FIG. 2E, in an embodiment, the traffic sign add-on 100 further includes one or more light-emitting diodes 160. In the illustration of FIG. 2E, the one or more light-emitting diodes 160 are depicted as arrows for simplicity. The inclusion of the one or more light-emitting diodes (LEDs) 160 in the traffic sign add-on 100 introduces a visibility feature, particularly beneficial during low light conditions or at night. In some embodiments, a configuration of the one or more LEDs 160 may be stand-alone LEDs, on a string and/or a strand, and the like. As discussed in reference to FIG. 2D, the front layer 110 and the back layer 130 have the hook and loop fastener 152 along the one or more edges, specifically the peripheral longitudinal edges of the front layer 110 and the back layer 130. Herein, the one or more light-emitting diodes 160 are attached to the hook and loop fastener 152. The LEDs 160 are located between the front layer 110 and the back layer 130. The LEDs 160 are designed to be versatile and are attached to the traffic sign add-on 100 using the hook and loop fastener 152 along the one or more of the said edges. In some embodiments, the LEDs 160 may be attached to the traffic sign add-on 100 by being woven and/or stitched into the hook and loop fastener 152. In some embodiments, the LEDs 160 may be attached to the traffic sign add-on 100 by being placed and/or sandwiched between a top of the hook and loop fastener 152 on the front layer 110 and a bottom of the hook and loop fastener 152 on the back layer 130. This fastening method not only secures the LEDs 160 in place but also allows for easy removal and repositioning as necessary, providing flexibility in the use and maintenance of the traffic sign add-on 100. Further, the one or more light-emitting diodes 160 protrude from the hook and loop fastener 152 to an outside of the traffic sign add-on 100. That is, the placement of the LEDs 160 is such that they protrude from the hook and loop fastener 152 to the outside of the traffic sign add-on 100, ensuring that the light they emit is not obstructed, while being discrete and visible from a distance. This protrusion is calibrated to optimize visibility without compromising the profile or the integrity of the traffic sign add-on 100.

In some embodiments, the traffic sign add-on 100 includes a photovoltaic panel (not shown) attached to the light-emitting diodes 160. The photovoltaic panel is attached to the LEDs 160, serving as a power-harvesting source that converts sunlight into electrical energy. The integration of the photovoltaic panel makes the traffic sign add-on 100 a self-sustaining system, aimed at reducing the need for external power sources and enhancing the longevity and reliability of functionality of the LEDs 160. More specifically, in an embodiment, the back layer 130 is covered with a flexible photovoltaic cell (not shown) on an outer surface, which would be in contact with the pole of the traffic sign and exposed to environment, and a flexible battery (not shown) on an inner surface of the back layer 130, facing the fabric lining 140, in the traffic sign add-on 100. The flexible photovoltaic cell charges the flexible battery, and the flexible battery provides power for the one or more light-emitting diodes 160. That is, the flexible photovoltaic cell is configured for charging the flexible battery, ensuring a consistent and renewable energy supply for the LEDs 160. In an example, the wiring from the flexible battery to the LEDs 160 may be housed in a space from the edge to the stitches 150 (i.e., the gap 'X2'). This design provides flexibility for the traffic sign add-on 100 to mount to the traffic sign and promotes energy efficiency for supporting continuous operation of the LEDs 160, ensuring that the traffic sign add-on 100 remains illuminated and visible even in the absence of external power sources. In some embodiments, the LEDs 160 may be powered by batteries and the like with no photovoltaic cells.

Figure 3A:
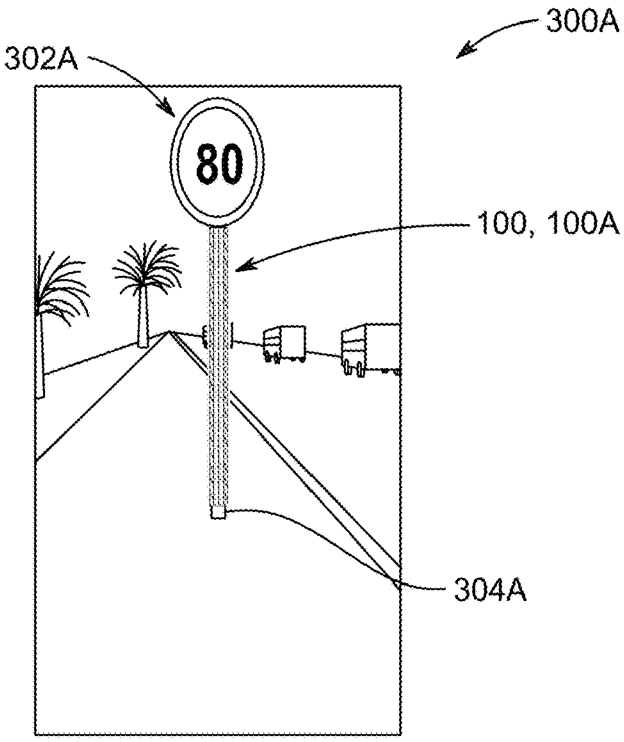
FIG. 3A is an exemplary environment with a traffic sign, adapted as a speed limit sign, incorporating the traffic sign add-on in the form of the green jacket, according to certain embodiments.
Figure 3B:
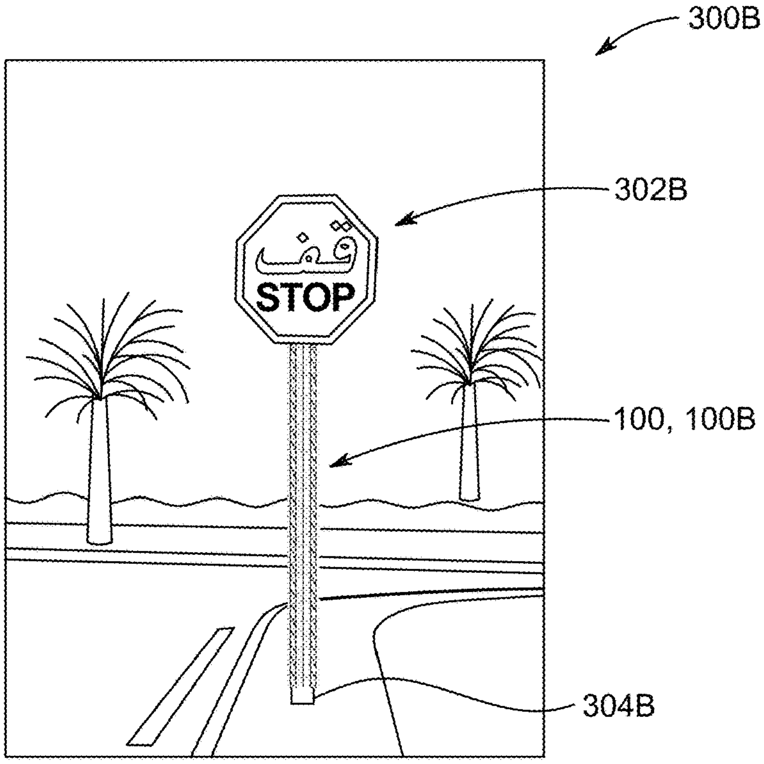
FIG. 3B is an exemplary environment with a traffic sign, adapted as a stop sign, incorporating the traffic sign add-on in the form of the orange jacket, according to certain embodiments.

Referring now to FIGS. 3A and 3B, illustrated are environments 300A and 300B in which the traffic sign add-on 100 may be utilized. As shown, the traffic sign add-on 100 is configured to be mounted on a traffic sign 302A, 302B. Specifically, the traffic sign add-on 100 is adapted to be mounted on a pole 304A, 304B of the traffic sign 302A, 302B. As depicted, in the illustrated examples, the traffic sign add-on 100A, which is in the form of a green jacket (as discussed), may be implemented with the traffic sign 302A adapted as a speed limit sign and/or the like; and the traffic sign add-on 100B, which is in the form of an orange jacket (as discussed), may be implemented with the traffic sign 302B adapted as a stop sign and/or the like. As seen in FIG. 3A, the traffic sign add-on 100A is implemented with the traffic sign 302A, which in FIG. 3A is a speed limit sign. As seen in FIG. 3B, the traffic sign add-on 100B is implemented with the traffic sign 302B, which in FIG. 3B is a stop sign. Traffic sign add-on 100A may be implemented with traffic sign 302B, which in FIG. 3B is a stop sign. Traffic sign add-on 100B may be implemented with traffic sign 302A, which in FIG. 3A is a speed limit sign. Traffic sign add-on 100 may be implemented with any traffic sign 302A and 302B, such as a stop sign, a speed limit sign, a yield sign, a pedestrian crossing sign, and the like. It may be appreciated that the given example combinations are illustrative only and shall not be construed as limiting to the present disclosure in any manner.

Although not shown in FIGS. 3A and 3B, in the traffic sign add-on 100, the front layer 110 and the back layer 130 are configured to accommodate a circumference of the pole 304A, 304B of the traffic sign 302A, 302B coaxially with the long dimension of the back layer 130. This alignment ensures that the traffic sign add-on 100 fits snugly against the poles 304A, 304B, thereby maximizing visibility and stability. The peripheral latitudinal edges at the bottom end 110*a* and the top end 110*b* of the front layer 110 and the back layer 130 are at least partially unconnected. This feature permits a degree of flexibility and ease during the installation process, allowing the traffic sign add-on 100 to be adjusted to fit tightly on the poles 304A, 304B of the traffic signs 302A, 302B of varying circumferences without bunching or wrinkling.

In an embodiment, the front layer 110 and the back layer 130 are separated by one or more add-on structures (not shown) which are located perpendicular to the pole 304A, 304B of the traffic sign 302A, 302B. Further, the one or more add-on structures are cube-shaped and located at the top end 110*b* and the bottom end 110*a* of the pole 304A, 304B of the traffic sign 302A, 302B. The front layer 110 and the back layer 130 are connected along the peripheral longitudinal edges and to the one or more add-on structures to form a rectangular shape. In an example, the one or more add-on structures may extend from the pole 304A, 304B of the traffic sign 302A, 302B. In an example, the one or more add-on structures may be on hinges attached to the pole 304A, 304B of the traffic sign 302A, 302B and may be out and extended perpendicular to the pole 304A, 304B or may be down and parallel to the pole 304A, 304B of the traffic sign 302A, 302B. These add-on structures, serving as spacers, provide spatial separation between the front layer 110 and the back layer 130. By maintaining a set distance between the front layer 110 and the back layer 130, the add-on structures ensure the traffic sign add-on 100 retains its shape and maximizes its visibility. The cube-shaped design of the add-on structures provides a framework that helps maintain the rectangular shape of the traffic sign add-on 100. The combination of these design elements results in the traffic sign add-on 100 that is practical in terms of installation and visibility and has durability to stay stable once in place on the pole 304A, 304B of the traffic sign 302A, 302B.

In some embodiments, the traffic sign add-on 100 further includes a constriction device (not shown). The constriction device is located at the top end 110*b* of the front layer 110 and the back layer 130 and the bottom end 110*a* of the front layer 110 and the back layer 130. Herein, the constriction device holds the traffic sign add-on 100 in place. The constriction device plays a role in maintaining position of the traffic sign add-on 100 on the pole 304A, 304B of the traffic sign 302A, 302B. The constriction device may be a cuff, a clip, a fastener, a collar, and any other constriction device known in the art. By holding the traffic sign add-on 100 firmly in place, the constriction device ensures that the traffic sign add-on 100 does not slide down or shift due to environmental factors like wind or vibrations from passing traffic. This stability maintains the visibility and effectiveness of the traffic sign add-on 100 over time, ensuring that the traffic sign 302A, 302B remains consistently visible and effective in its role of guiding and warning drivers.

In some embodiments, the constriction device is a rotational cuff. In an embodiment of the present disclosure, the rotational cuff is provided at both the top and bottom ends 110*b*, 110*a* of the traffic sign add-on 100. The rotational cuff functions to permit rotation of the traffic sign add-on 100 around a longitudinal axis of the pole 304A, 304B of the traffic sign 302A, 302B. Each rotational cuff includes a compression fitting that permits removable attachment to the pole 304A, 304B of the traffic sign 302A, 302B having a circular cross-section. In some embodiments, the compression fitting may have a triangular cross-section, square cross-fitting, rhomboidal cross-section, any cross-section to fit the pole 304A, 304B of the traffic sign 302A, 302B, and the like. The compression fitting has a first layer with an interior surface that is directly in contact with the post of the traffic sign. The first layer of the compression fitting has an adjustable clamp and/or fitting mechanism which ensures the first layer does not move and is fit tight to the pole 304A, 304B of the traffic sign 302A, 302B. The compression fitting has a second layer mounted on the first layer which is freely rotational around the first layer and around the circumference of the pole 304A, 304B of the traffic sign 302A, 302B. Preferably the first and second layers are separated by a bearing system that permits easy rotation of the second layer around the first layer. The second layer includes an attachment means on an outside surface that functions to connect the compression fitting to the front and back layers 110, 130 of the traffic sign add-on 100. Attachment may be by means of a reversible connector such as snaps or through connectors protruding from the outer surface of the second layer into recesses in the first and second fabrics 112, 132 of the front and back layers 110, 130. The rotational cuffs permit easy rotation of the traffic sign add-on 100 around the axis of the pole 304A, 304B of the traffic sign 302A, 302B. For example, for a traffic sign add-on 100 having front and back layers of different color or reflective properties, the rotational cuff permits orientation of the traffic sign add-on to accommodate for different lighting or weather conditions.

In another embodiment the traffic sign add-on 100 includes an inflatable component (not shown) oriented along the long dimension of the traffic sign add-on 100 and in contact with the inside surfaces of the front and back layers 110, 130. The inflatable component may be continuous along substantially the entire length of the long dimension of the front and the back layers 110, 130. In a pre-deployed condition, the inflatable component collapses and thus does not interfere with the ability to easily store the traffic sign add on 100. After the traffic sign add-on 100 is disposed on the pole 304A, 304B of the traffic sign 302A, 302B, it may be inflated to occupy space between the pole 304A, 304B of the traffic sign 302A, 302B and the traffic sign add-on 100. In this manner the inflatable component occupies an annular space between the traffic sign add-on 100 and the pole 304A, 304B of the traffic sign 302A, 302B. The inflatable component is preferably comprised of an elastomeric material, such as ethylene propylene diene monomer (EPDM) rubber and is of sufficient dimension such that when inflated permits a snug fit between the traffic sign add-on 100 and the pole 304A, 304B of the traffic sign 302A, 302B.

The present disclosure further provides a method of traffic accident reduction. The method utilizes the traffic sign add-on 100 (as discussed in the preceding paragraphs) and steps. These steps are only illustrative, and alternatives may also be provided where one or more steps are added, one or more steps are removed, or one or more steps are provided in a different sequence without departing from the scope of the present disclosure. Various embodiments and variants disclosed above, with respect to the aforementioned traffic sign add-on 100 apply mutatis mutandis to the method of traffic accident reduction, as discussed herein.

The method includes placing the traffic sign add-on 100 on the pole 304A, 304B of the traffic sign 302A, 302B. The front layer 110 is an outermost layer and facing an outside of the pole 304A, 304B. The procedure ensures that the front layer 110, equipped with the one or more reflective sections 118 and the one or more light-emitting diodes 160, serves as the outermost layer and is oriented outwardly, facing the oncoming traffic. This orientation maximizes the visibility of the traffic sign add-on 100 to drivers, thereby enhancing their awareness and compliance with the traffic sign 302A, 302B. Herein, the traffic sign 302A, 302B is a speed limit sign and/or a stop sign, and the like. The application of the present method is particularly emphasized for the traffic signs 302A and 302B such as speed limit signs or stop signs, which command immediate attention for the prevention of accidents. The design of the traffic sign add-on 100 is such that it integrates seamlessly with the traffic sign 302A, 302B, adding a layer of visibility without obscuring its message or altering its intended visual cues.

The method further includes illuminating the light-emitting diodes 160. The illumination provided by these LEDs 160 provides the traffic sign add-on 100 with the ability to capture the attention of drivers, especially during times of low light or adverse weather conditions. The LEDs 160 enhance visibility of the traffic sign 302A, 302B, thereby directly contributing to the goal of reducing traffic accidents. In some embodiments, the light-emitting diodes 160 are continuously illuminated. This continuous illumination maintains consistent visibility of the traffic sign 302A, 302B, especially important during nighttime or in low-visibility conditions. The persistent illumination from the LEDs 160 ensures that the traffic sign 302A, 302B remains noticeable and clear, thus contributing to road safety and aiding in accident reduction. In other embodiments, the LEDs 160 are illuminated in a pattern, such as a flashing pattern, a twinkling pattern, an alternating pattern, and any other known illumination patterns known in the art. In some embodiments, the traffic sign add-on 100 extends at least 90%, preferably at least 91%, preferably at least 92%, preferably at least 93%, preferably at least 95%, preferably at least 96%, preferably at least 97%, preferably at least 98%, more preferably at least 99%, and yet more preferably at least 100% the length of the pole 304A, 304B of the traffic sign 302A, 302B. This extensive coverage ensures that the traffic sign add-on 100 is visibly prominent for drivers approaching from various angles and distances. By covering a substantial portion of the pole 304A, 304B, the traffic sign add-on 100 provides a larger and more continuous reflective surface, thereby enhancing the overall effectiveness of the traffic sign 302A, 302B in capturing drivers' attention and promoting compliance.

The traffic sign add-on 100 of the present disclosure is designed to address the issue of road safety through enhanced visibility and compliance, and in a manner that is practical, scalable, and sustainable. The features of the traffic sign add-on 100, including the reflective sections 118, the LEDs 160, a self-powering mechanism using the photovoltaic panel, and a practical installation method, making improvements over existing road safety solutions. The modular design of the traffic sign add-on 100 allows for adaptability to various types and sizes of the traffic signs, a feature lacking in many existing solutions. This versatility allows the traffic sign add-on 100 to be used across different traffic scenarios, from urban streets to rural roads, enhancing its utility and cost-effectiveness. The traffic sign add-on 100 represents a cost-effective, environmentally friendly, and efficient approach to reducing road traffic accidents. The combination of enhanced visibility, ease of installation, energy efficiency, and cost-effectiveness make the traffic sign add-on 100 of the present disclosure an alternative to existing road safety solutions.

Experimental Data

An objective of the present disclosure is to design a simple and cost-effective traffic sign add-on (traffic sign add-on 100) to boost driver compliance which is consistent with the MUTCD specifications for road signages. Different variations of the add-ons were tested and validated for their effectiveness. The design was made to fit on to the support (pole) of the traffic sign. In the current disclosure, focus was on two road signs, which are the speed limit and stop signs. More than 22,000 observations and 4,000 observations were analyzed in compliance with speed limit and stop signs, respectively. Up to a 50% and 40% increase in the percentage of compliance with the speed limit and stop sign were observed, respectively. Results showed a continuous increase in compliance up to 7 days on speed limit sign. Statistical analysis of the results showed that the changes observed are statistically significant. The add-on can be useful for the launching of new signs and for reviving driver compliance with old traffic signs in the short term. Other areas where the add-on can be applied include temporary signage such as work zones and locations with poor sight distance and or compliance.

Table 1 shows a list of factors that the traffic sign add-on design has considered. The design accounts for safety, global and societal impact, and economic benefits. Other aspects of the design have minor impact on environment by choosing renewable energy source to power the LED on the add-on, and the like.

TABLE 1

Consideration of Factors in Design and Impact Assessment

| Factors | Justification of Impact | Major impact |
|---|---|---|
| Public Health Impact:<br>☐ Major<br>✓ Minor | Major: affects lifestyle, nutrition, sleep, general well-being, noise, contaminant (air/soil), and the like<br>Minor: otherwise | |
| Safety Impact:<br>✓ Major<br>☐ Minor | Highly visible materials and unambiguous in message and meaning was selected.<br>These materials are well established for safety clothing application. | The design was guided by MUTCD standard to avoid driver misinformation that could lead traffic accident during trials. |
| Global, Cultural and Societal Impact:<br>✓ Major<br>☐ Minor | The design should poster more awareness on traffic rule with respect to compliance for all drivers from various countries within KSA. The SDP team made of students from different backgrounds/countries. | This will enhance potential driver behavior in the positive direction of people from various countries. The testing and validation were on major freeways. |
| Economic Welfare Impact:<br>✓ Major<br>☐ Minor | This product will create more market, more occupations, and employment opportunities which will provide more income to individuals and businesses will lead to industry and rural development. | Manufacturing the add-on requires simple and local skills. Tailors, designers, and local material suppliers will need to be hired if the product should be commercialized. |

Table 2 represents a risk analysis of the project by using the following SWOT (Strengths, Weakness, Opportunities, and Threats) template.

TABLE 2

SWOT Analysis

| I | Strength | Weaknesses |
|---|---|---|
| | Cooperative teamwork<br>Availability of materials<br>Ease of manufacturability<br>Professional advisor<br>Cost-effective design | Time constraint<br>Testing was limited in Dammam metropolitan area<br>Lack of sites meeting the criteria |
| External | Opportunities | Threats |
| | Promote public awareness<br>Local solution or interest<br>Local manufacture & marketing | Local competition & marketability<br>Legal & policy<br>Constructability<br>Local acceptance |

Table 3 shows the experimental plan followed for this disclosure. In the present disclosure, data is collected for two types of signs: a stop sign and a speed limit sign. When determining a location for the stop sign, no traffic calming measures near the intersection to slow down the speed, such as speed bumps and the like should be near the sign. The disclosure collects data on whether the driver stopped completely or not, and/or slowed down from seeing a stop sign or because of another vehicle at the intersection. When installing the camera to count vehicles, a minimum of one hour and not less than 300 vehicles at the site was recorded. In the speed limit sign, the location is specified provided there are no speed radars and there are no entrances to the road nearby to influence speed readings. Data for the speed limit signs are collected before and after placing the device (traffic sign add-on) through a speed gun before and after the speed limit sign. Both the jacket with LEDs (fixed and twinkle sequence) and without LEDs were tested.

TABLE 3

Experimental Plan

| Type of Road Sign | Compliance Categories | Time of the Day | Interventions |
|---|---|---|---|
| Stop Sign | Stopped, Yield, Failed to Stop | Day | No intervention |
| | | Night | Reflective Jacket<br>Reflective Jacket with LED #1<br>Reflective Jacket with LED #2 |
| Speed Limit Sign | Speed Studies | Day | No intervention |
| | | Night | Reflective Jacket<br>Reflective Jacket with LED #1<br>Reflective Jacket with LED #2 |

Note:
LED #1 fixed light; LED #2 is flashing/twinkling light sequence

The testing and validation for effectiveness of the traffic add-on were confined to the Dammam metropolitan area. Calculations for driver perception reaction distance were conducted following the guidelines set by the American Association of State Highway and Transportation Officials (AASHTO, 2018).

Table 4 shows the number of vehicles before and after during the day and the night, at Alaziziyah site. In the

TABLE 4

Number of samples before and after the Speed Limit Sign (Day and Night) green and orange jackets

| | Before | | | | After | | | |
|---|---|---|---|---|---|---|---|---|
| | Day | | Night | | Day | | Night | |
| No. of Samples | Orange | Green | Orange | Green | Orange | Green | Orange | Green |
| Without Jacket | 620 | 620 | 426 | 426 | 401 | 401 | 410 | 410 |
| With Jacket | 301 | 377 | 295 | 344 | 349 | 359 | 302 | 321 |
| With Jacket + LED#1 | NA | NA | 308 | 351 | NA | NA | 302 | 311 |
| With Jacket + LED#2 | NA | NA | 305 | 290 | NA | NA | 302 | 244 |

After searching for sites with the criteria, such as the speed limit sign being located after a speed camera, a fixed speed camera, and the like, to measure the effect of the jacket a site was decided upon. Measurements were taken with a speed camera. Table 5 shows the number of observed vehicles before and after during the day and the night, at Alsahily site for both colors (green and orange).

TABLE 5

Number of samples before and after the Speed Limit Sign (Day and Night) green and orange jackets

| | Before | | | | After | | | |
|---|---|---|---|---|---|---|---|---|
| | Day | | Night | | Day | | Night | |
| No. of Samples | Orange | Green | Orange | Green | Orange | Green | Orange | Green |
| Without Jacket | 490 | 490 | 450 | 450 | 524 | 524 | 562 | 562 |
| With Jacket | 502 | 517 | 426 | 551 | 514 | 501 | 446 | 555 |
| With Jacket + LED#1 | NA | NA | 458 | 566 | NA | NA | 452 | 618 |
| With Jacket + LED#2 | NA | NA | 451 | 553 | NA | NA | 464 | 589 |

Table 6 shows the number of samples for the stop sign from the intersection in the Aljisr neighborhood. The numbers were collected with and without the jacket for green and orange colors.

TABLE 6

Number of samples for the Stop sign at Aljisr neighborhood

| No. of Samples | Orange Jacket | Green Jacket |
|---|---|---|
| Day | 318 | 290 |
| Night | 433 | 361 |

Table 7 shows the number of samples for the stop sign from the intersection in the Alfaisaliah neighborhood. The numbers were collected with and without of the jacket for green and orange colors.

TABLE 7

| Number of samples for the Stop sign at Alfaisaliah neighborhood | | |
|---|---|---|
| No. of Samples | Orange Jacket | Green Jacket |
| Day | 251 | 287 |
| Night | 340 | 383 |

Figure 4A:
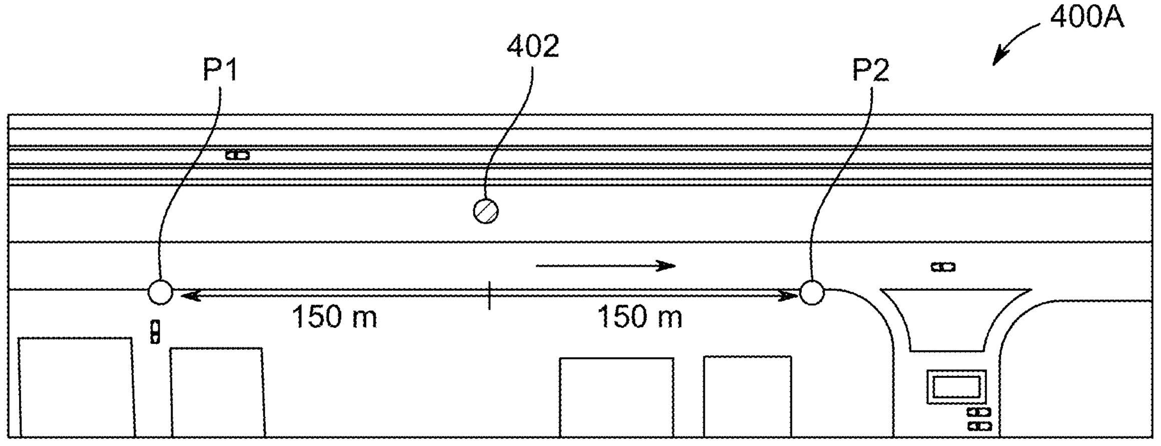
FIG. 4A is an exemplary layout of Alaziziah site for testing of the traffic sign add-on, according to certain embodiments.

FIG. 4A illustrates a layout of Alaziziah site (as represented by reference numeral 400A). In FIG. 4A, the point 402 represents a speed limit sign (80 km/h) position. Further, the points P1 and P2 are positions of the vehicles in which speed cameras are used to take the readings. The arrow in the roadway represents the direction of the traffic stream which the readings are taken. Herein, the distance is given by equation 1:

$$d = 0.278vt + 0.039\frac{v^2}{a} \tag{1}$$

where t=break reaction time, 2.5 sec; v=design speed, km/h; and a=deceleration rate, 3.4 m/s$^2$.

It has been practically checked that the traffic sign add-on becomes visible to the driver at about 300 m from the sign. In addition, the drivers' stopping distance (including perception reaction distance) is given by equation 1. Accordingly, the stopping sight distance of 90 km/h is 129 m. Any distance from the sign less than or equal 171 m is considered adequate to capture the full response of the driver. This number is applicable for any speed less than or equal to 90 km/h.

Figure 4B:
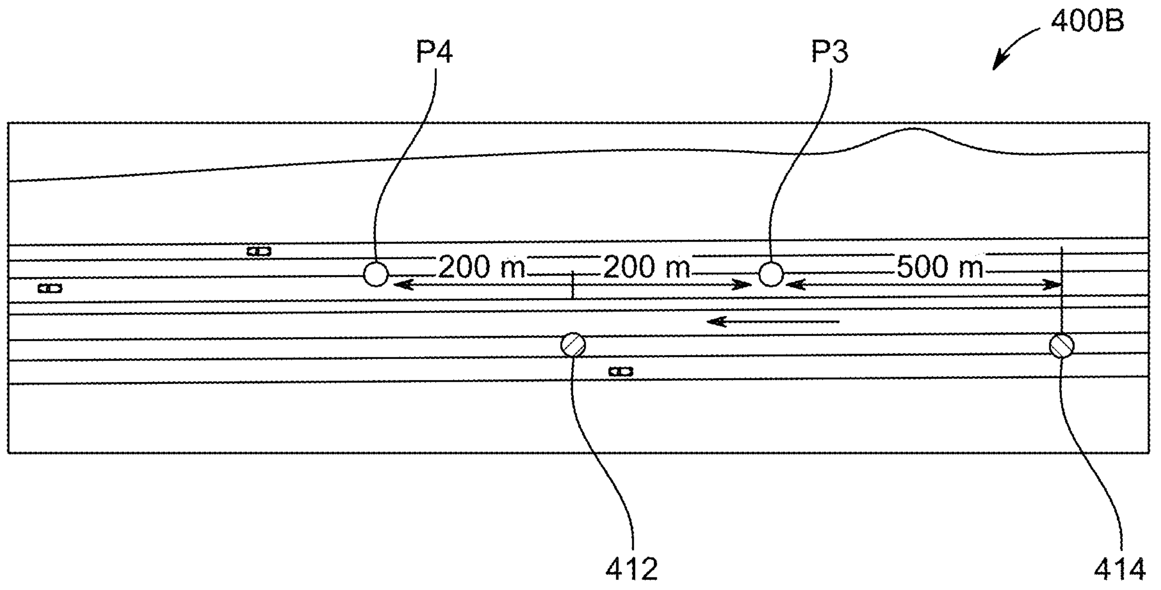
FIG. 4B is an exemplary layout of Alsahily site for testing of the traffic sign add-on, according to certain embodiments.

FIG. 4B illustrates a layout of Alsahily site (as represented by reference numeral 400B). In FIG. 4B, the point 412 represents a speed limit sign (100 km/h) position, and the point 414 represents a speed camera position. Further, the points P3 and P4 are positions of the vehicles in which speed cameras are used to take the readings. The arrow in the roadway represents the direction of the traffic stream which the readings are taken. A minimum distance of 500 m is set between the vehicles taking the readings and the speed camera, so the readings are not affected by the speed camera.

Statistical analysis was conducted using MiniTab™ statistical software to assess the factors affecting compliance with road signs. The statistical significance of the change in compliance before and after the intervention was checked at a significance level of 5%. A chi-square test is a statistical test used to compare or understand and interpret the relationship between two categorical variables such as road signs with the jacket and without the jacket. The output of the test is a P-value and a chi-square and will identify the significance of the relationship between two categorical variables. The chi-square is denoted by $X^2$, and the formula is given by equation 2:

$$x^2 = \sum \frac{(o_i - E_i)^2}{E_i} \tag{2}$$

where $O_i$=observed value (actual value) and $E_i$=expected value.

The chi-square test gives a P-value to identify which hypothesis is true, and if the P-value is less than 5%, the alternative hypothesis will be accepted. If the P-value is greater than 5%, the null hypothesis will be accepted. The null hypothesis means there is no relationship between the variables, while the alternative hypothesis implies that there is significant association between the variables. The T-test is another statistical test employed to compare the mean of two groups to test and find out whether it has an effect on the population of interest or otherwise. The T-test formula for two samples is given by equation 3:

$$t = \frac{M_1 - M_2}{S_{Pooled}} \tag{3}$$

where M=mean of groups and $S_{Pooled}$=pooled standard error.

The pooled standard error for 2 sample T-test is given by equation 4:

$$S_{Pooled} = \sqrt{\left(\frac{SD_1}{\sqrt{N_1}}\right)^2 + \left(\frac{SD_2}{\sqrt{N_2}}\right)^2} \tag{4}$$

where SD=standard deviation of group and M=number of people in a group.

Effect of Time on the Effectiveness of the Add-on

The design was tested on the speed limit and the stop signs in an instantaneous manner. Meaning that measurement of compliance was made immediately after the installment of the various add-ons, and subsequent measurements were made afterwards (24 hours, 48 hours, and 7 days). The best performing add-on and location were selected for this evaluation. So, the best location was chosen for each tested sign, and the best jacket color was chosen for each sign and at night the best sequence type (LED #2) was chosen, while only the jacket was selected during the day. The long-term test was done for one week, and the readings were taken three days a week, where the first reading was taken 24 hours after the jacket was installed, the second reading was 48 hours after the jacket was placed, and the last reading was a week after the jacket was placed, while avoiding the weekend days in taking the readings.

Effectiveness of Intervention in Speed Limit Signs

First Site (Alaziziah) (Green Jacket)

Measurements were taken in the daytime with the jacket and without the jacket due to the ineffectiveness of the LED in the daytime. Table 8 shows the speed difference before the speed limit sign was a decrease of 1.5 km/h and after the speed limit sign was a decrease of 3.9 km/h. The comparison at night after the sign with the jacket only and without the jacket results in an average increase of 2.5 km/h after the sign due to the poor visibility without LEDs. Comparing results before the speed limit sign at night with the jacket with a fixed LED sequence and without a jacket, there is a decrease in the average speed by 3.1 km/h. While after the speed limit sign, there is also a decrease in the average speed by 3.5 km/h. For the jacket with LED having a twinkle sequence compared to without a jacket, there is a decrease in the average speed by 2.6 km/h before the speed limit sign and a decrease of 2.9 km/h after the speed limit sign was observed. The observation of the average speed shows us the effectiveness of the jacket in decreasing the average speed in several stages. This indicates that it is visible to the drivers, and it affects their compliance with the speed limit sign.

TABLE 8

Comparison of Average Speed with and without a Jacket (Day and Night)

| Average | Before the sign | | After the sign | |
|---|---|---|---|---|
| Speed ± SD | Day | Night | Day | Night |
| Without Jacket | 70.5 ± 11.9 | 70.1 ± 12.6 | 74.4 ± 11.9 | 70.8 ± 12.5 |
| With Jacket | 69 ± 13.1 | 69.3 ± 12.5 | 70.5 ± 11.4 | 73.3 ± 11.3 |
| With Jacket + LED #1 | NA | 67 ± 12.2 | NA | 67.3 ± 11.5 |
| With Jacket + LED #2 | NA | 67.5 ± 13.3 | NA | 67.9 ± 12 |

Figure 5A:
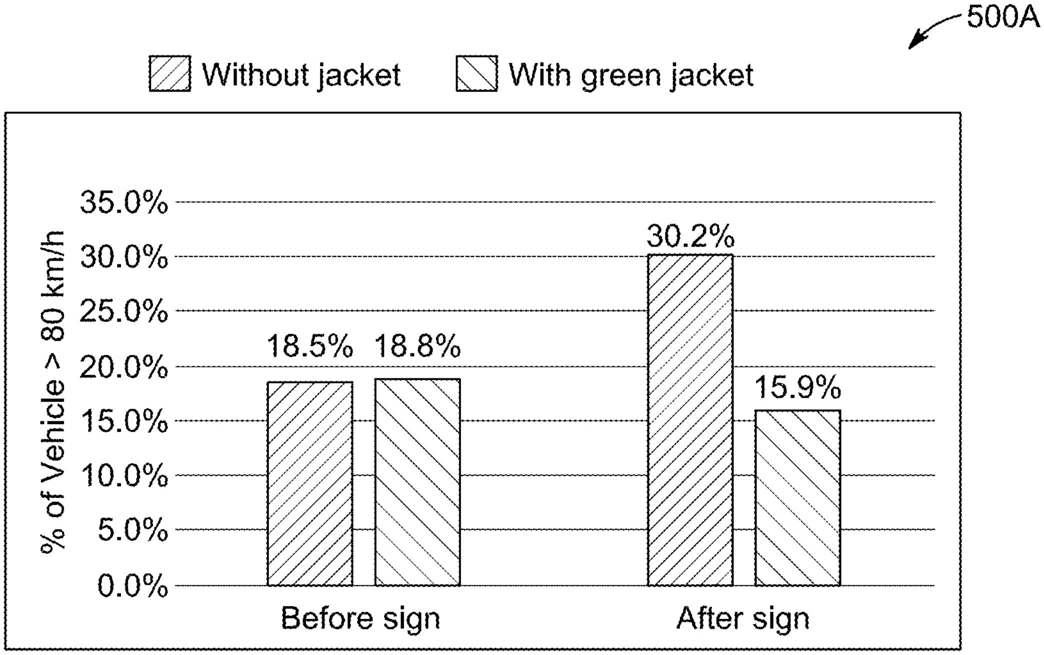
FIG. 5A is an exemplary graph representing effect of the green jacket on speed-limit sign during the day (before and after the sign), for testing of the traffic sign add-on at a first site, according to certain embodiments.
Figure 5B:
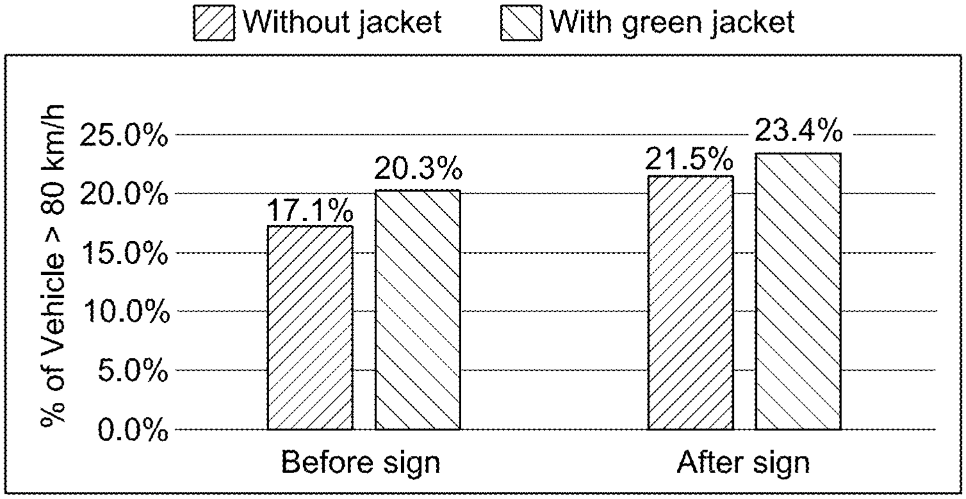
FIG. 5B is an exemplary graph representing effect of the green jacket on speed-limit sign during the night (before and after the sign), for testing of the traffic sign add-on at a first site, according to certain embodiments.
Figure 5C:
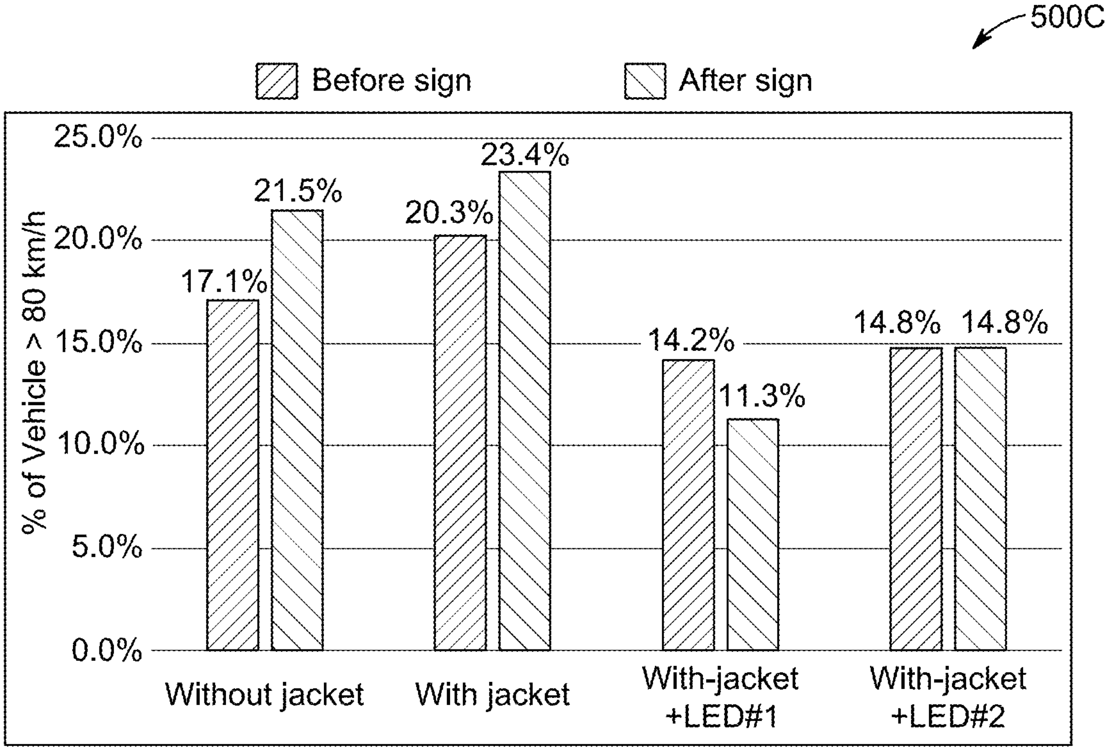
FIG. 5C is an exemplary graph representing effect of LED on the effectiveness of the green jacket on speed-limit sign during the night (before and after the sign), for testing of the traffic sign add-on at a first site, according to certain embodiments.

FIG. 5A provides a graph 500A presenting the percent of vehicles exceeding the speed limit sign during the day. The data was taken before and after the sign. After adding the green jacket there is a decrease in violation after the sign. It is evident that with the jacket the sign becomes more visible and imposing to the drivers. Further, FIG. 5B provides a graph 500B presenting the percent of vehicles exceeding the speed limit during the night. The data was taken before and after the sign. There is a slight increase in the violation of the sign after adding the green jacket during the night. This shows that the green jacket alone has no positive effect on speed limit compliance during the night, indicating a need for additional components, such as LEDs, for the jacket to be more visible to the drivers. FIG. 5C provides a graph 500C presenting the percent of vehicles exceeding the speed limit sign during the night with the LEDs. The data was taken before and after the sign. After adding the LEDs to the jacket there is a decrease in speed limit violation. This shows that the LEDs made the sign more effective either by increasing its visibility to the drivers, emphasizing/demanding the need for compliance, and/or both. It can also be observed that the percentage of drivers violating the speed limit after the sign either decreases or remains the same as before the sign.

Figure 6A:
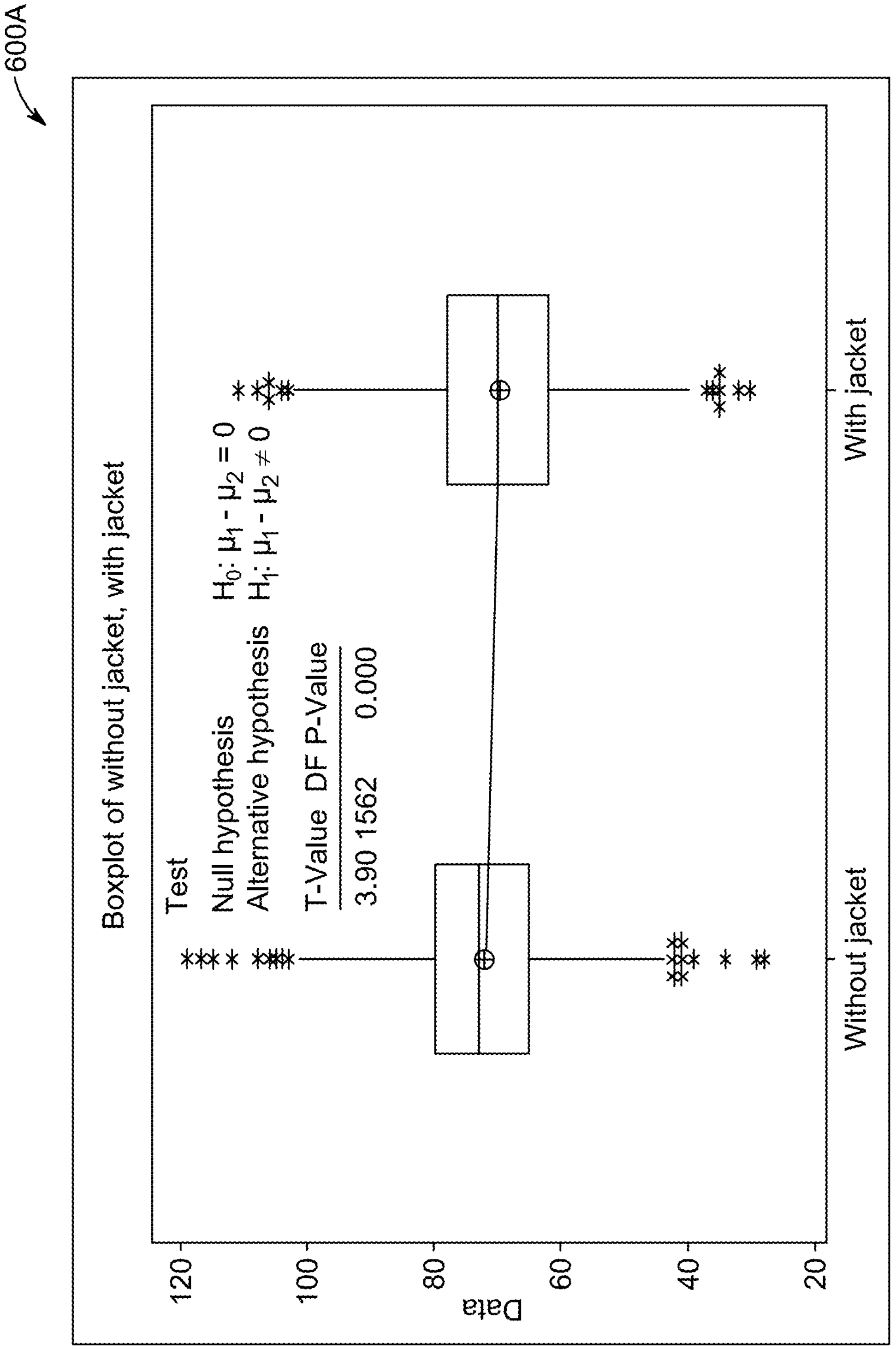
FIG. 6A is an exemplary graph representing effect of the green jacket on average speeds during the day, for testing of the traffic sign add-on at a first site, according to certain embodiments.
Figure 6B:
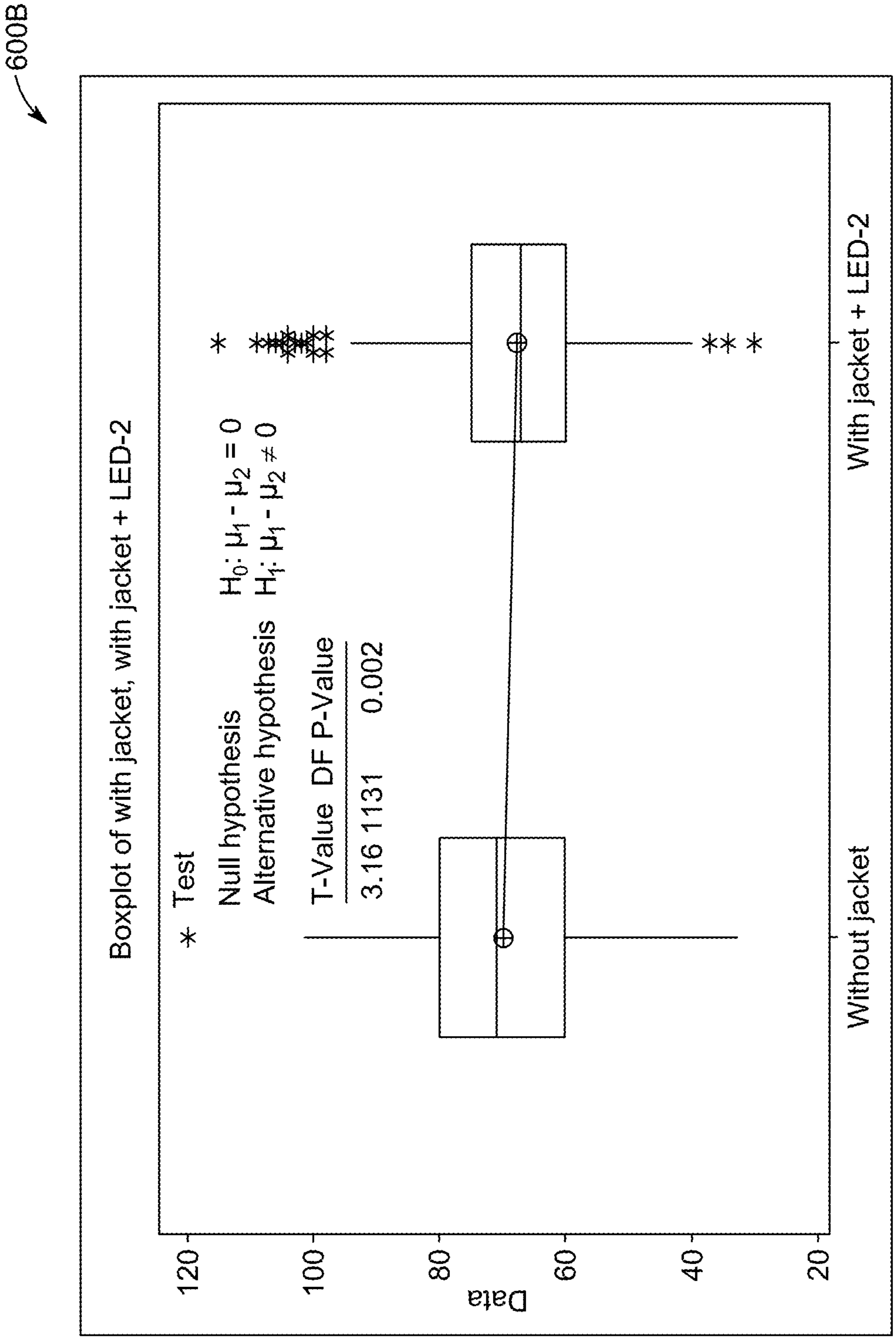
FIG. 6B is an exemplary graph representing comparison of the effect of LED twinkle sequence with the green jacket on average speeds during the night, for testing of the traffic sign add-on at a first site, according to certain embodiments.
Figure 6C:
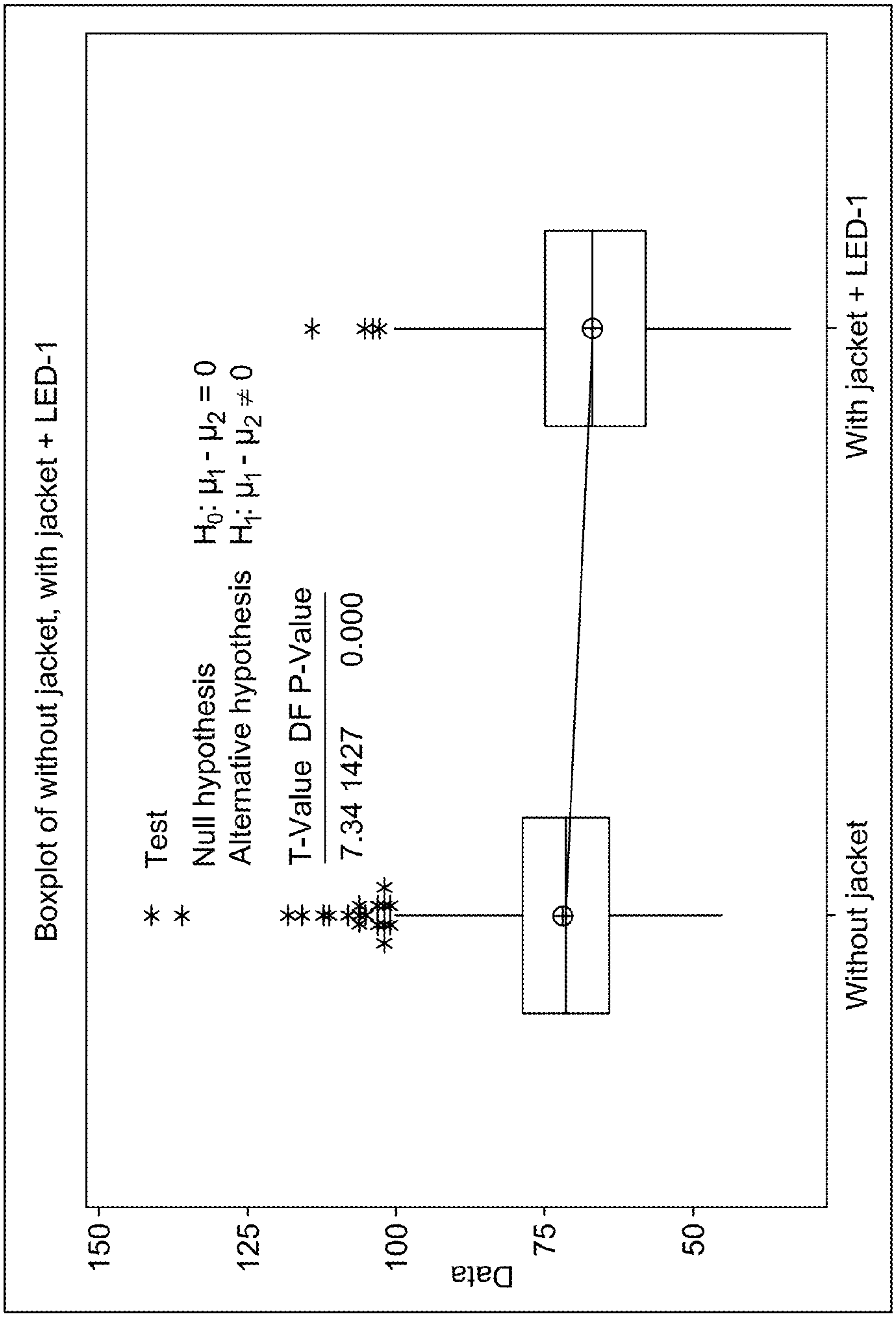
FIG. 6C is an exemplary graph representing effectiveness of the average speed after the LED fixed sequence during the night, for testing of the traffic sign add-on at a first site, according to certain embodiments.
Figure 6D:
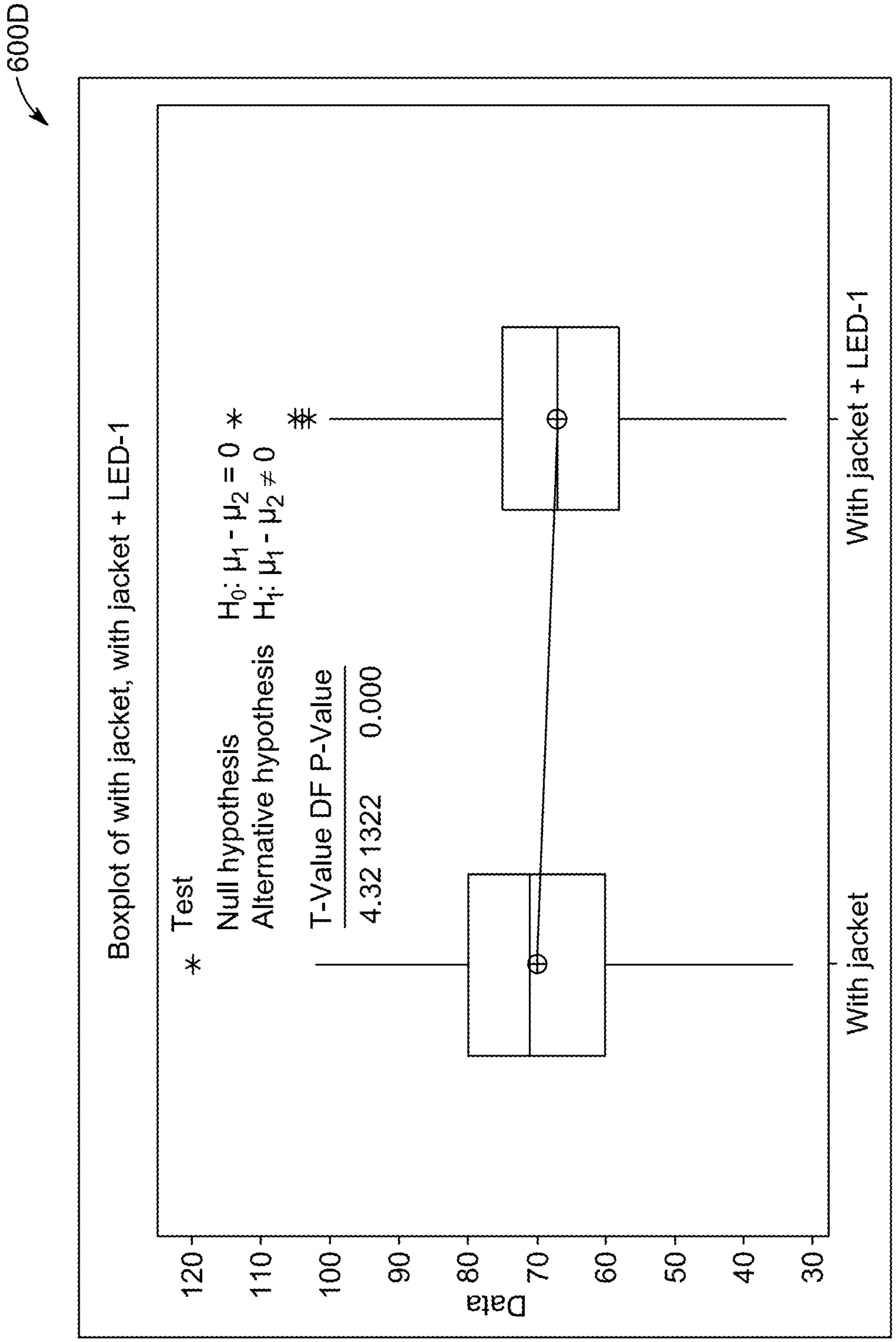
FIG. 6D is an exemplary graph representing comparison of the effect of LED fixed sequence with the green jacket on average speeds during the night, for testing of the traffic sign add-on at a first site, according to certain embodiments.

FIG. 6A provides a graph 600A which represents the statistical analysis between two variables (with and without jacket during the day). The box plot presents the spot speed of the vehicles in the two conditions. It can be observed that the conditions with the sign having a green jacket showed lower average speeds, which further supports that with the jacket the number of vehicles exceeding the speed limit was minimized. A p-value<0.05 indicates that there is a significant difference in the average speed between the two data. FIG. 6B provides a graph 600B which represents the statistical analysis between two variables (with jacket and with jacket+LED #2 (twinkling pattern)). A p-value<0.05 indicates that there is a significant difference in the average speed between the two data. This confirms that the presence of the LED on the green jacket has resulted in statistically significant lower average speed. FIG. 6C provides a graph 600C which represents the statistical analysis between two scenarios (without jacket and with jacket+LED #1 (continuous illumination)). With the jacket+LED #1 the number of vehicles exceeding the speed limit was minimized. A p-value<0.05 indicates a difference in the average speed between the two cases is significant. FIG. 6D provides a graph 600D which represents the statistical analysis between two scenarios (with jacket and with jacket+LED #1). The jacket with LED #1 is more effective at night than the jacket with the LEDs due to the differences between the mean values. A p-value<0.05 indicates that the difference in the average speed between the two cases is significant.

Second Site (AlSahely) (Green Jacket)

Figure 7:
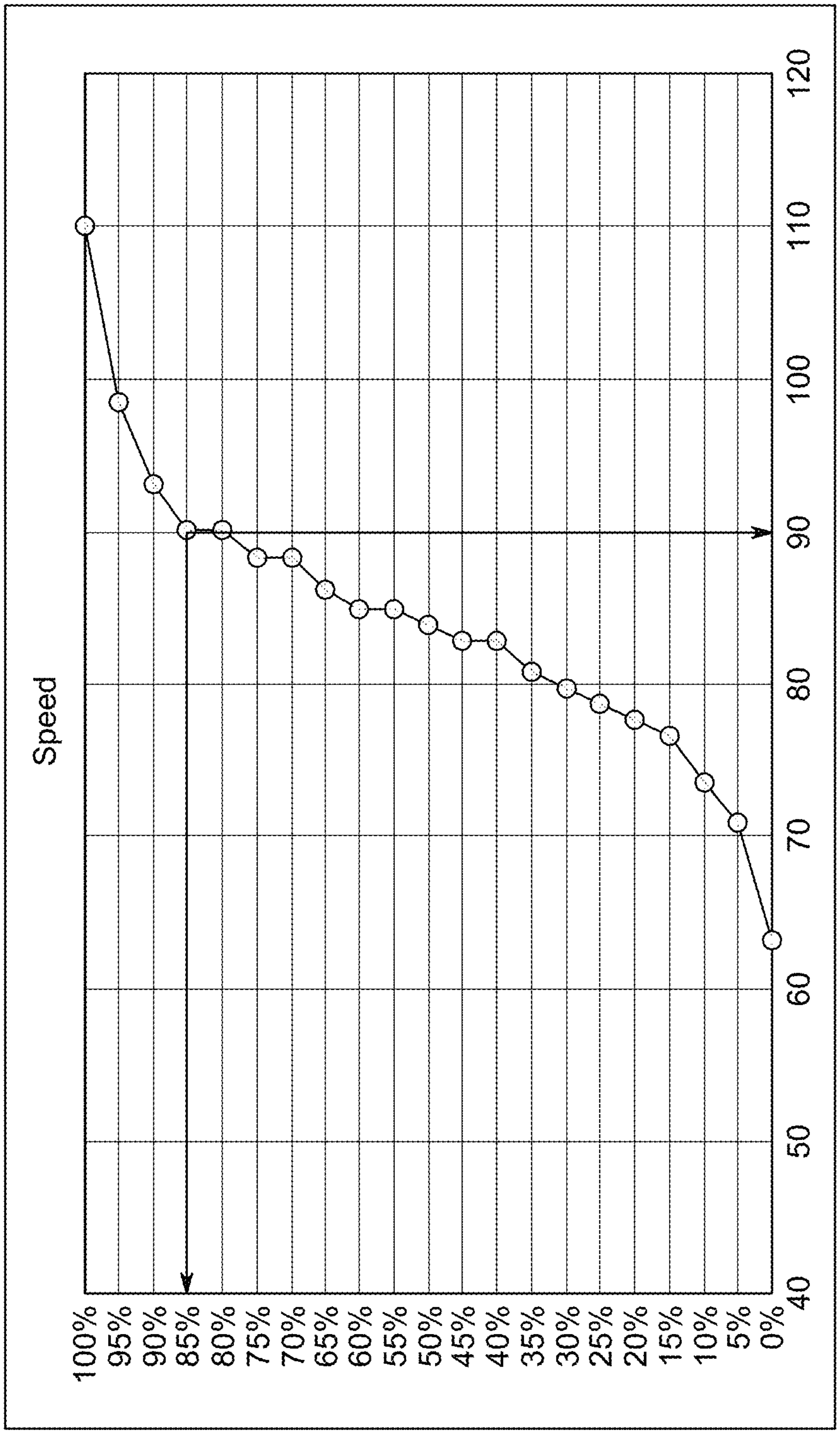
FIG. 7 is an exemplary graph representing distribution of the speed for a second site, for testing of the traffic sign add-on at a first site, according to certain embodiments.

After conducting the study at the second site, a small number of drivers were found to be exceeding the speed of 100 km per hour, which is the road speed. The speed limit may not be within the recommended range. FIG. 7 provides a graph 700 representing the distribution of speed. Based on the analysis of the speed data from the graph 700, it is found that the 85th percentile of the speeds is to be 90 km per hour, which should be the posted speed limit. As a result, an adopted speed limit of 90 km per hour is used to see if the jacket is effective or not.

Figure 8A:
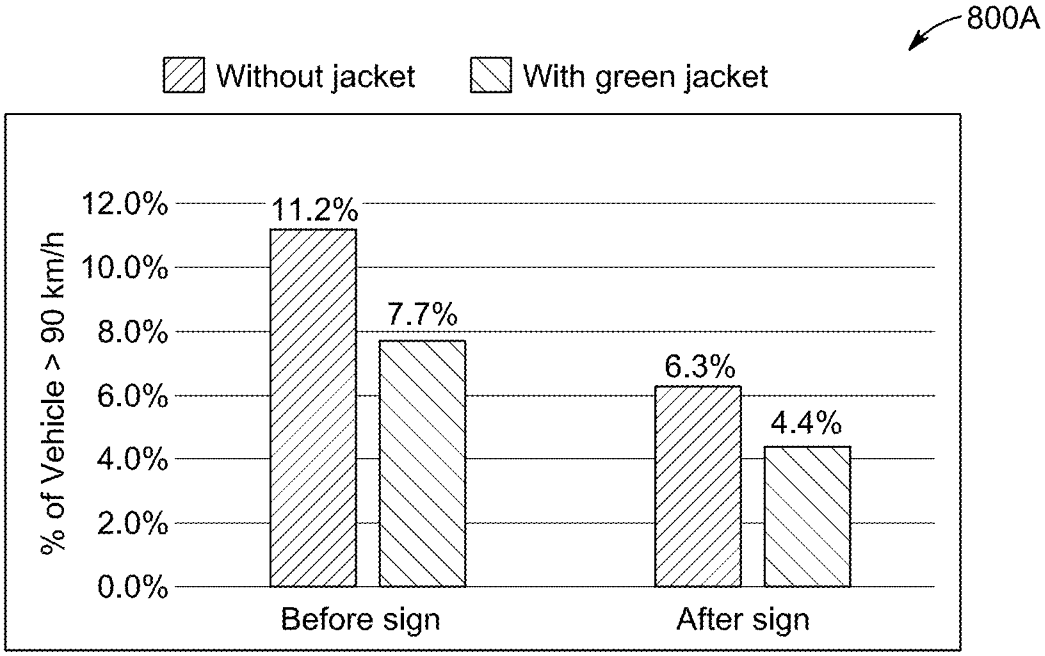
FIG. 8A is an exemplary graph representing effect of the green jacket on speed-limit sign during the day (before and after the sign), for testing of the traffic sign add-on at a second site, according to certain embodiments.
Figure 8B:
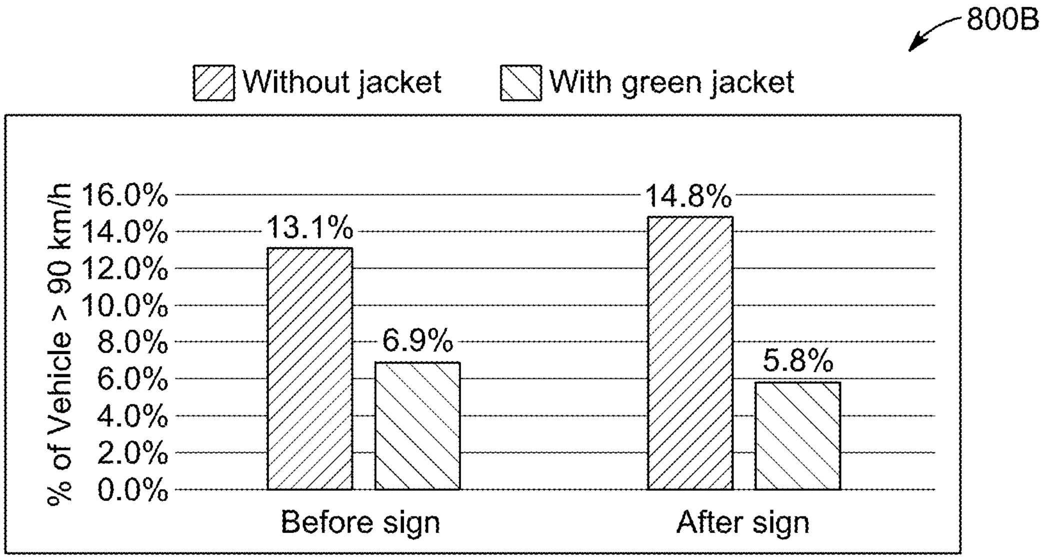
FIG. 8B is an exemplary graph representing effect of the green jacket on speed-limit sign during the night (before and after the sign), for testing of the traffic sign add-on at a second site, according to certain embodiments.
Figure 8C:
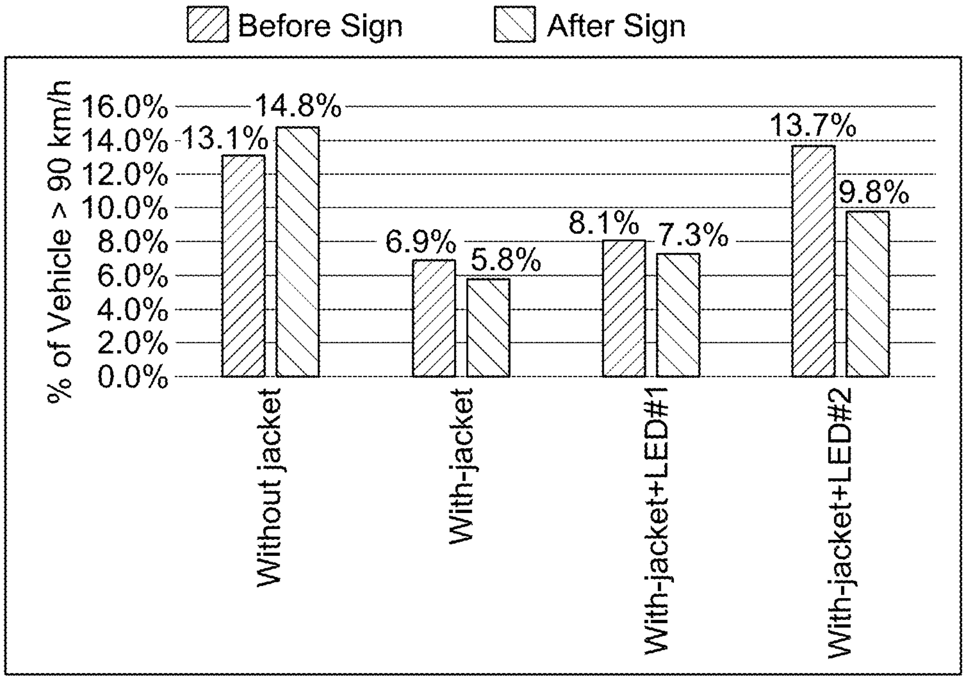
FIG. 8C is an exemplary graph representing effect of the LED on the effectiveness of the green jacket on speed-limit sign during the night (before and after the sign), for testing of the traffic sign add-on at a second site, according to certain embodiments.
Figure 8D:
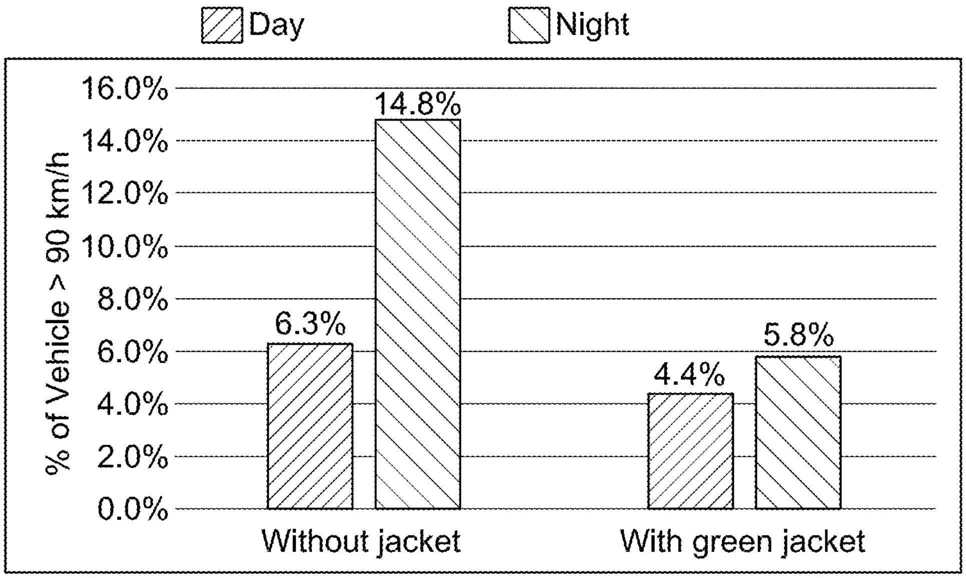
FIG. 8D is an exemplary graph representing effect of the green jacket on speed-limit sign during day and night (after the sign), for testing of the traffic sign add-on at a second site, according to certain embodiments.

FIG. 8A provides a graph 800A presenting the percent of vehicles exceeding the speed limit sign during the day. The data was taken before and after the sign. After adding the green jacket there is a decrease in violation before and after the sign. It is supported that the jacket makes the speed limit sign more visible to the drivers due to the higher percentage of drivers now traveling at speeds lower than the supposed posted limit. FIG. 8B provides a graph 800B presenting the percent of vehicles exceeding the posted speed limit during the night. The data was taken before and after the sign. After adding the green jacket there is a decrease in violation by 47% and 60% before and after the sign, respectively. FIG. 8C provides a graph 800C presenting the percentage of vehicles exceeding the speed limit during the night with the LEDs. After adding the LEDs to the jacket there is an additional increase in compliance. FIG. 8D provides a graph 800D presenting the percentage of vehicles exceeding the speed limit sign during the day and night. The comparison was taken after the sign. It is seen that the green jacket has more of an effect on the speed limit sign during the night as compared to during the day.

Figure 9A:
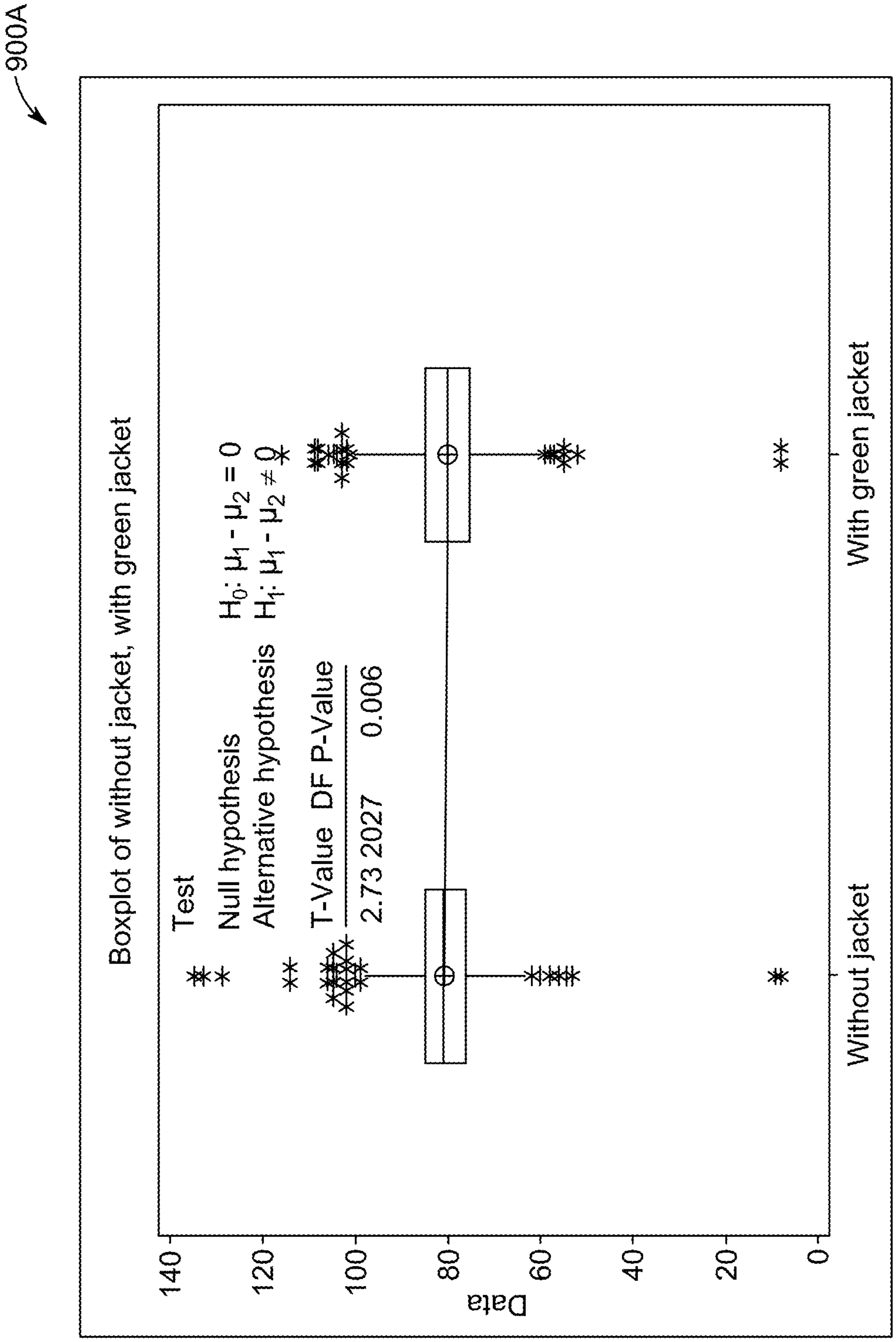
FIG. 9A is an exemplary graph representing effect of the green jacket on the average speed during the day, for testing of the traffic sign add-on at a second site, according to certain embodiments.
Figure 9B:
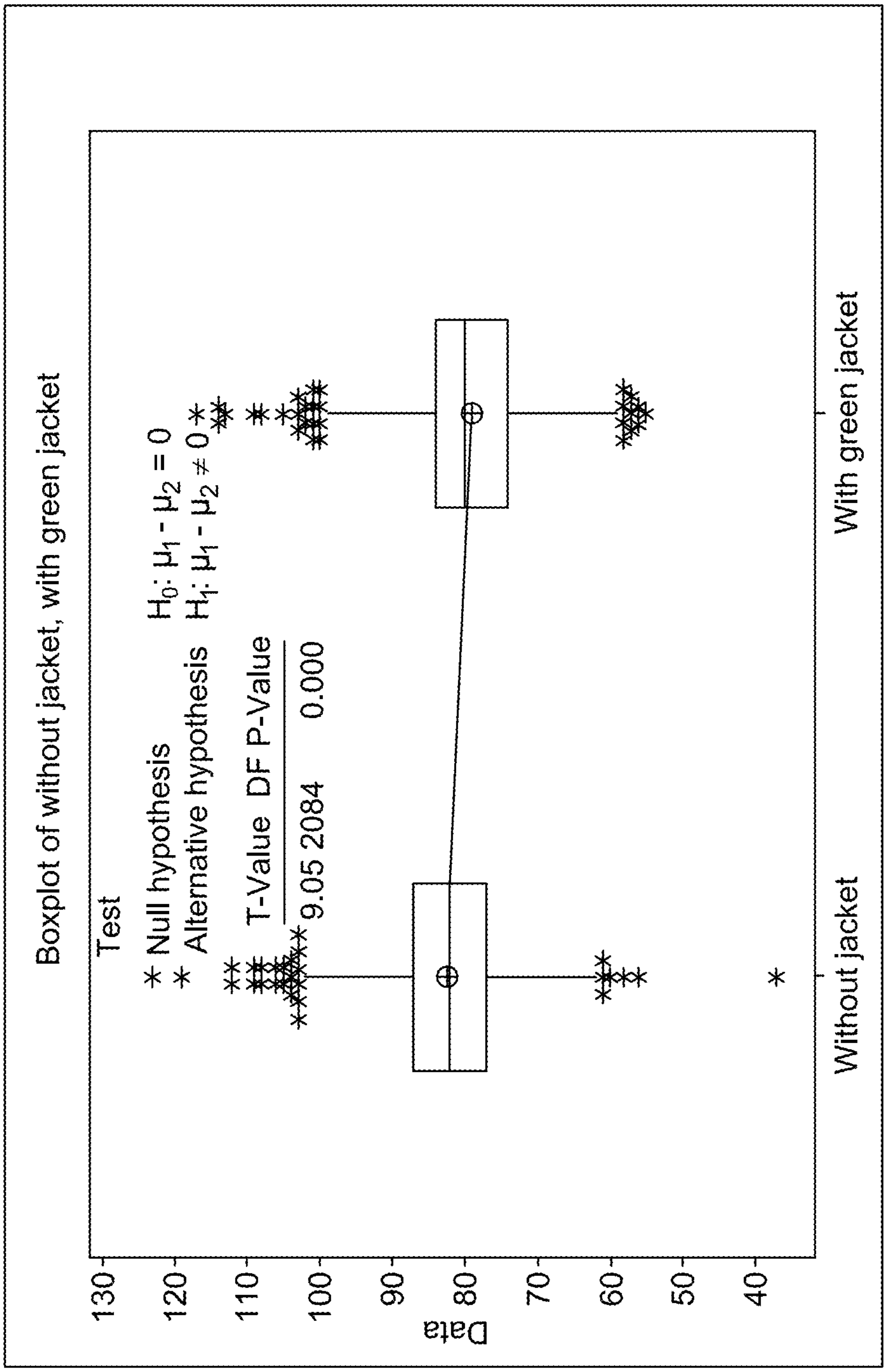
FIG. 9B is an exemplary graph representing effect of the green jacket on the average speed during the night, for testing of the traffic sign add-on at a second site, according to certain embodiments.
Figure 9C:
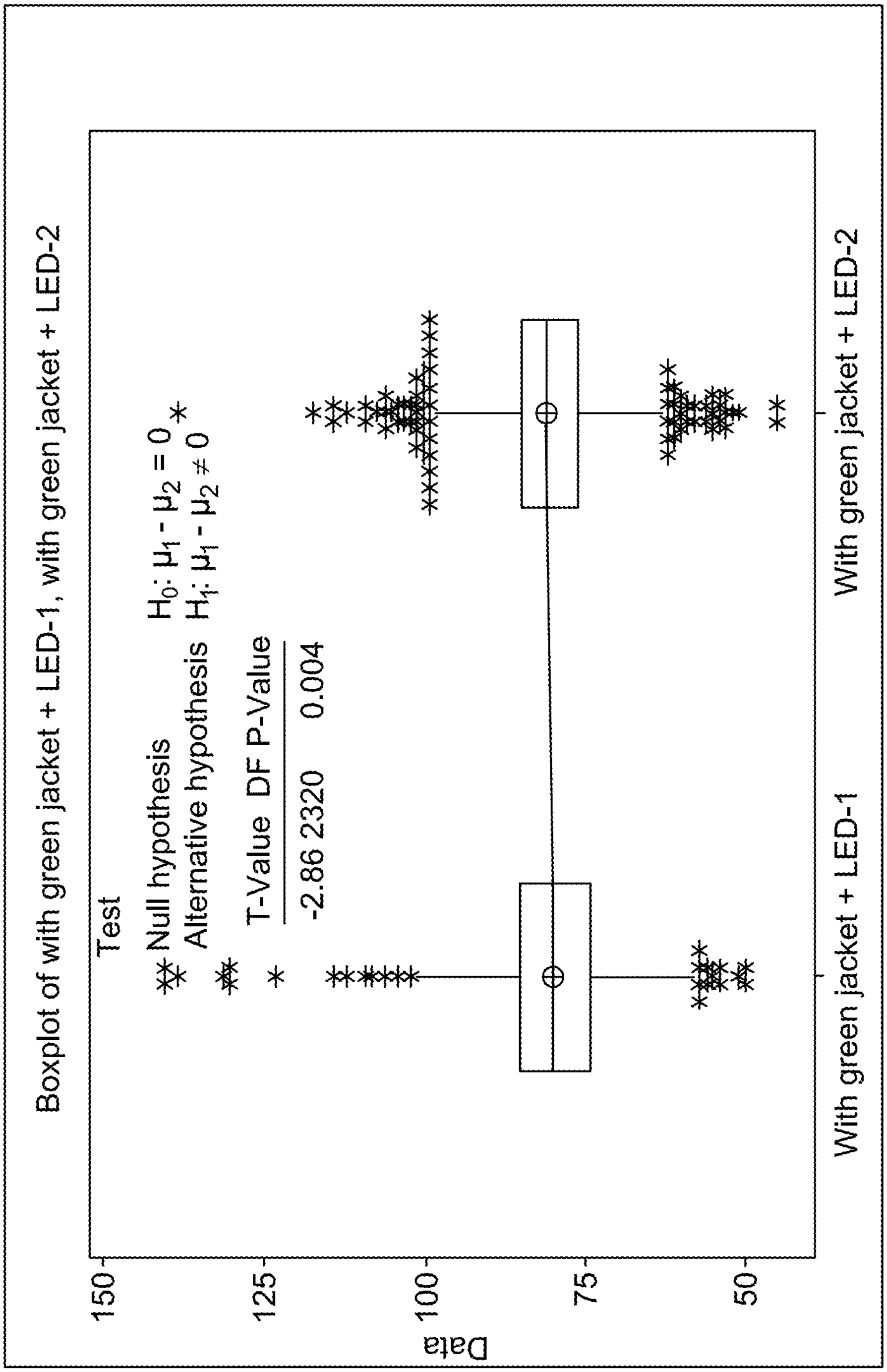
FIG. 9C is an exemplary graph representing comparison of the effect of the LED fixed sequence with the LED twinkle sequence on average speeds during the night, for testing of the traffic sign add-on at a second site, according to certain embodiments.

FIG. 9A provides a graph 900A which represents the statistical analysis between the two cases (with and without jacket) during the day. The green jacket shows more effect on reducing the number of vehicles that exceed the limit. FIG. 9B provides a graph 900B which represents the statistical analysis between two variables (with and without jacket) during the night. The jacket was more effective at night than not due to reducing the average speed. FIG. 9C provides a graph 900C which represents the statistical analysis between two variables (with jacket+LED #1 and with jacket+LED #2) during the night. The p-value is less than 5%, indicating that the observed difference in means between the two conditions is statistically significant. LED #2 has more of an effect on vehicles exceeding the speed limit.

First Site (Alaziziah) (Orange Jacket)

After experiments with the green jacket, the color was changed it to orange to see the effect that the color of the jacket has on the drivers. Table 9 shows the speed difference before the speed limit sign was increased 4.2 km/h and after the speed limit sign was decreased 4 km/h. Comparison of results at night with and without the jacket before the speed limit sign showed an increase in the average speed of 0.4 km/h. At night, after the speed limit sign there is a decrease of 4.1 km/h with the jacket. The jacket with the LED #1 sequence compared to no jacket shows a decrease in the average speed of 1.1 km/h before the speed limit sign, and a decrease in the average speed of 3.2 km/hour is seen after the speed limit sign. The jacket with LED #2 compared to no jacket before the speed limit sign, a decrease in average speed of 3.2 km/h is seen, and after the speed limit sign there is a decrease of 3.4 km/h. There is a decrease in average speed with the jacket and with LEDs.

TABLE 9

| Comparison of Average Speed with and without a Jacket (Day and Night) | | | | |
|---|---|---|---|---|
| Average | Before the sign | | After the sign | |
| Speed ± SD | Day | Night | Day | Night |
| Without Jacket | 66.3 ± 12.7 | 70.1 ± 12.6 | 74.4 ± 11.9 | 73.3 ± 11.3 |
| With Jacket | 70.5 ± 11.9 | 70.5 ± 10.7 | 70.4 ± 13.4 | 69.2 ± 12.0 |
| With Jacket + LED #1 | NA | 69 ± 12.5 | NA | 70.1 ± 13.3 |
| With Jacket + LED #2 | NA | 66.9 ± 11.7 | NA | 69.9 ± 12.7 |

Figure 10A:
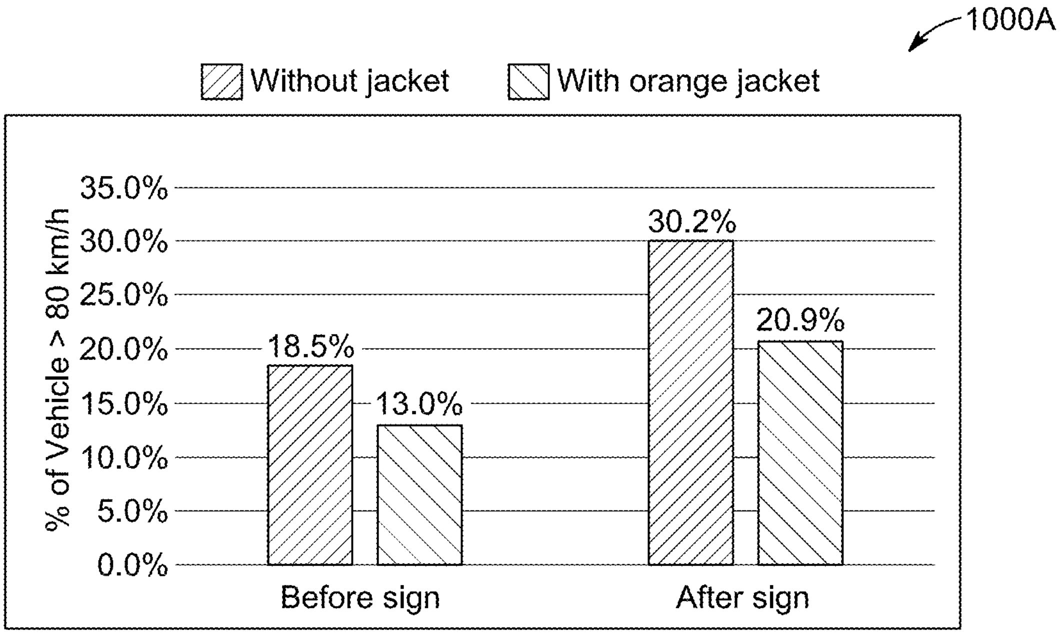
FIG. 10A is an exemplary graph representing effect of the orange jacket on speed-limit sign during the day (before and after the sign), for testing of the traffic sign add-on at a first site, according to certain embodiments.
Figure 10B:
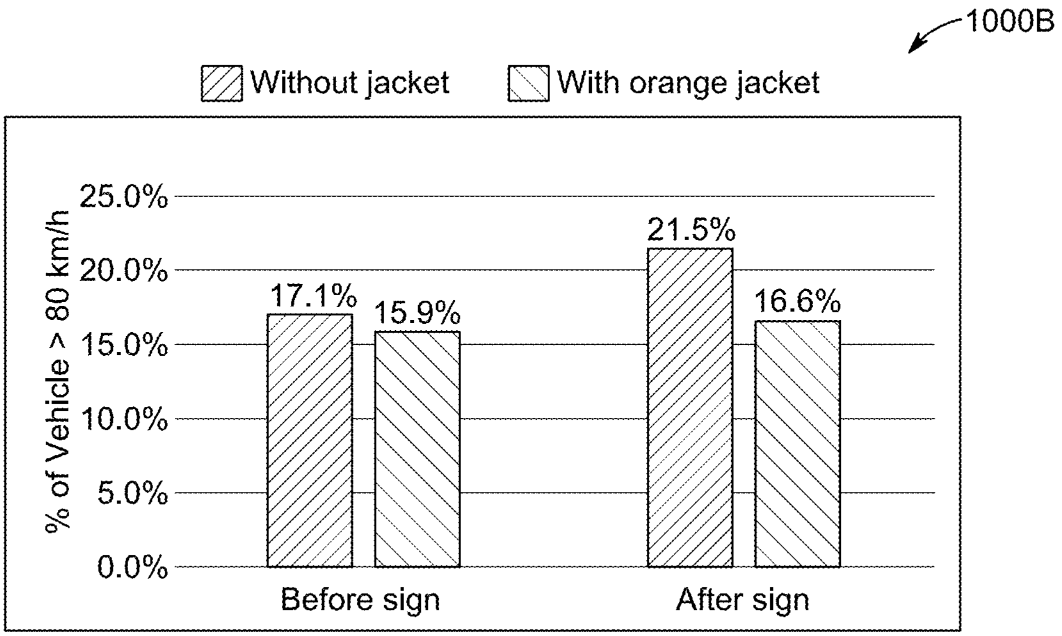
FIG. 10B is an exemplary graph representing effect of the orange jacket on speed-limit sign during the night (before and after the sign), for testing of the traffic sign add-on at a first site, according to certain embodiments.
Figure 10C:
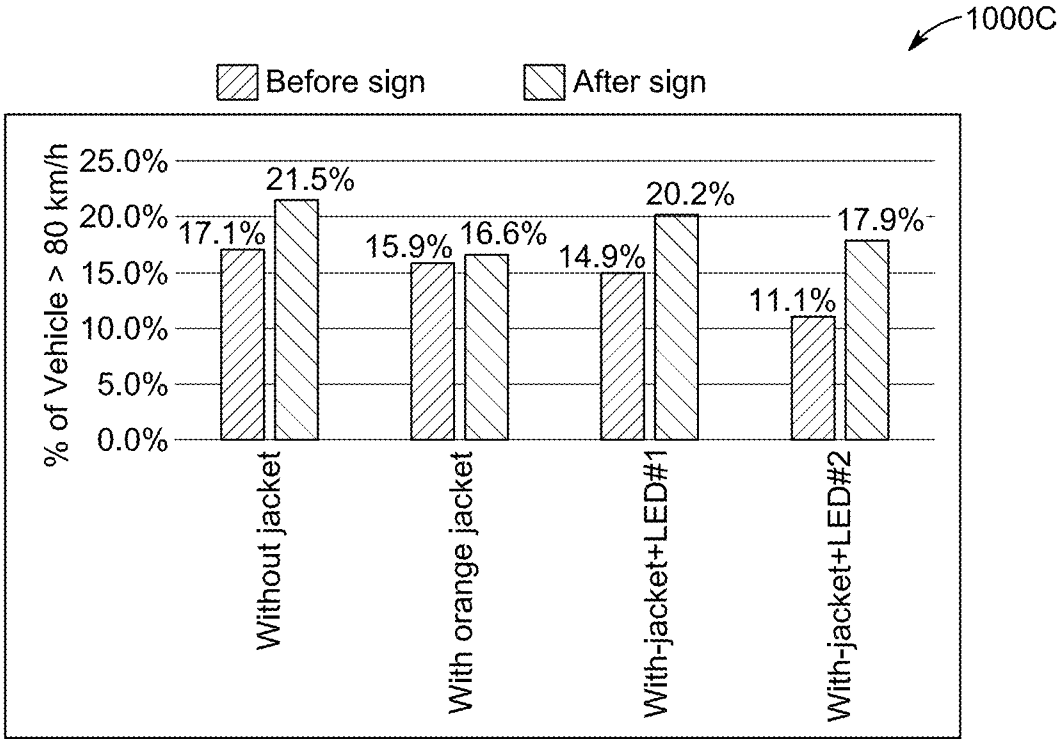
FIG. 10C is an exemplary graph representing effect of the LED on the effectiveness of the orange jacket on speed-limit sign during the night (before and after the sign), for testing of the traffic sign add-on at a first site, according to certain embodiments.
Figure 10D:
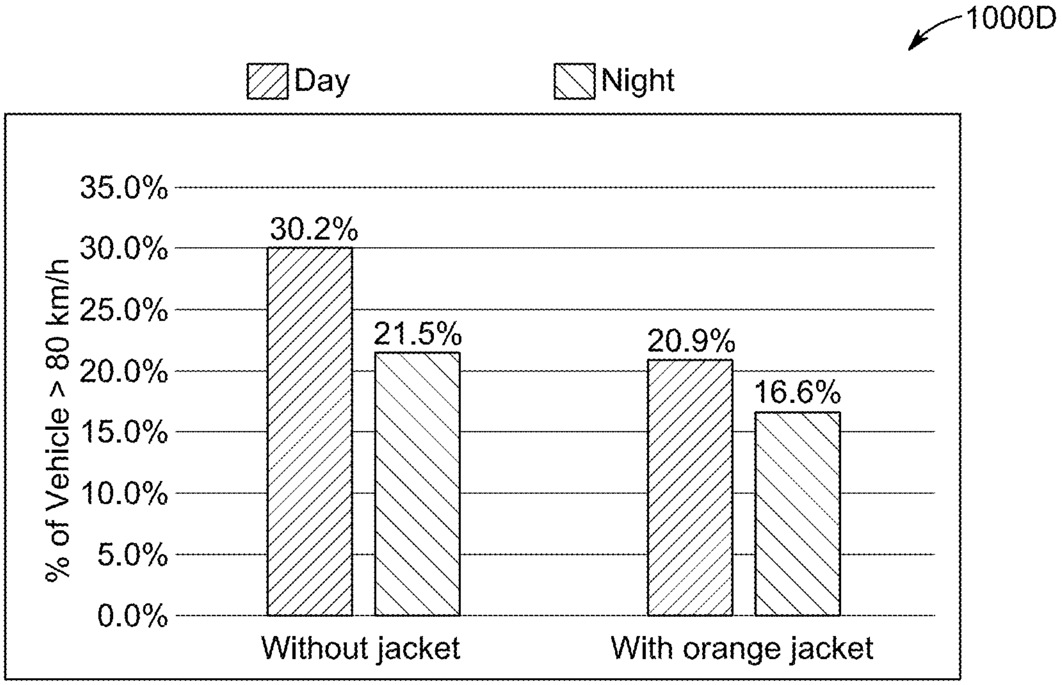
FIG. 10D is an exemplary graph representing effect of the orange jacket on speed-limit sign (after the sign), for testing of the traffic sign add-on at a first site, according to certain embodiments.

FIG. 10A provides a graph 1000A presenting the percent of vehicles exceeding the speed limit during the day. The data was taken before and after the sign. After adding the orange jacket there is a slight decrease in speed limit violation; however, drivers tend to speed up immediately after the sign. FIG. 10B provides a graph 1000B presenting the percent of vehicles exceeding the speed limit during the night. After adding the orange jacket there is a slight increase in compliance before and after the sign; however, the jacket could use LEDs to be more visible. FIG. 10C provides a graph 1000C presenting the percent of vehicles exceeding the speed limit during the night with the LEDs. The data was taken before and after the sign. After adding the LEDs with jacket there is a decrease in speed limit violation before and after the sign. FIG. 10D provides a graph 1000D presenting the percent of vehicles exceeding the speed limit during the day and night for orange jacket. The comparison was taken after the sign. During the day and after adding the orange jacket, there is a decrease in speed limit violation compared to the night.

Figure 11A:
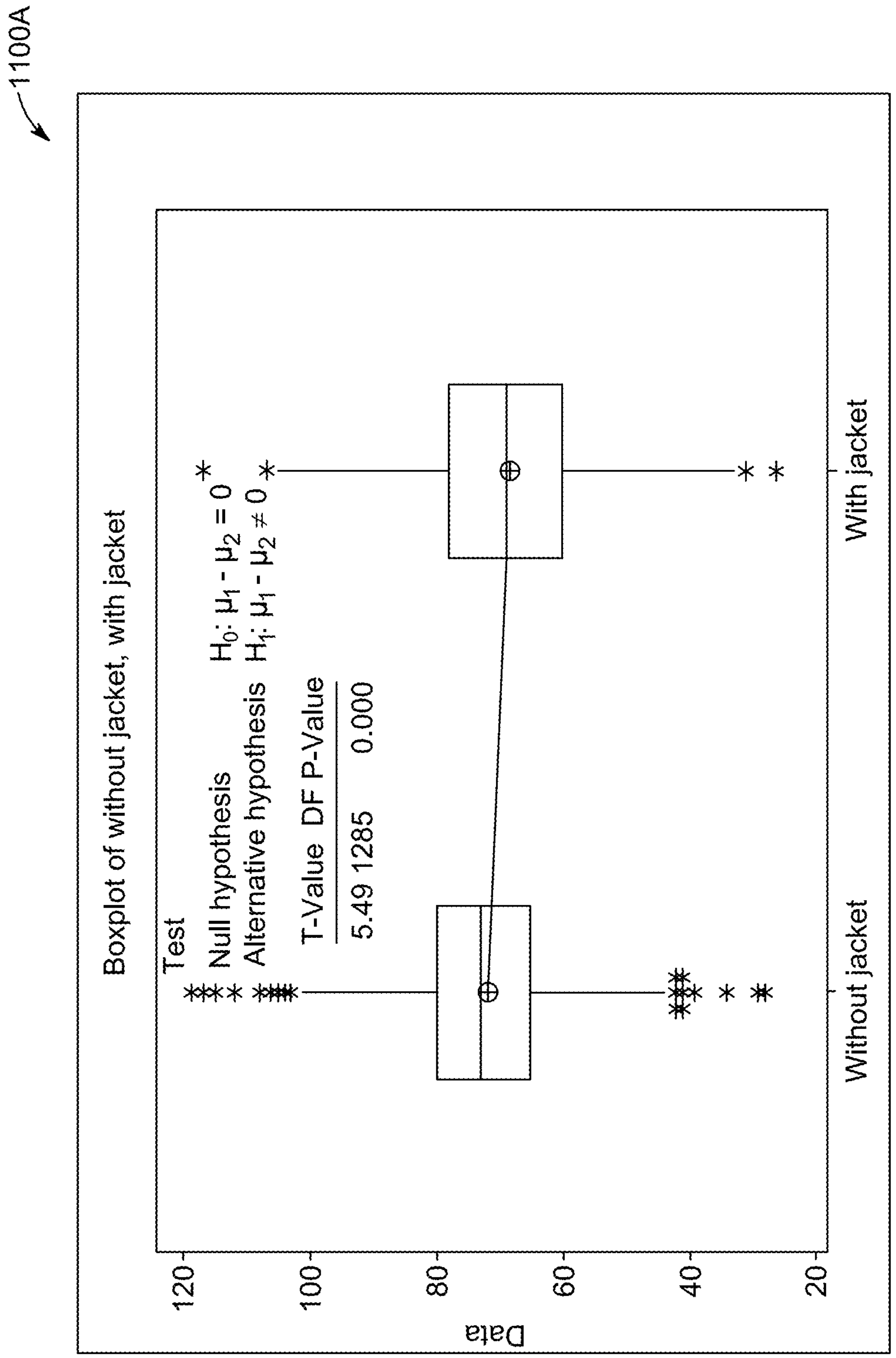
FIG. 11A is an exemplary graph representing effect of the orange jacket on the average speed during the day, for testing of the traffic sign add-on at a first site, according to certain embodiments.
Figure 11B:
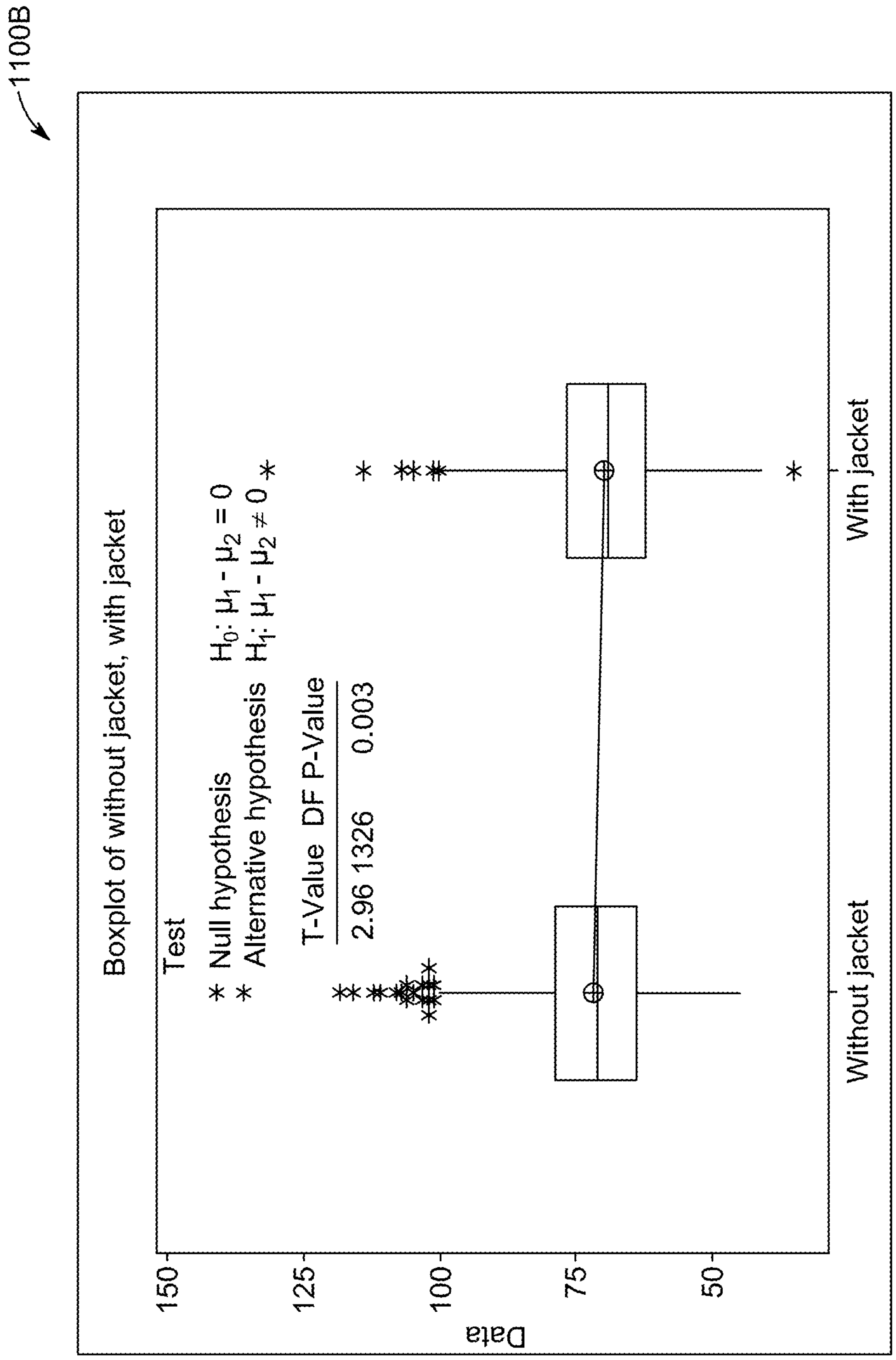
FIG. 11B is an exemplary graph representing effect of the orange jacket on the average speed during the night, for testing of the traffic sign add-on at a first site, according to certain embodiments.
Figure 11C:
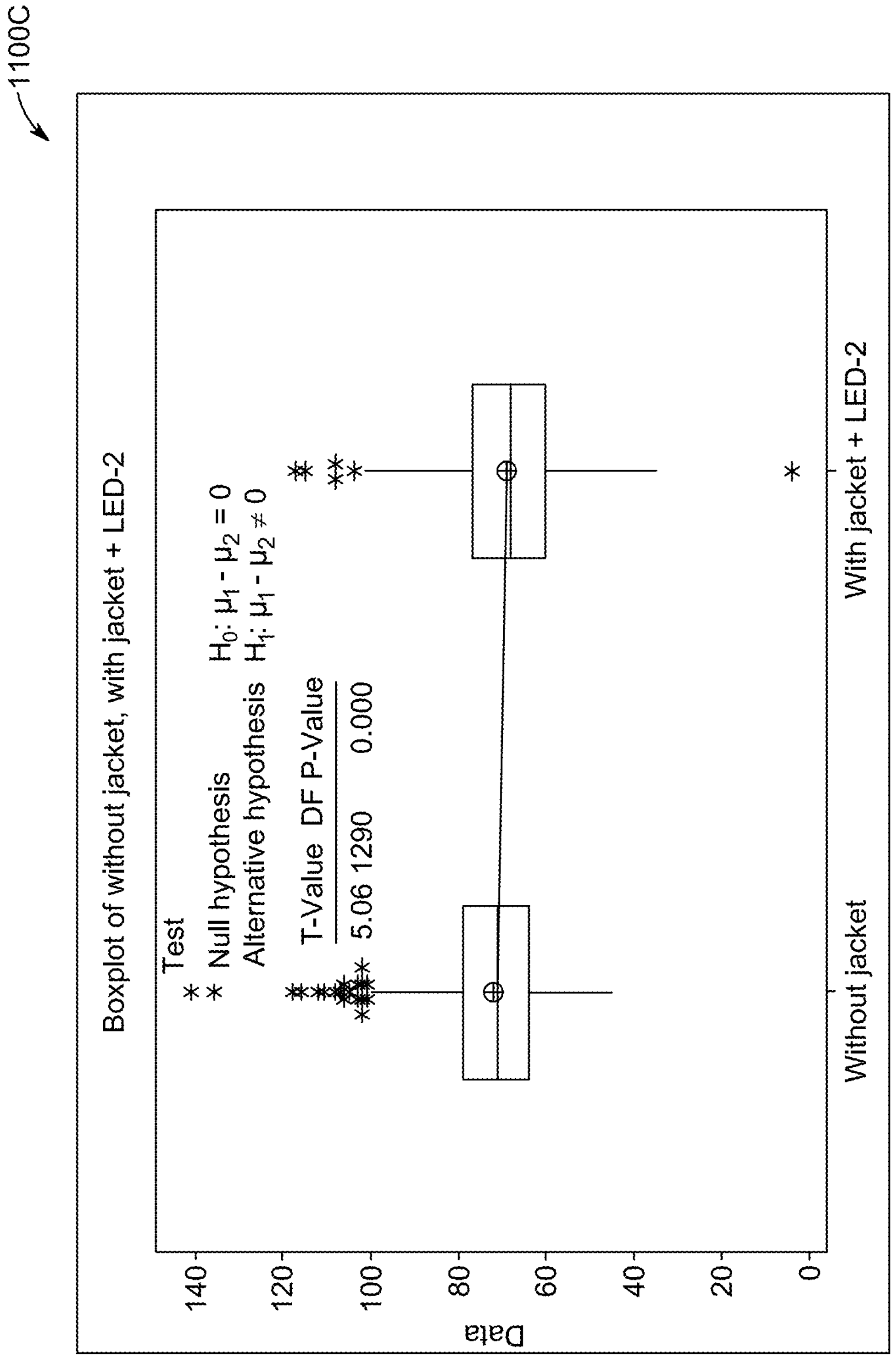
FIG. 11C is an exemplary graph representing comparison of the effect of the LED twinkle sequence with the LED twinkle sequence on average speeds during the night, for testing of the traffic sign add-on at a first site, according to certain embodiments.

FIG. 11A provides a graph 1100A which represents the statistical analysis between two cases (with and without jacket) during the day. With the orange jacket the number of vehicles exceeding the speed limit was minimized. A p-value<0.05 indicates that there is a statistically significant difference in the average speed between the two groups of data. FIG. 11B provides a graph 1100B presenting same observation as made in the graph 1100A of FIG. 11A, but during the night. FIG. 11C provides a graph 1100C which represents the statistical analysis between two variables (with jacket+LED #2 and without jacket). With the orange jacket the number of vehicles exceeding the speed limit was minimized. A p-value<0.05 gives indicates that there is a statistically significant difference in the average speed between the two data groups.

Second Site in AlSahely (Orange Jacket)

Table 10 shows that with the jacket, there is a decrease in average speed by 1.8 km/h during the day. There is a sharp decrease in speed by 6.8 km/h at night with the jacket. These observations are from data collected before the sign. There is a change in the average speed between the cases with jacket only and with jacket+LED. The use of the LED showed some level of decrease in average speed after the sign.

TABLE 10

| Comparison of Average Speed with and without a Jacket (Day and Night) | | | | |
|---|---|---|---|---|
| Average | Before the sign | | After the sign | |
| Speed ± SD | Day | Night | Day | Night |
| Without Jacket | 80.81 ± 8.83 | 81.69 ± 9.04 | 80.76 ± 8.80 | 83.25 ± 8.52 |
| With Jacket | 78.98 ± 8.69 | 74.87 ± 8.85 | 78.18 ± 7.94 | 81.58 ± 9.63 |
| With Jacket + LED #1 | NA | 75.95 ± 8.99 | NA | 80.75 ± 9.40 |
| With Jacket + LED #2 | NA | 74.97 ± 8.36 | NA | 78.59 ± 8.41 |

Figure 12A:
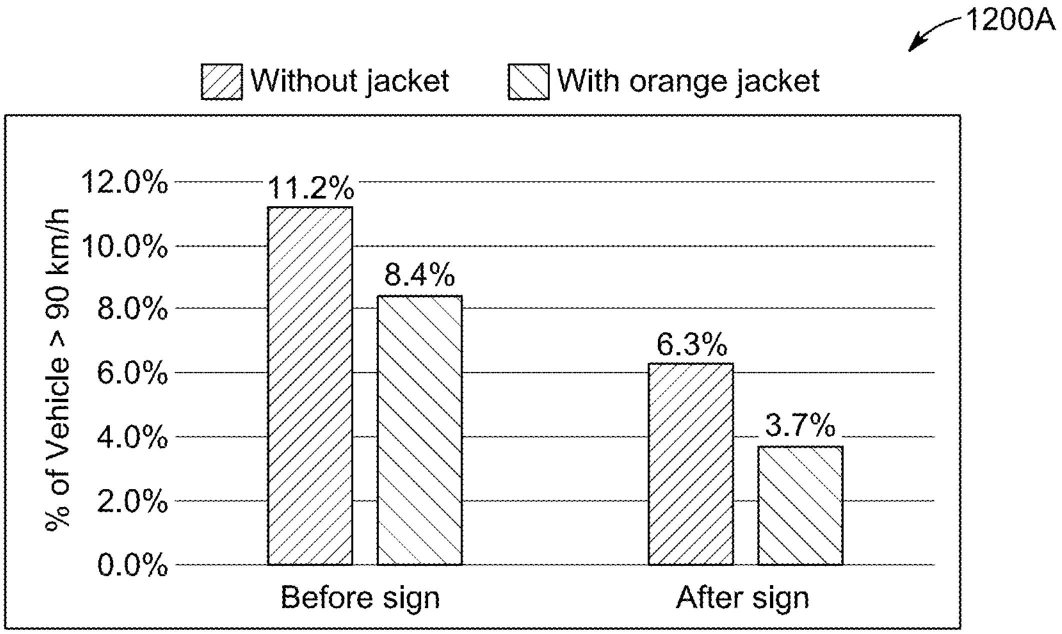
FIG. 12A is an exemplary graph representing effect of the orange jacket on speed-limit sign during the day (before and after the sign), for testing of the traffic sign add-on at a second site, according to certain embodiments.
Figure 12B:
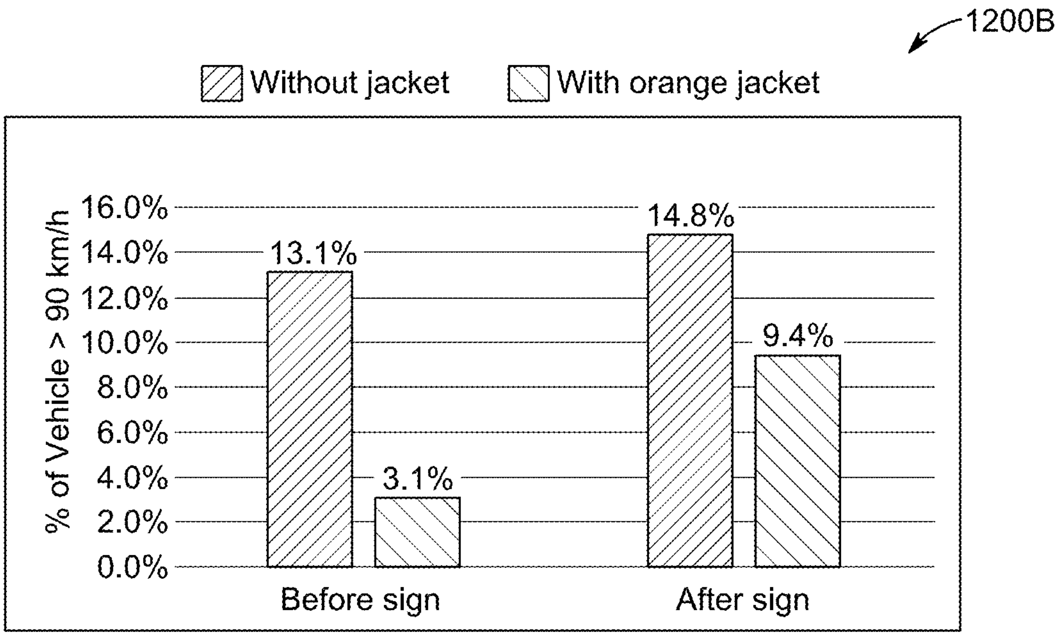
FIG. 12B is an exemplary graph representing effect of the orange jacket on speed-limit sign during the night (before and after the sign), for testing of the traffic sign add-on at a second site, according to certain embodiments.
Figure 12C:
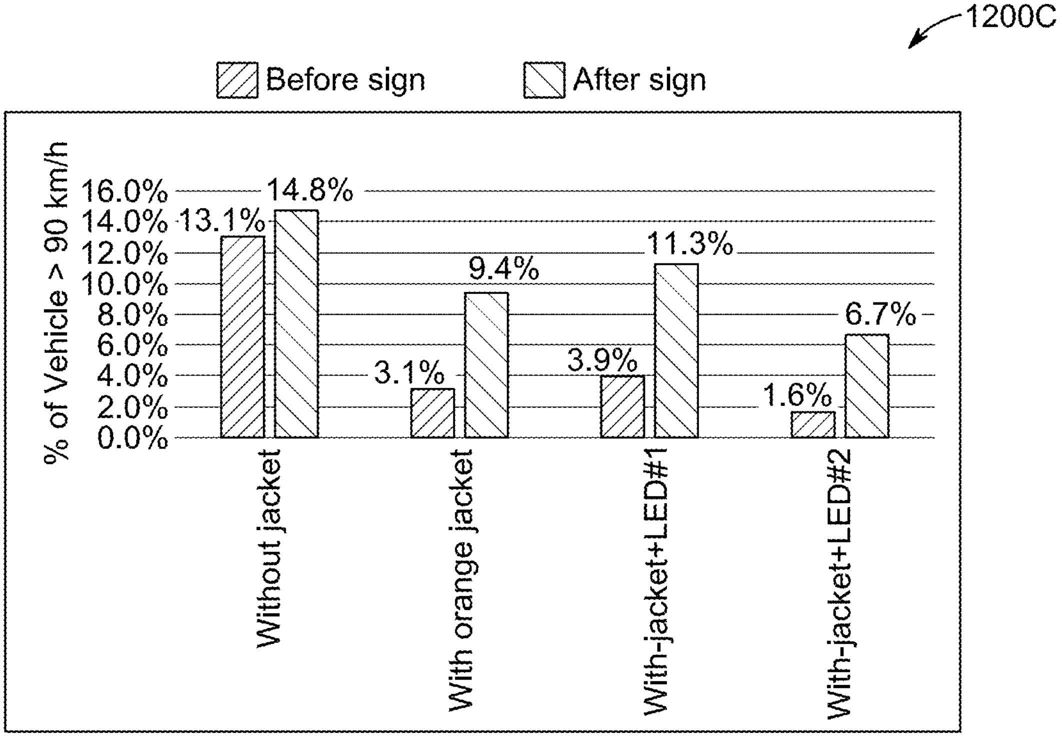
FIG. 12C is an exemplary graph representing effect of the LED on the effectiveness of the orange jacket on speed-limit sign during the night (before and after the sign), for testing of the traffic sign add-on at a second site, according to certain embodiments.
Figure 12D:
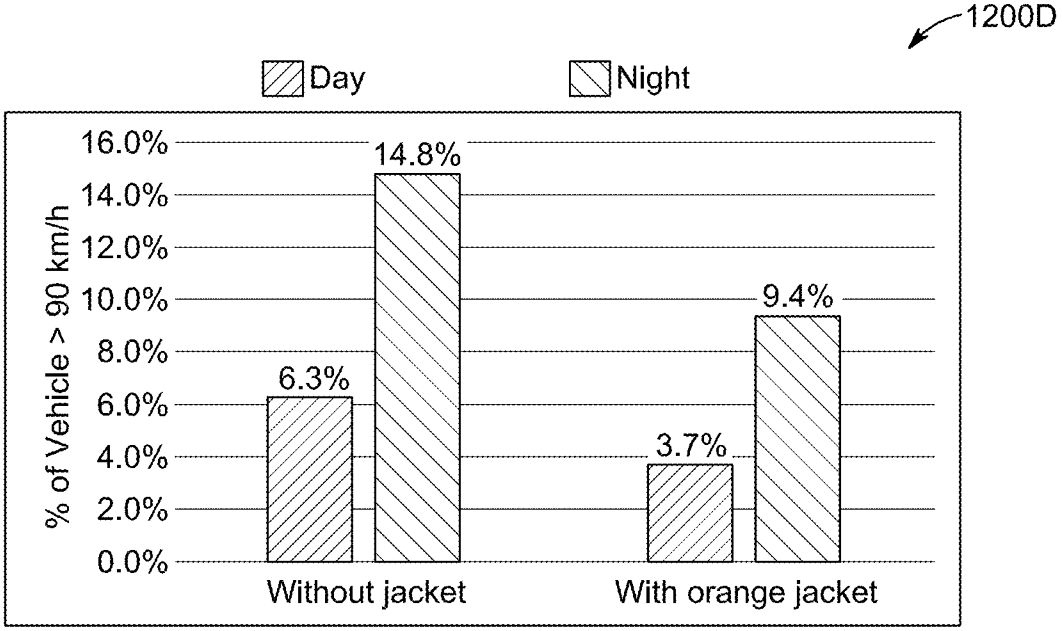
FIG. 12D is an exemplary graph representing effect of the orange jacket on speed-limit sign (after the sign), for testing of the traffic sign add-on at a second site, according to certain embodiments.

FIG. 12A provides a graph 1200A presenting the percent of vehicles exceeding the speed limit during the day for the orange jacket. The data was taken before and after the sign. There is a reduction in the number of vehicles exceeding the speed limit before and after the sign when the orange jacket was attached to the sign. FIG. 12B provides a graph 1200B presenting the percent of vehicles exceeding the speed limit during the night. There is drop the percentage of vehicles violating the speed limit by 75% (from 13.1% to 3.1%). This trend of reduction in the number of vehicles exceeding limit was observed before and after the sign when the jacket is fixed to the sign. The level of reduction is lower after the sign. FIG. 12C provides a graph 1200C presenting the percent of vehicles exceeding the speed limit sign during the night. The data was taken before and after the sign. As shown, the speed limit sign with no jacket has a lower percentage of vehicles exceeding the speed compared to a jacket only. The orange jacket+LED #1 and the orange+LED #2 leads to a decrease in speed limit violation compared to the speed limit sign without the jacket and with orange jacket. FIG. 12D provides a graph 1200D presenting the percent of vehicles exceeding the speed limit during the day and night for the orange jacket. There is a reduction in number of vehicles exceeding limit the sign when the orange jacket was attached to the sign both during the day and night.

Figure 13A:
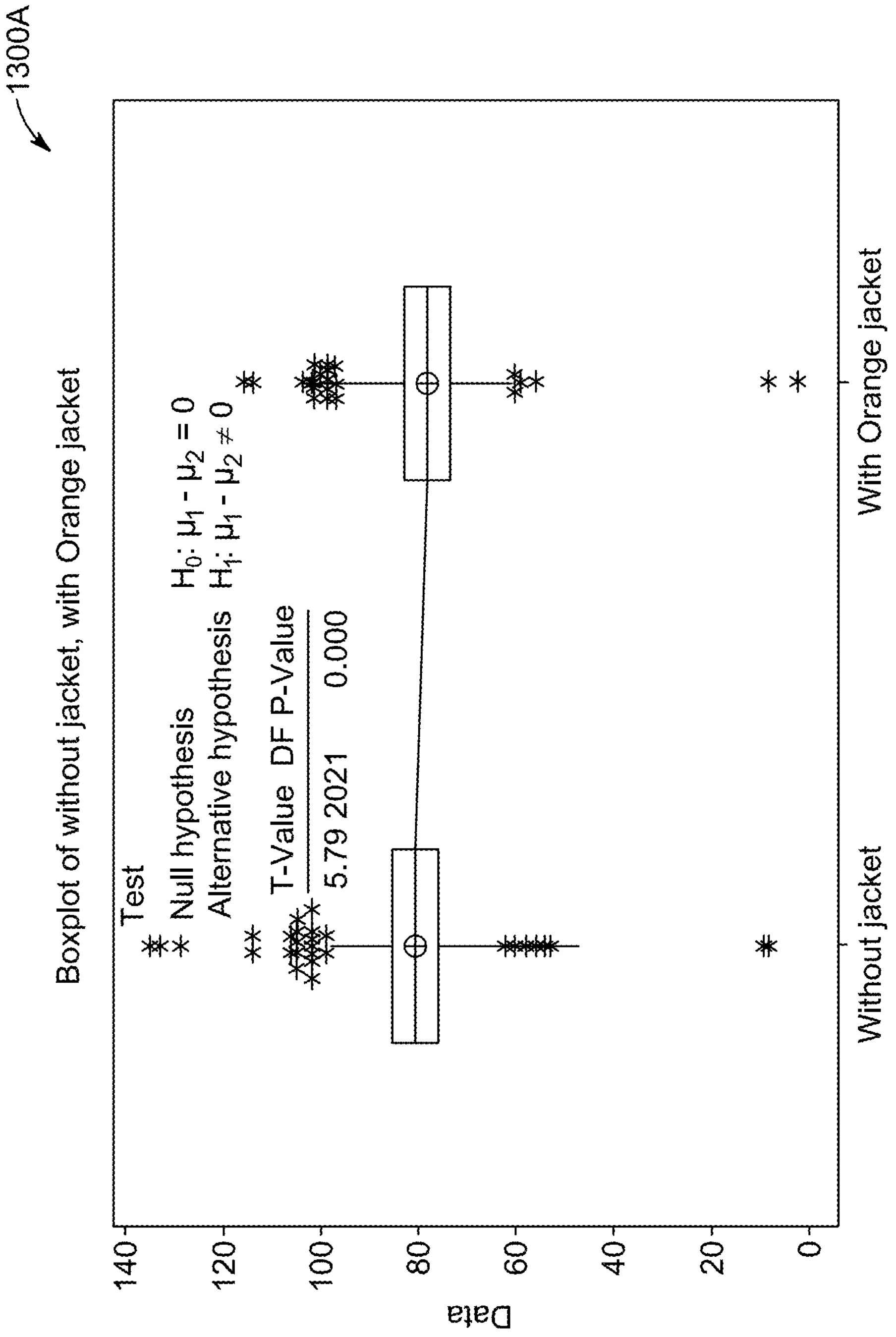
FIG. 13A is an exemplary graph representing effect of the orange jacket on the average speed during the day, for testing of the traffic sign add-on at a second site, according to certain embodiments.
Figure 13B:
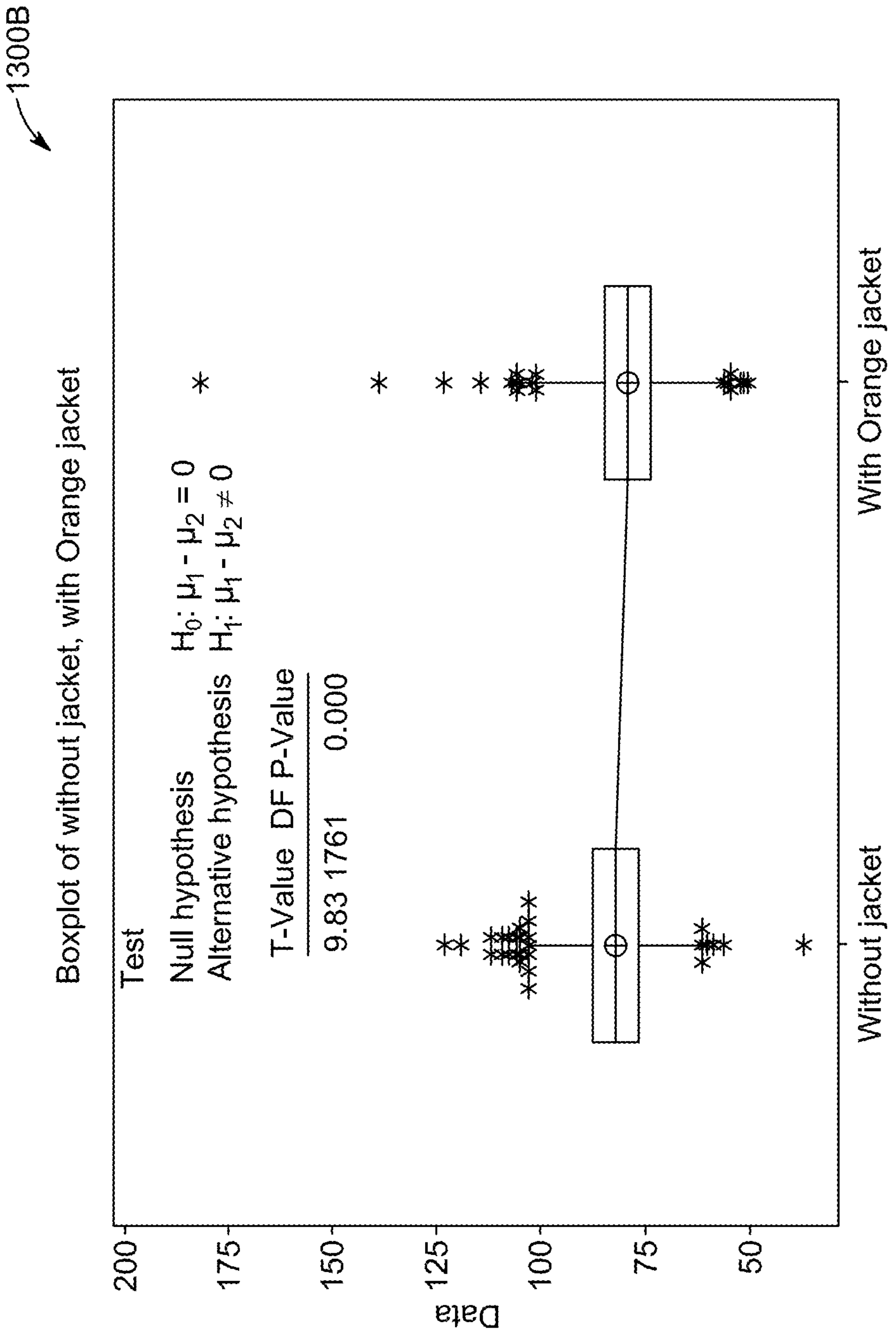
FIG. 13B is an exemplary graph representing effect of the orange jacket on the average speed during the night, for testing of the traffic sign add-on at a second site, according to certain embodiments.
Figure 13C:
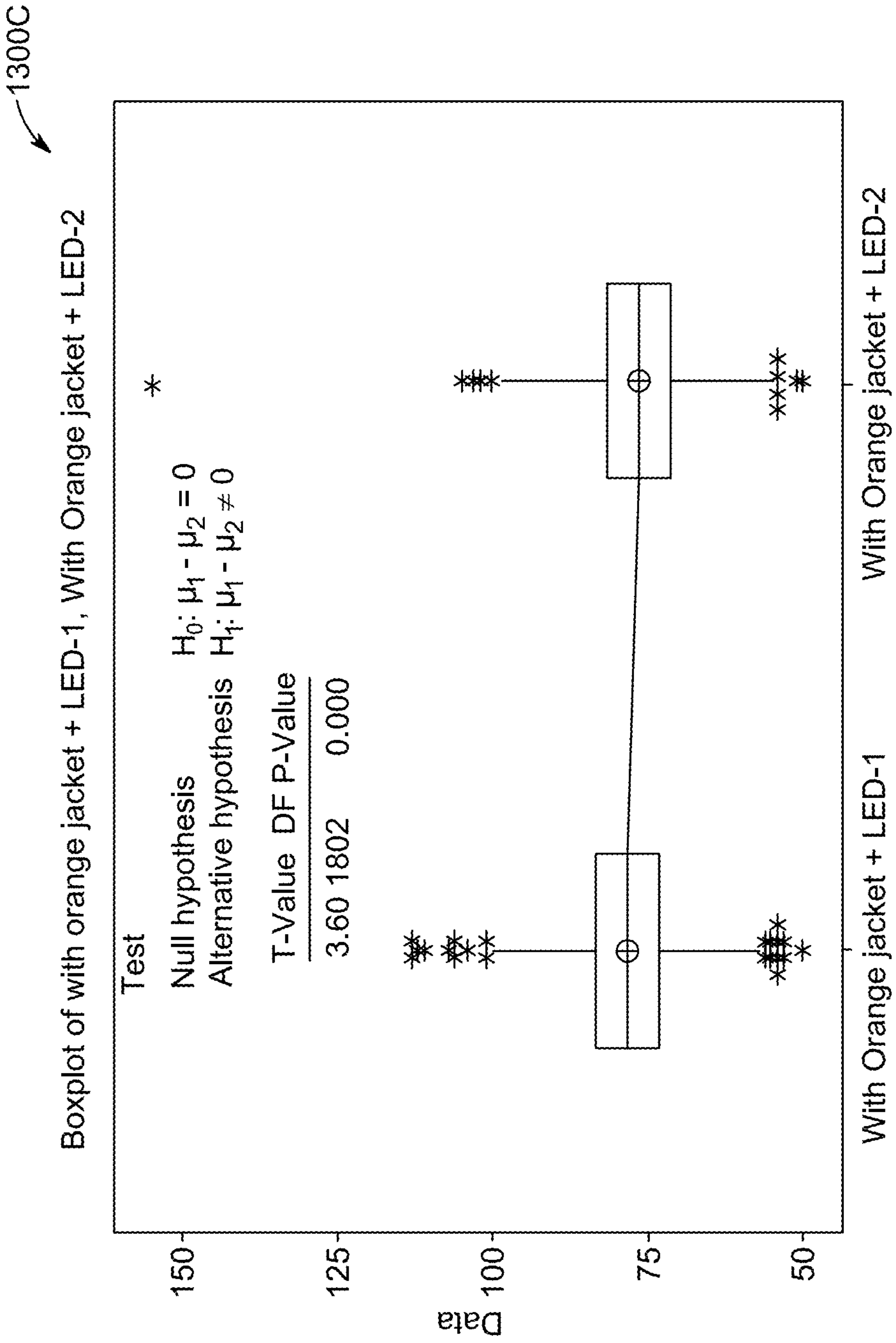
FIG. 13C is an exemplary graph representing comparison of the effect of the LED fixed sequence with the LED twinkle sequence on average speeds during the night, for testing of the traffic sign add-on at a second site, according to certain embodiments.

FIG. 13A provides a graph 1300A which represents the statistical analysis between two variables (with orange jacket and without jacket) during the night. The p-value is less than 5%, indicating that the observed difference in means between the two conditions is statistically significant. With the orange jacket, the number of vehicles exceeding the speed limit was minimized. FIG. 13B provides a graph 1300B presenting same observation as made in the graph 1300A of FIG. 13A, but during the night. FIG. 13C provides a graph 1300C which represents the statistical analysis between two scenarios (with orange jacket+LED #1 and orange jacket+LED #2) during the night. It can be observed that the p-value is less than 5%, indicating that the observed difference in mean between the two conditions is statistically significant. LED #2 has more effect on vehicles exceeding the speed limit.

First Site Al-Aziziah (Green Jacket vs. Orange Jacket)

Figure 14A:
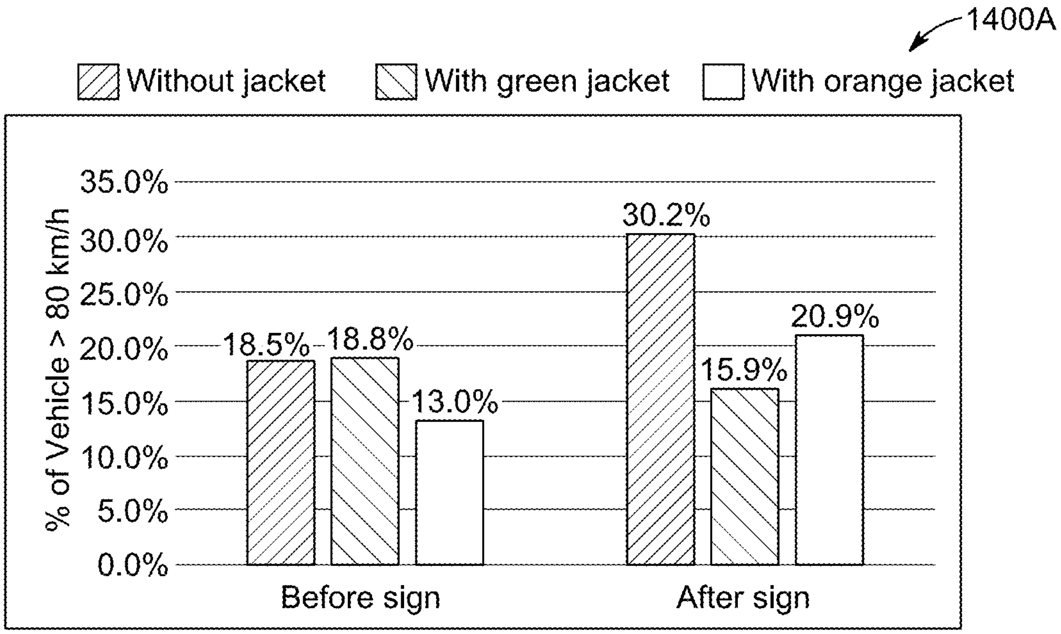
FIG. 14A is an exemplary graph representing comparison between the orange jacket and the green jacket during the day, for testing of the traffic sign add-on at a first site, according to certain embodiments.
Figure 14B:
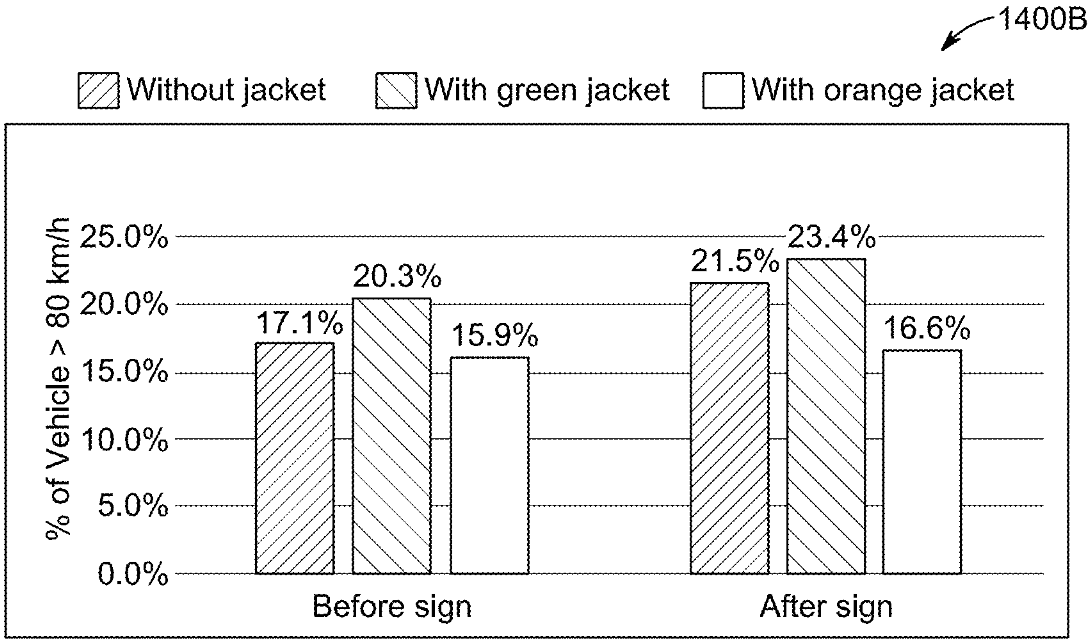
FIG. 14B is an exemplary graph representing comparison between the orange jacket and the green jacket during the night, for testing of the traffic sign add-on at a first site, according to certain embodiments.
Figure 14C:
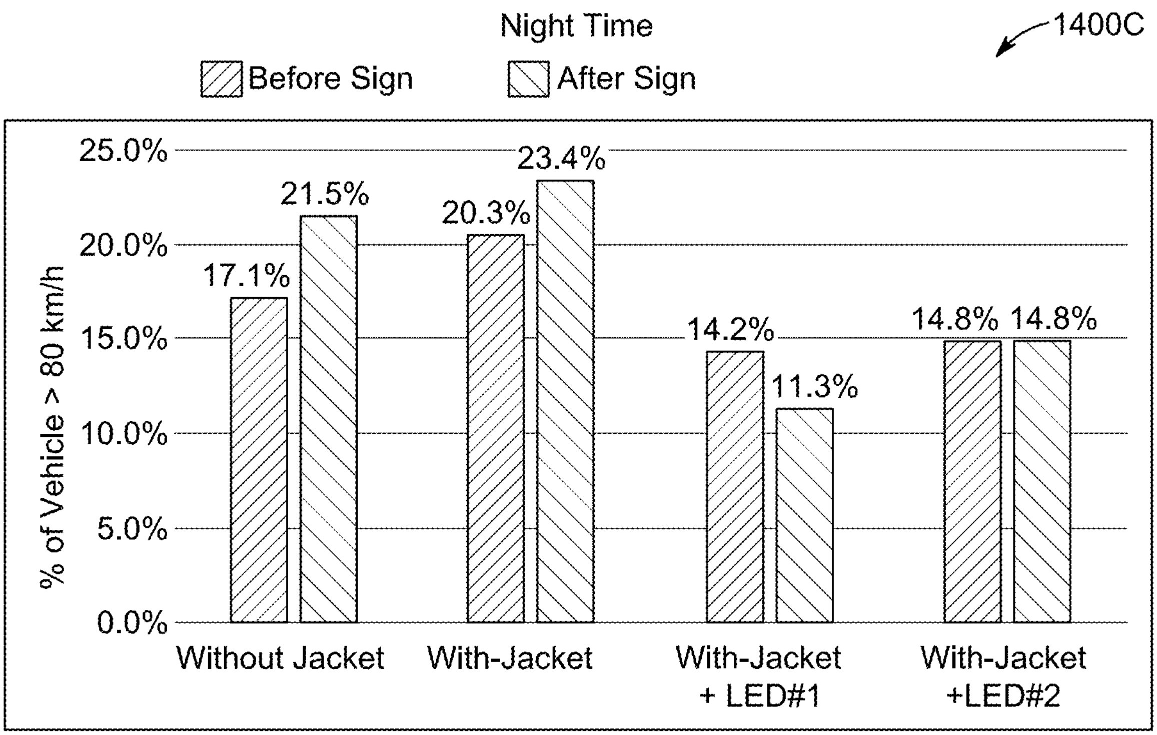
FIG. 14C is an exemplary graph representing effectiveness of LED with the green jacket during the night, for testing of the traffic sign add-on at a first site, according to certain embodiments.
Figure 14D:
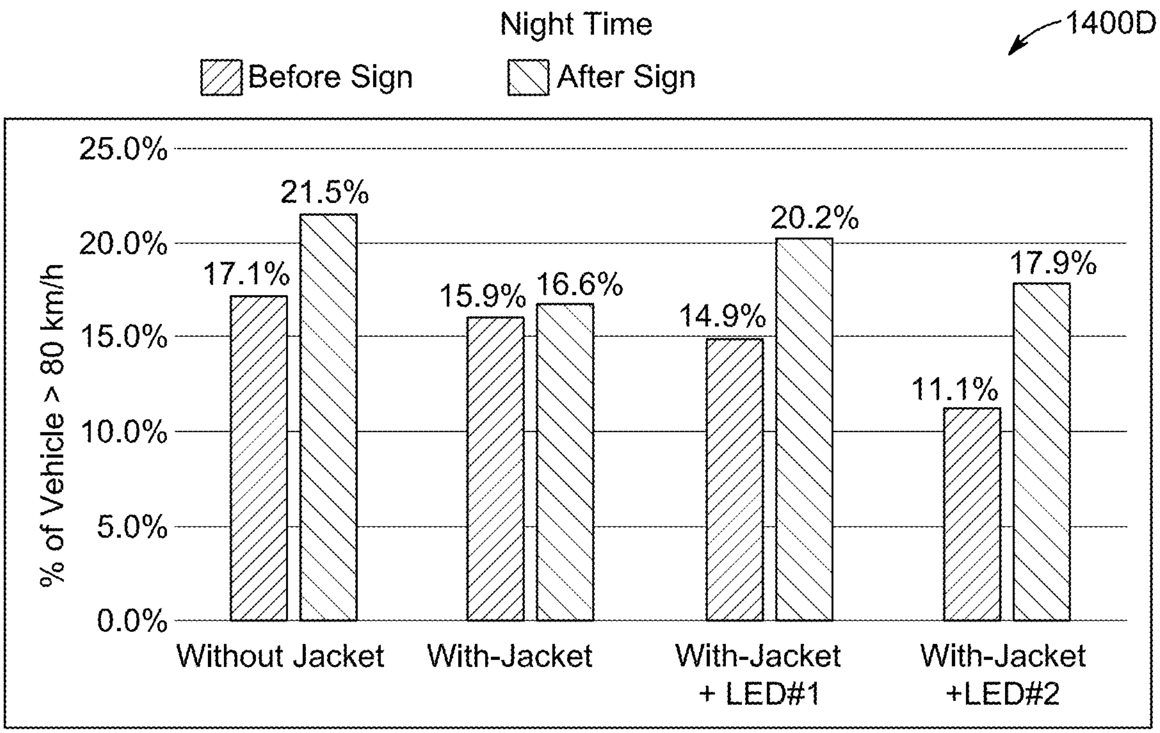
FIG. 14D is an exemplary graph representing effectiveness of LED with the orange jacket during the night, for testing of the traffic sign add-on at a first site, according to certain embodiments.
Figure 14E:
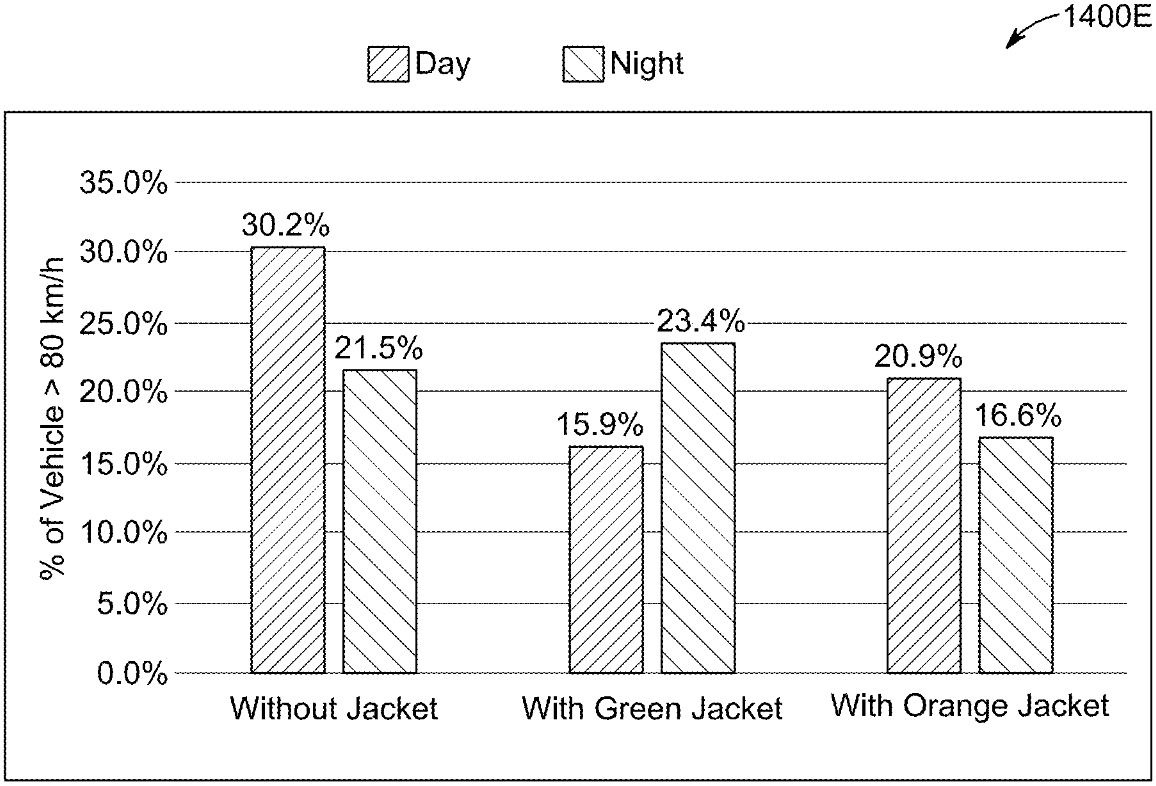
FIG. 14E is an exemplary graph representing comparison between the orange jacket and the green jacket (after the sign), for testing of the traffic sign add-on at a first site, according to certain embodiments.

FIG. 14A provides a graph 1400A presenting a comparison in the percent of vehicles exceeding the speed limit for the various jackets (none, green, and orange) during the day. The comparison was made before and after the sign between the two colors. Based on these results, it is not clear which jacket color is better during the day. FIG. 14B provides a graph 1400B presenting the percent of vehicles exceeding the speed limit sign during the night. The comparison was taken before and after the sign between the two colors. There is no reduction in the number of vehicles exceeding the limit for the green color jacket. The orange color jacket showed higher impact in reducing the violation levels. FIGS. 14C and 14D provide graphs 1400C and 1400D, respectively, presenting the percentage of vehicles exceeding the speed limit sign during the night with the green jacket and the orange jacket, respectively. The comparison was taken before and after the sign between the two colors with LEDs. After adding the LEDs with the two colors there is a decrease violation to the sign, supporting that LEDs increase speed limit sign visibility to drivers. FIG. 14E provides a graph 1400E presenting the percentage of vehicles exceeding the speed limit sign during the day and night. The comparison was made after the sign between the two colors. During the day there is a higher decrease in violation with the green jacket. During the night there is a higher decrease in violation in the case of the orange color jacket.

Second Site at AlSahely (Green Jacket vs. Orange Jacket)

Figure 15A:
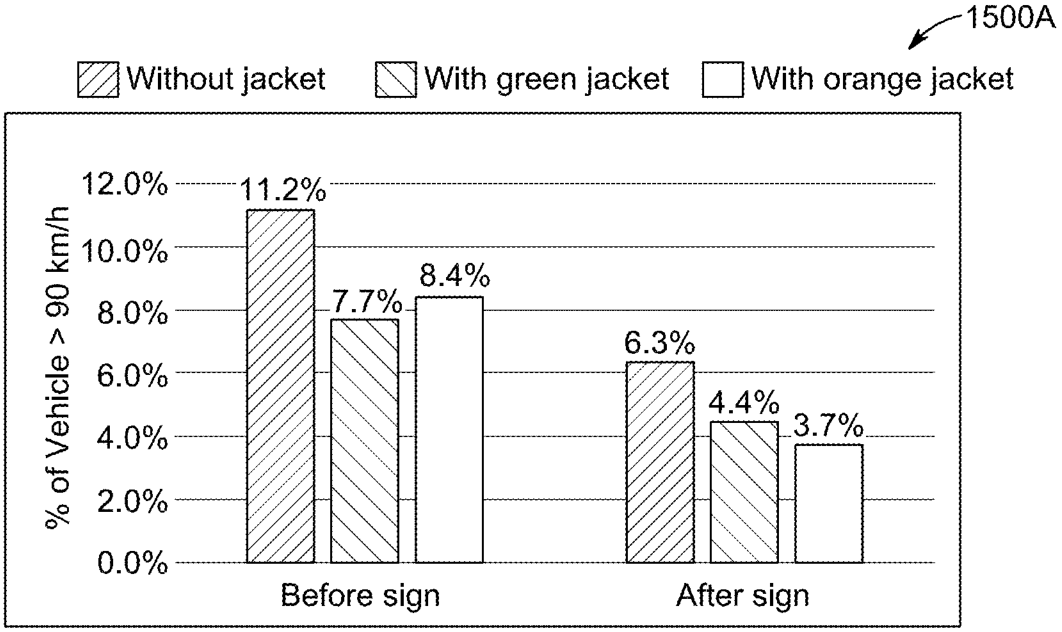
FIG. 15A is an exemplary graph representing comparison between the orange jacket and the green jacket during the day, for testing of the traffic sign add-on at a second site, according to certain embodiments.
Figure 15B:
FIG. 15B is an exemplary graph representing comparison between the orange jacket and the green jacket during the night, for testing of the traffic sign add-on at a second site, according to certain embodiments.
Figure 15C:
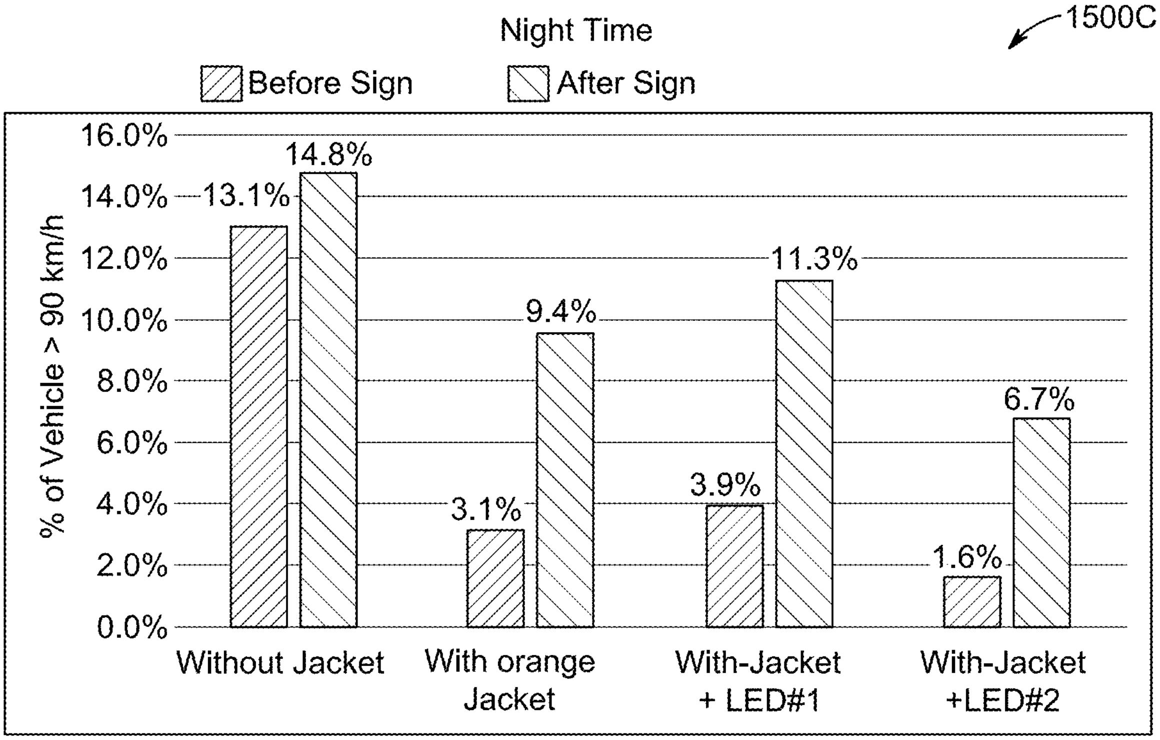
FIG. 15C is an exemplary graph representing effectiveness of LED with the orange jacket during the night, for testing of the traffic sign add-on at a second site, according to certain embodiments.
Figure 15D:
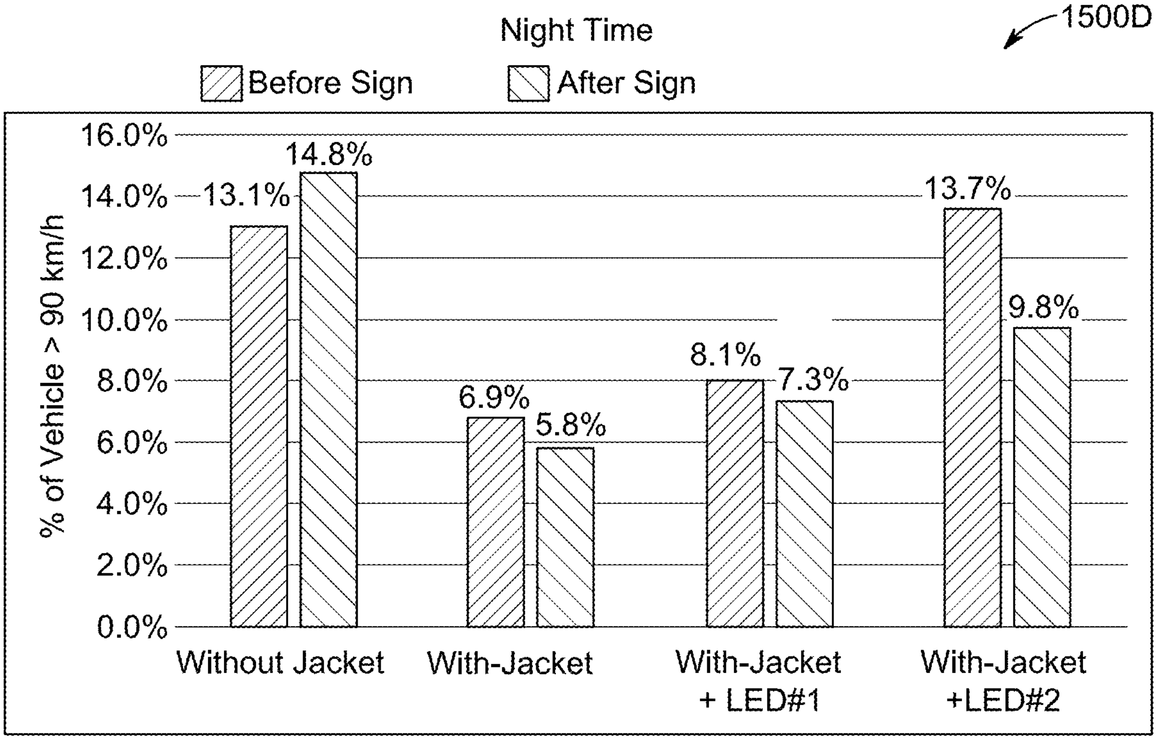
FIG. 15D is an exemplary graph representing effectiveness of LED with the green jacket during the night, for testing of the traffic sign add-on at a second site, according to certain embodiments.
Figure 15E:
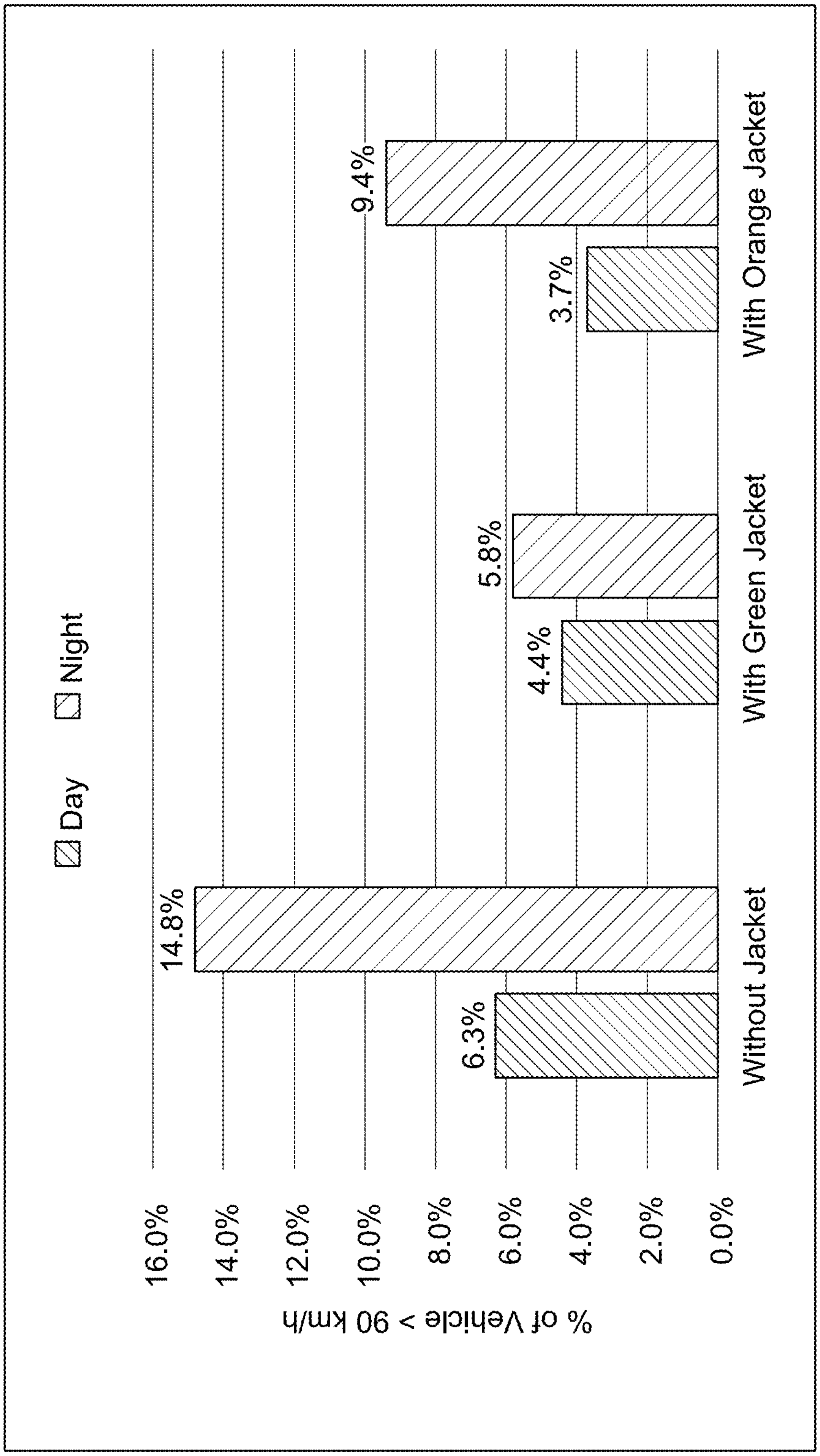
FIG. 15E is an exemplary graph representing comparison between the orange jacket and the green jacket (after the sign), for testing of the traffic sign add-on at a second site, according to certain embodiments.

FIG. 15A provides a graph 1500A presenting the percent of vehicles exceeding the speed limit during the day. The comparison was made before and after the sign between the two colors (green and orange) at the second site. There is a reduction in the number of vehicles exceeding the speed limit in the case of the two colors. FIG. 15B provides a graph 1500B presenting the percent of vehicles exceeding the speed limit sign during the night. The comparison was taken before and after the sign between the two colors. After the sign, the green jacket has a greater reduction in the percent of violations than the orange jacket. FIGS. 15C and 15D provide graphs 1500C and 1500D, respectively, presenting the percent of vehicles exceeding the speed limit sign during the night for orange and green jackets, respectively. The comparison was taken before and after the sign between the two colors with LEDs. After adding the LEDs with the two colors there is a decrease in violation to the speed limit sign. It is seen that the LEDs increase visibility to the drivers. FIG. 15E provides a graph 1500E presenting the percent of vehicles exceeding the speed limit sign during the day and night. The comparison was taken after the sign between the two colors. During the day and night there is a decrease in speed limit violations with the two colors.

Effectiveness of Intervention in Stop Signs

First Site at Aljesar (Orange Jacket)

Figure 16A:
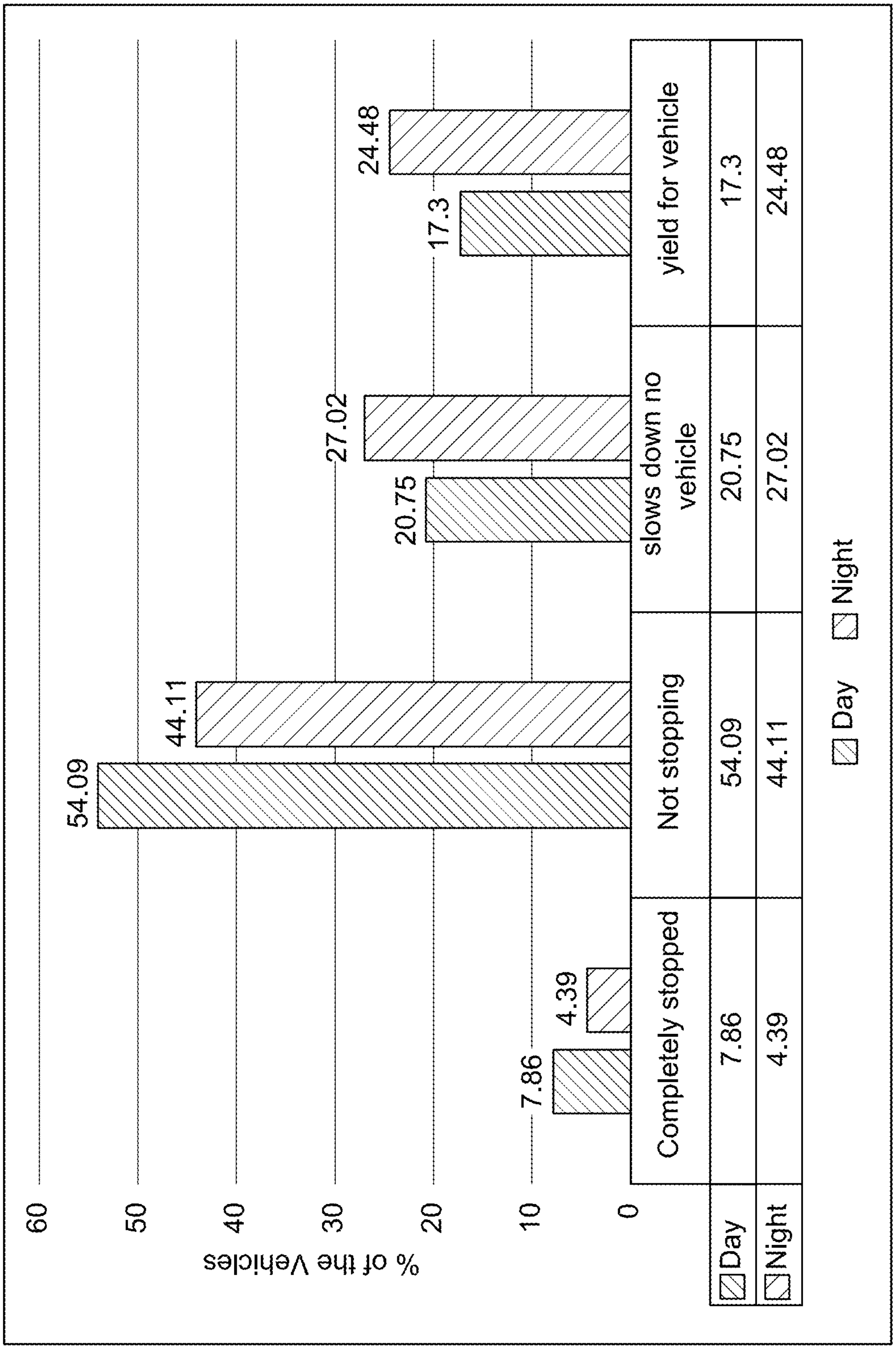
FIG. 16A is an exemplary graph representing percentage of the vehicles at each behavior (day and night), for testing of the traffic sign add-on adapted as the orange jacket at a first site, according to certain embodiments.
Figure 16B:
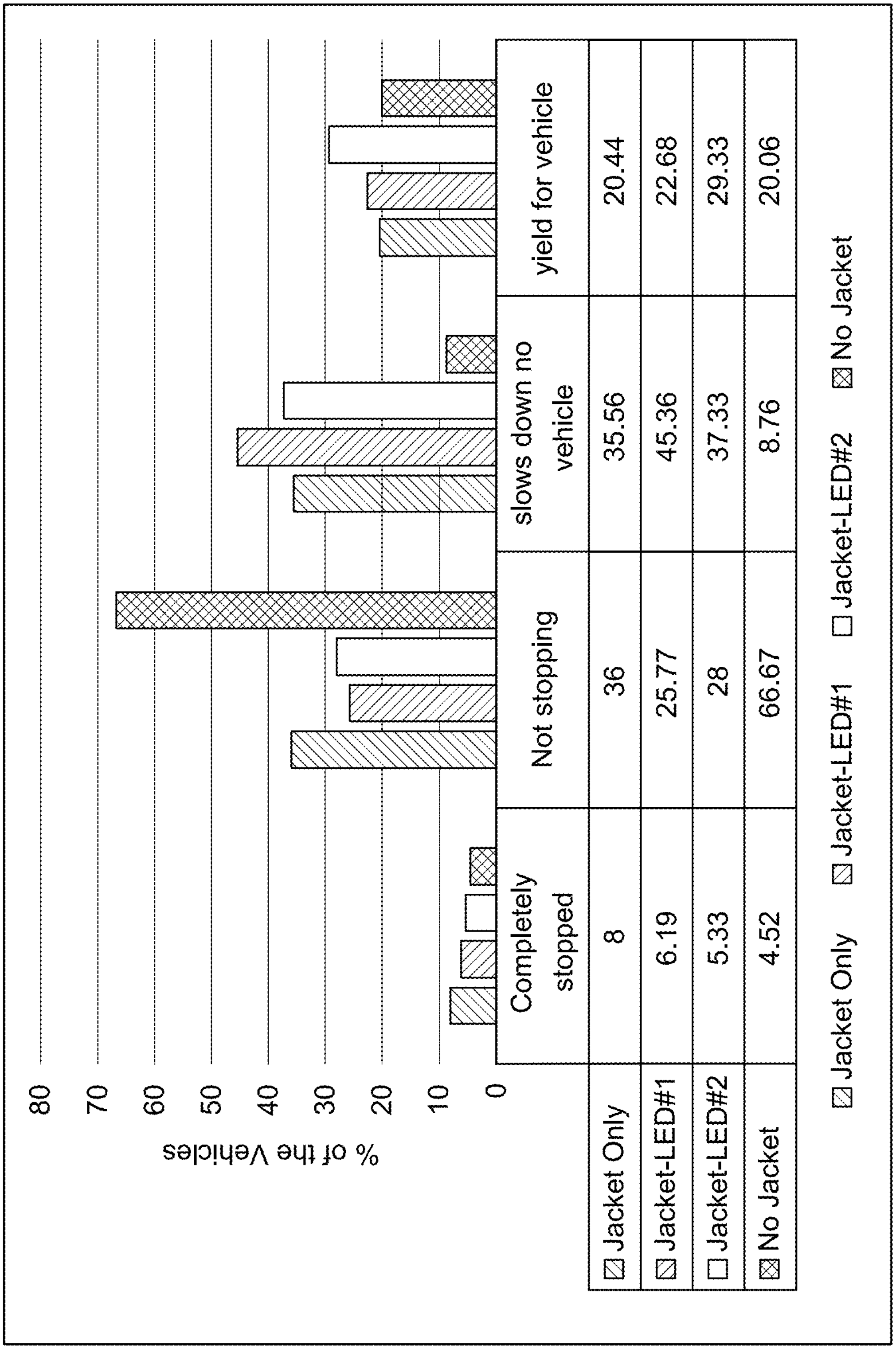
FIG. 16B is an exemplary graph representing percentage of the vehicles at different interventions in each behavior, for testing of the traffic sign add-on adapted as the orange jacket at a first site, according to certain embodiments.

FIG. 16A provides a graph 1600A presenting the behavior of drivers at stop signs during the day and night. During the day there was more commitment to stop signs than during the night. FIG. 16B provides a graph 1600B presenting the percent of vehicles completely stopping, not stopping, slowing down when no vehicles are around the site, and slowing down when vehicles are around the site with no jacket, with the orange jacket, with the orange jacket+LED #1, and with the orange jacket+LED #2. The completely stopped incidents increased by using the orange jacket and with the LEDs.

Second Site (Alfasaliah) (Orange Jacket)

Figure 17A:
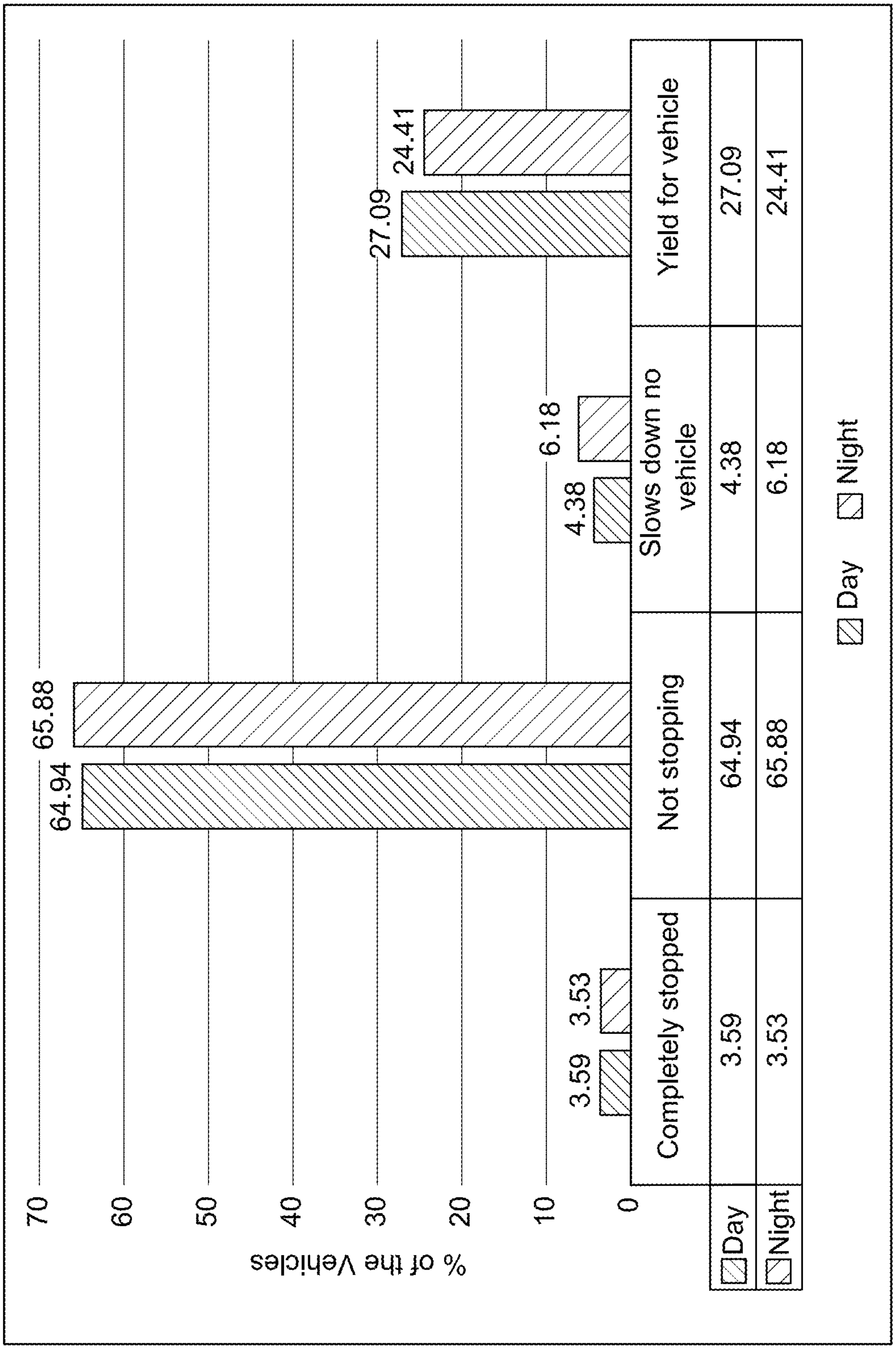
FIG. 17A is an exemplary graph representing percentage of the vehicles at each behavior (day and night), for testing of the traffic sign add-on adapted as the orange jacket at a second site, according to certain embodiments.
Figure 17B:
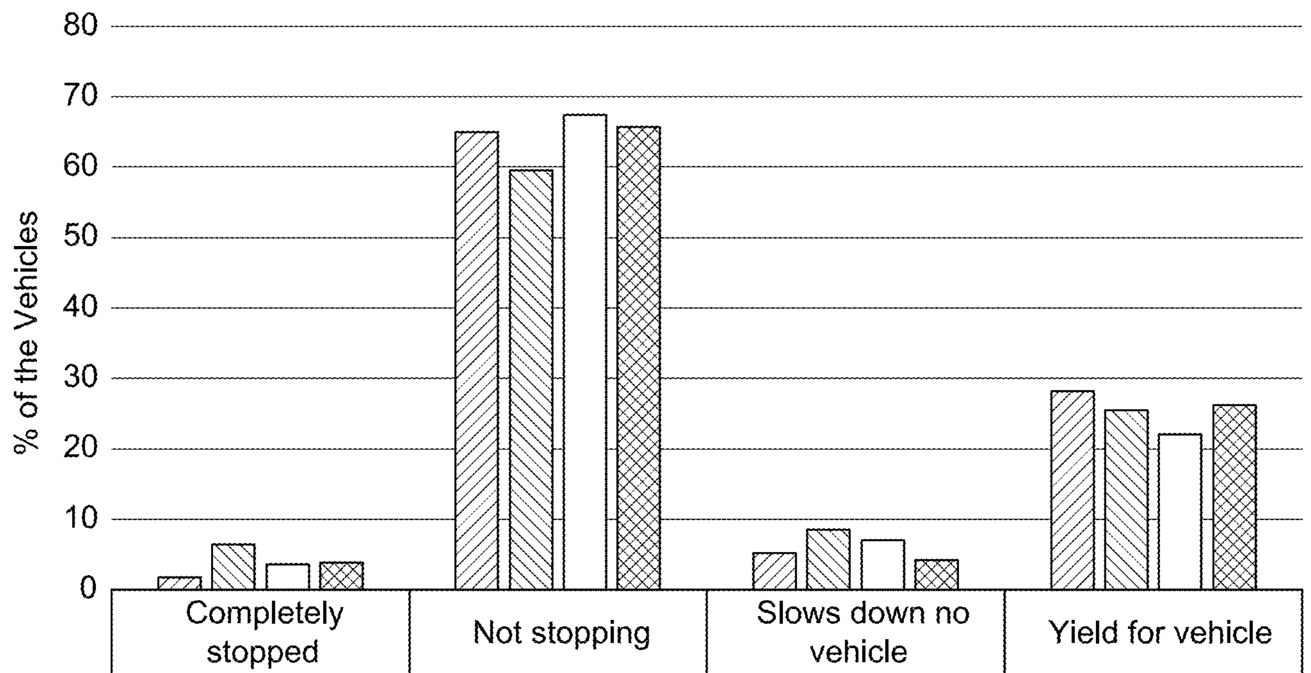
FIG. 17B is an exemplary graph representing percentage of the vehicles at different interventions in each behavior, for testing of the traffic sign add-on adapted as the orange jacket at a second site, according to certain embodiments.

FIG. 17A provides a graph 1700A presenting the behavior of drivers during the day and the night. During the day and night, the drivers have the same percentage of commitment to stop signs. FIG. 17B provides a graph 1700B presenting the percent of vehicles for different situation with different behavior. Incidents of complete stops have increased by using the orange jacket with the LEDs.

First Site at Aljesar (Green Jacket)

Figure 18A:
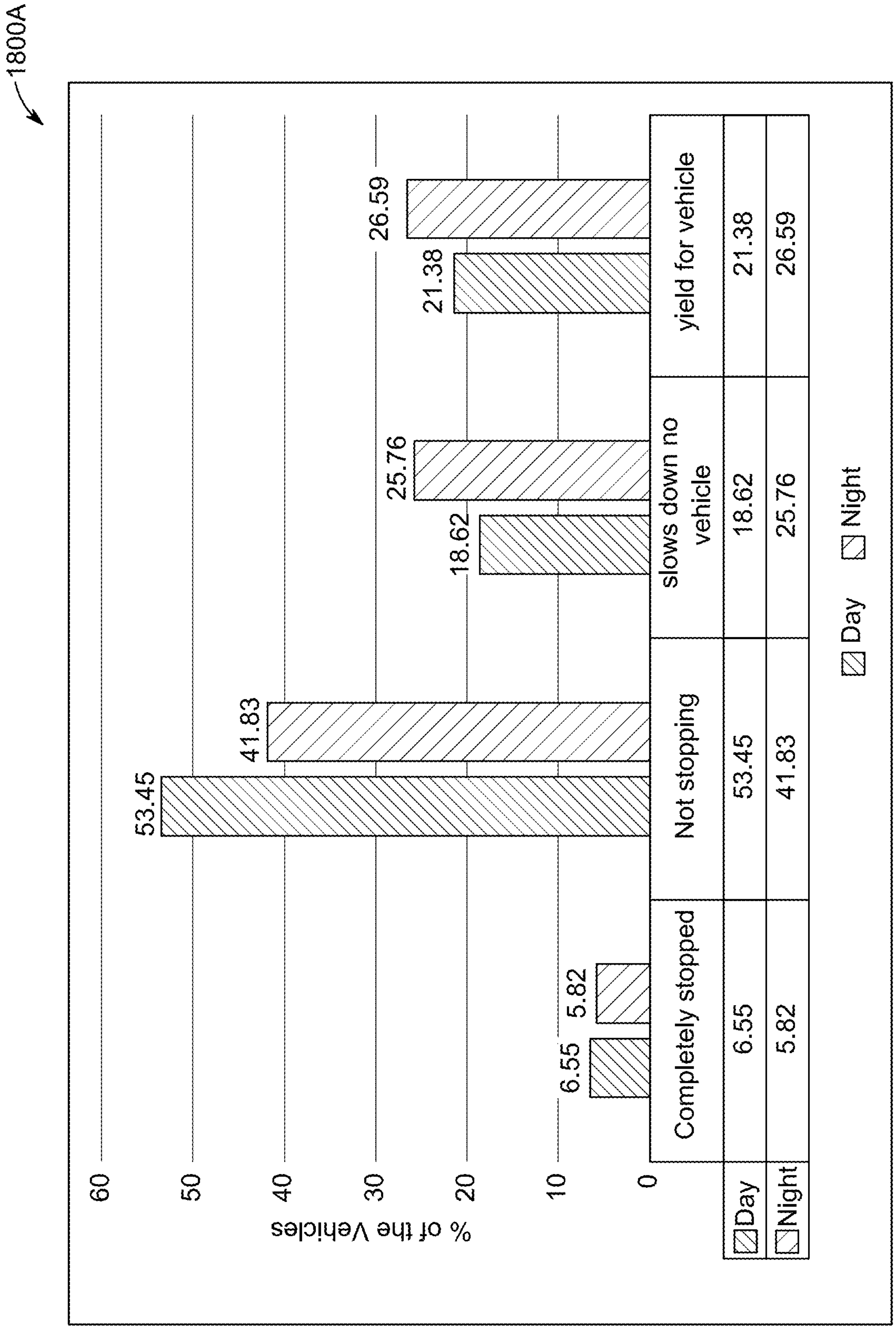
FIG. 18A is an exemplary graph representing percentage of the vehicles at each behavior (day and night), for testing of the traffic sign add-on adapted as the green jacket at a first site, according to certain embodiments.
Figure 18B:
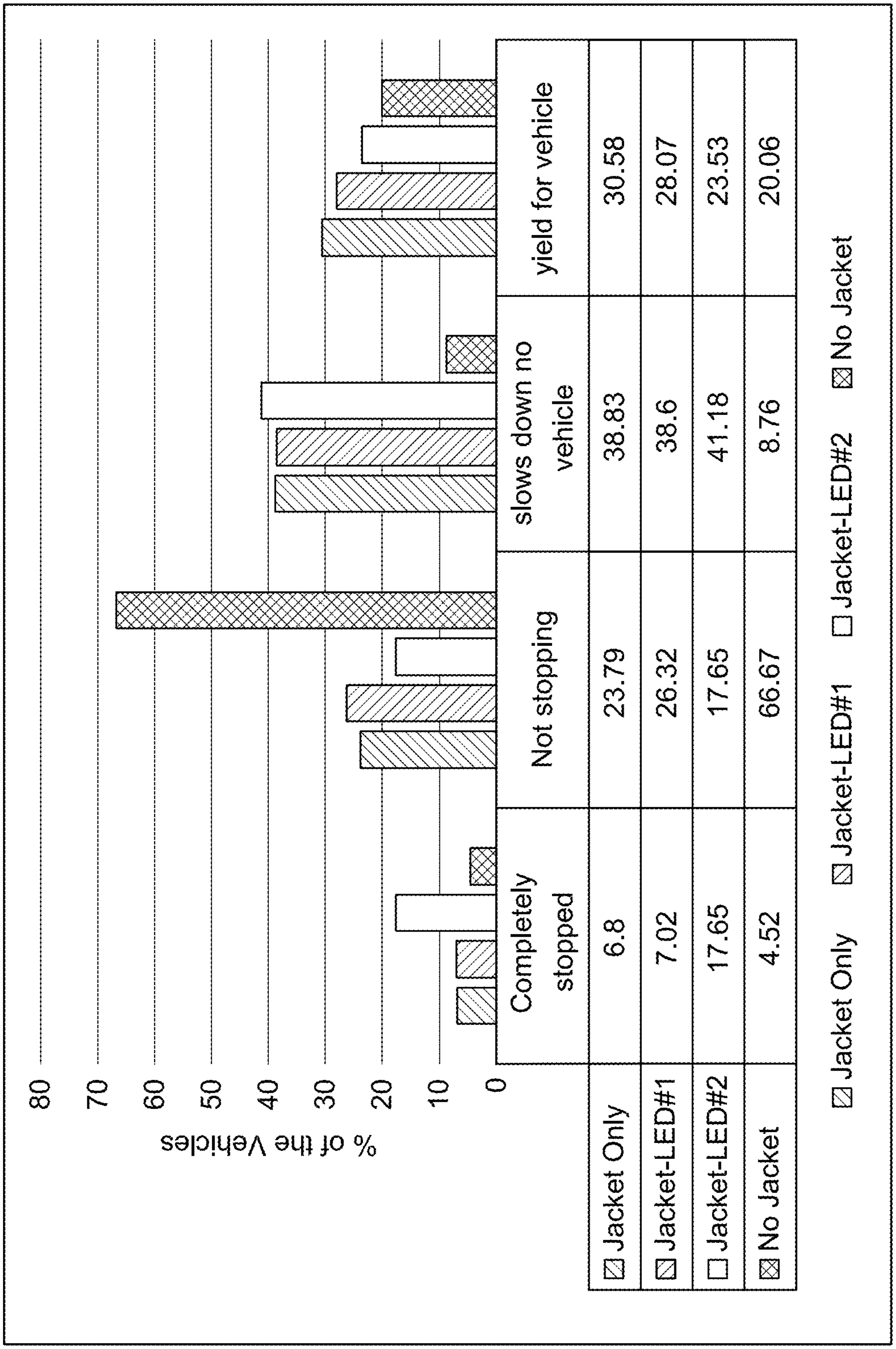
FIG. 18B is an exemplary graph representing percentage of the vehicles at different interventions in each behavior, for testing of the traffic sign add-on adapted as the green jacket at a first site, according to certain embodiments.

FIG. 18A provides a graph 1800A presenting the behavior of the driver during the day and the night. During the day there was a slight rise in commitments to stop signs than on the night. FIG. 18B provides a graph 1800B presenting the percent of vehicles completely stopping, not stopping, slowing down when no vehicles are around the site, and slowing down when vehicles are around the site with no jacket, with the green jacket, with the green jacket+LED #1, and with the green jacket+LED #2. The number of complete stops have an increased occurrence with the use the green jacket with the LED #2.

Second Site (Alfasaliah) (Green Jacket)

Figure 19A:
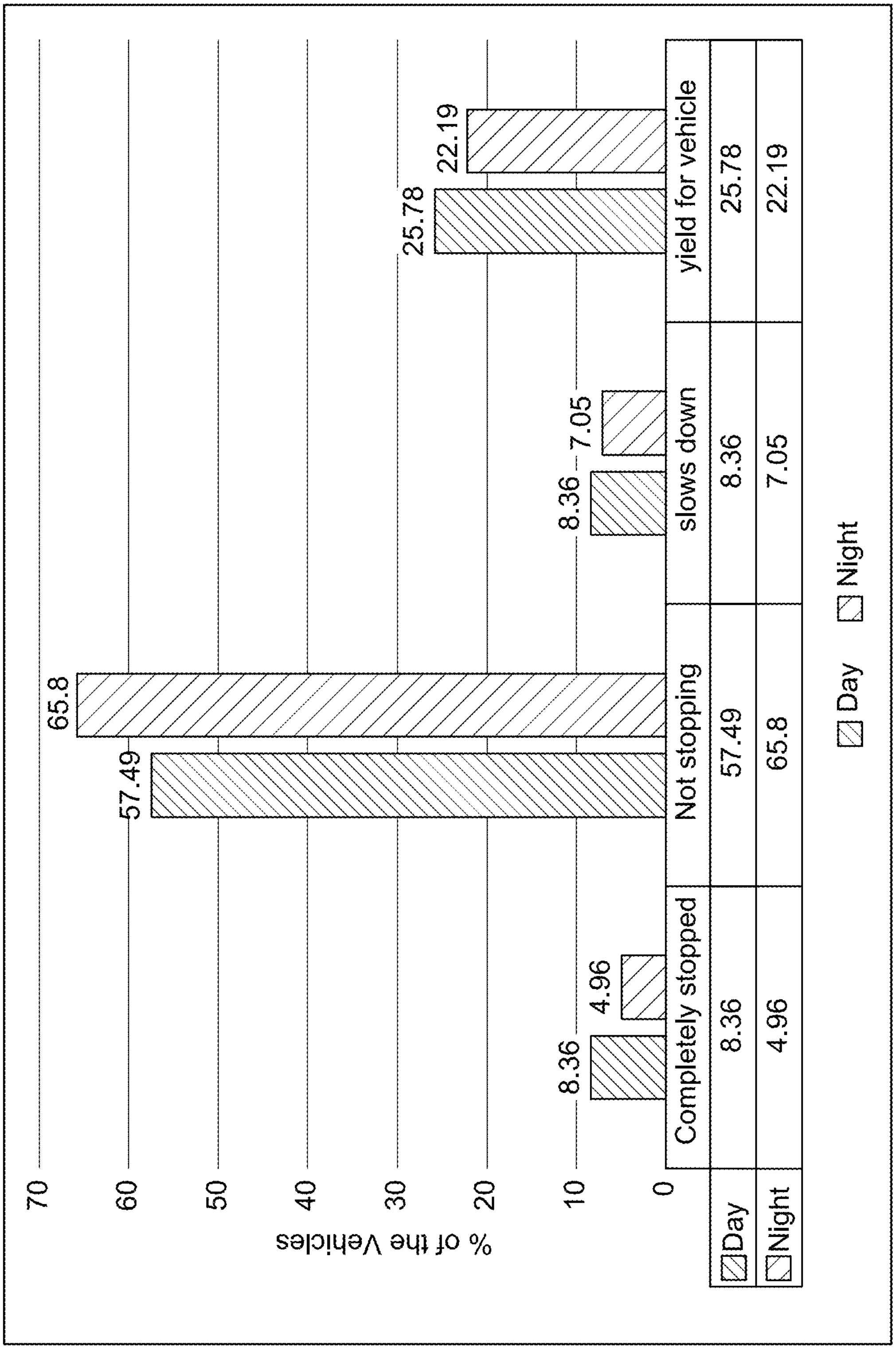
FIG. 19A is an exemplary graph representing percentage of the vehicles at each behavior (day and night), for testing of the traffic sign add-on adapted as the green jacket at a second site, according to certain embodiments.
Figure 19B:
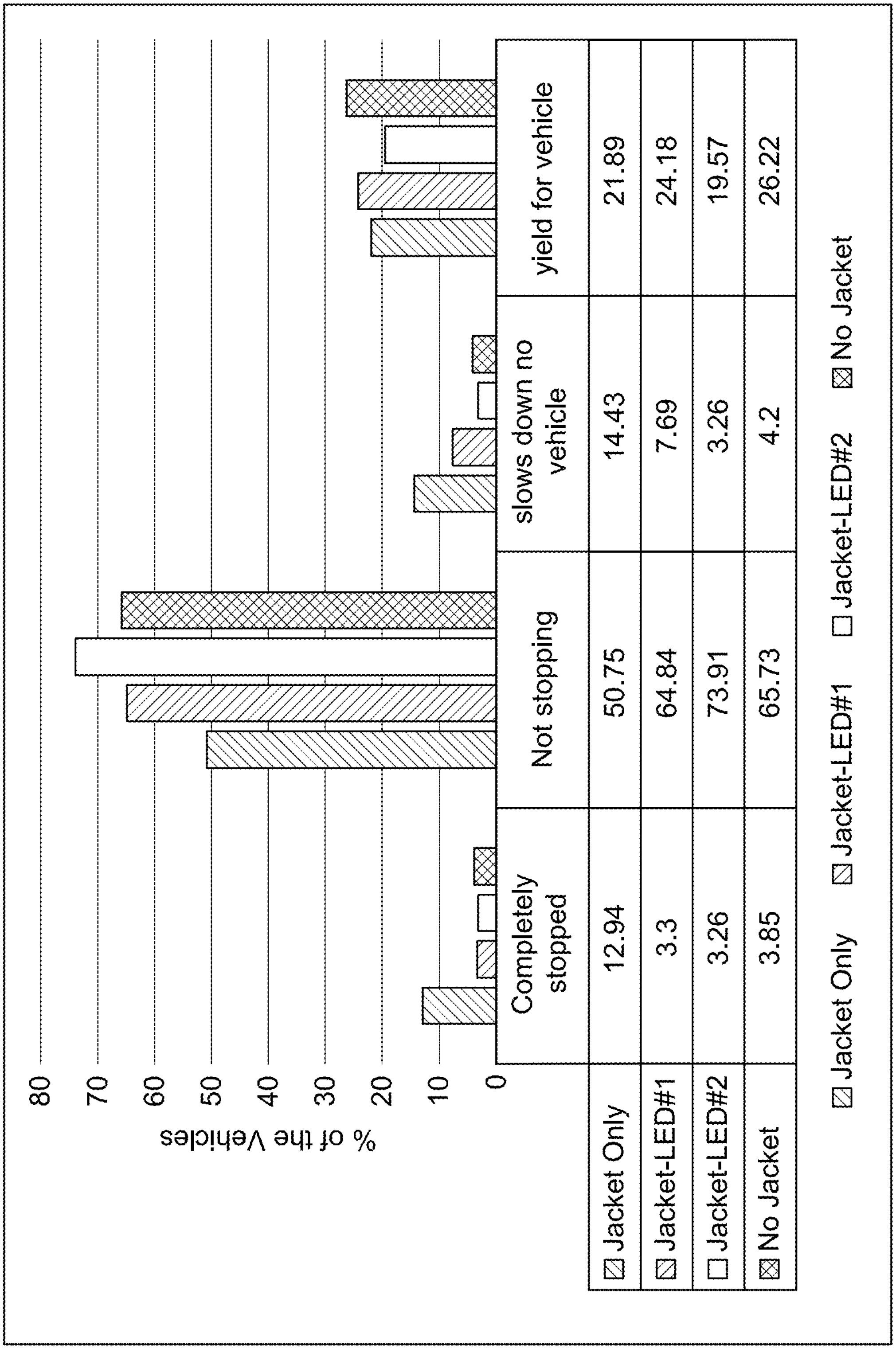
FIG. 19B is an exemplary graph representing percentage of the vehicles at different interventions in each behavior, for testing of the traffic sign add-on adapted as the green jacket at a second site, according to certain embodiments.

FIG. 19A provides a graph 1900A presenting the behavior of drivers during the day and the night. During the day there was more commitment to stop signs than during the night. FIG. 19B provides a graph 1900B presenting the percent of vehicles completely stopping, not stopping, slowing down when no vehicles are around the site, and slowing down when vehicles are around the site with no jacket, with the green jacket, with the green jacket+LED #1, and with the green jacket+LED #2 for different situation with different behavior. Complete stops have been seen to increase by using the green jacket.

First Site (Aljesar) (Green Jacket vs. Orange Jacket)

Figure 20A:
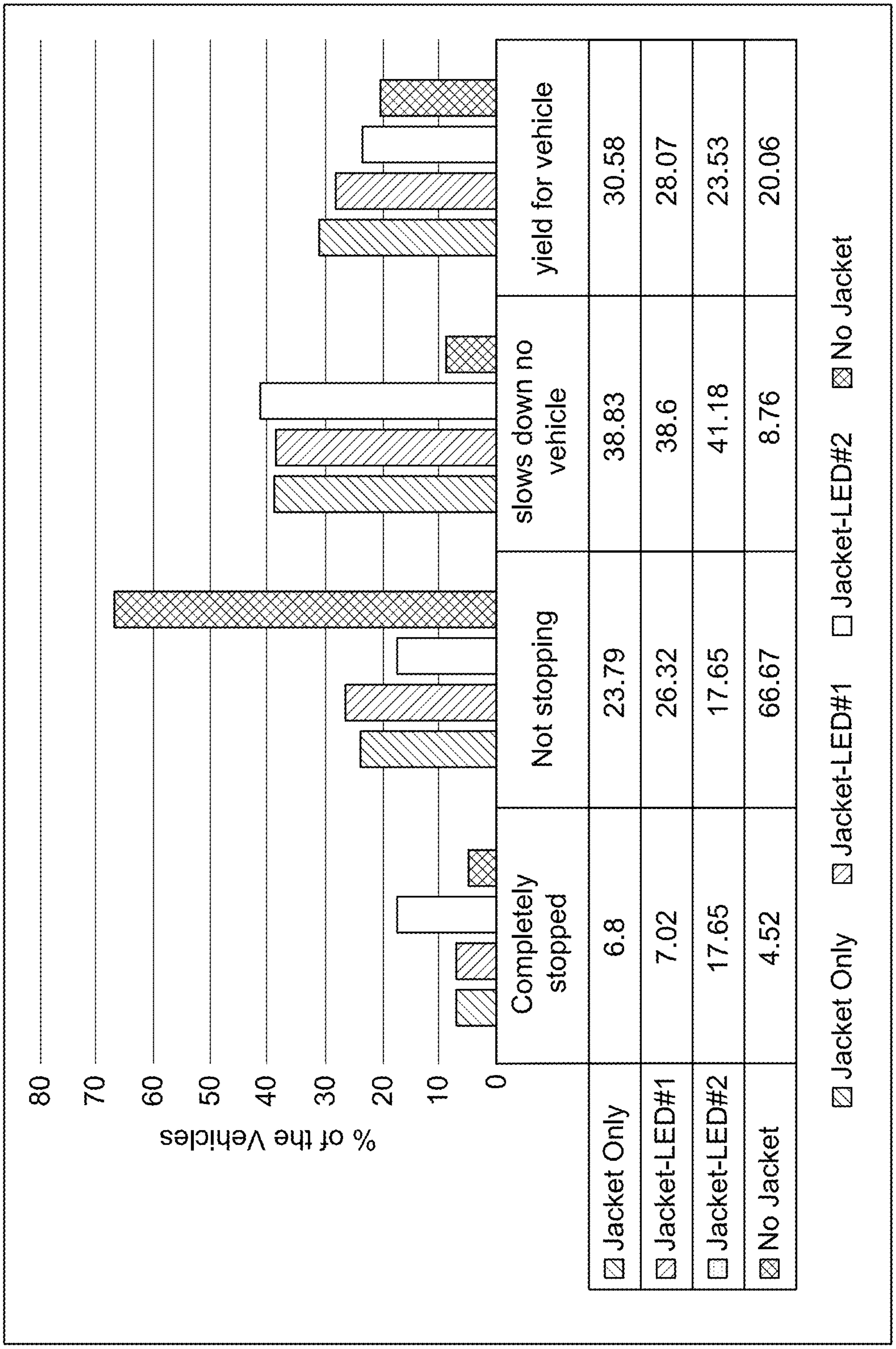
FIG. 20A is an exemplary graph representing comparison between the orange jacket and the green jacket at different interventions in each behavior, for testing of the traffic sign add-on adapted as the green jacket at a first site, according to certain embodiments.
Figure 20B:
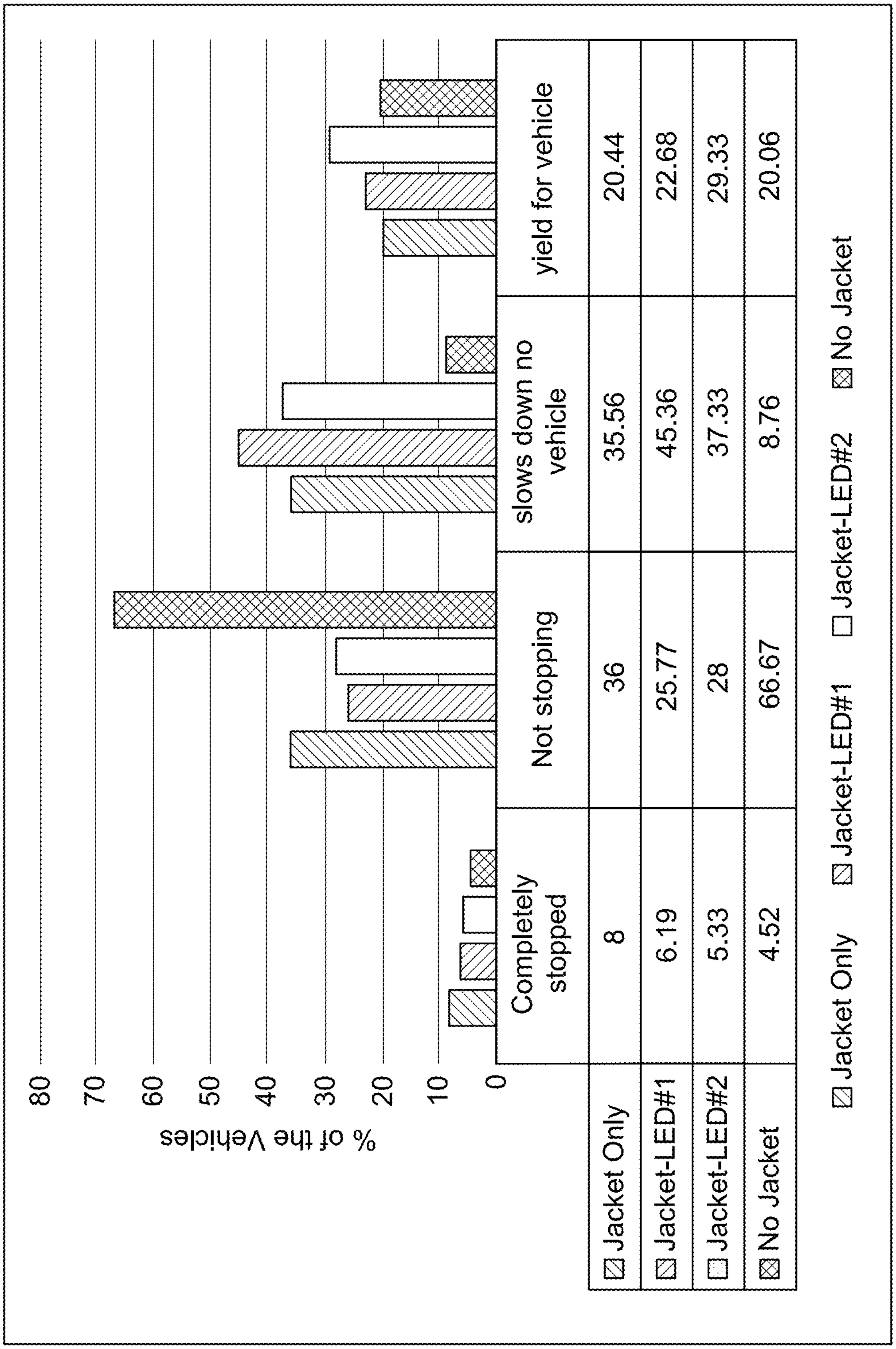
FIG. 20B is an exemplary graph representing comparison between the orange jacket and the green jacket at different interventions in each behavior, for testing of the traffic sign add-on adapted as the orange jacket at a first site, according to certain embodiments.

FIGS. 20A and 20B provide graphs 2000A and 2000B presenting the comparison of green and orange jackets, respectively. It may be noted that the orange jacket has more completely stopped vehicles than the green jacket, and that LED #2 is better than LED #1 with respect to the percentage of vehicles that stopped.

Second Site at Alfasaliah (Green Jacket vs. Orange Jacket)

Figure 21A:
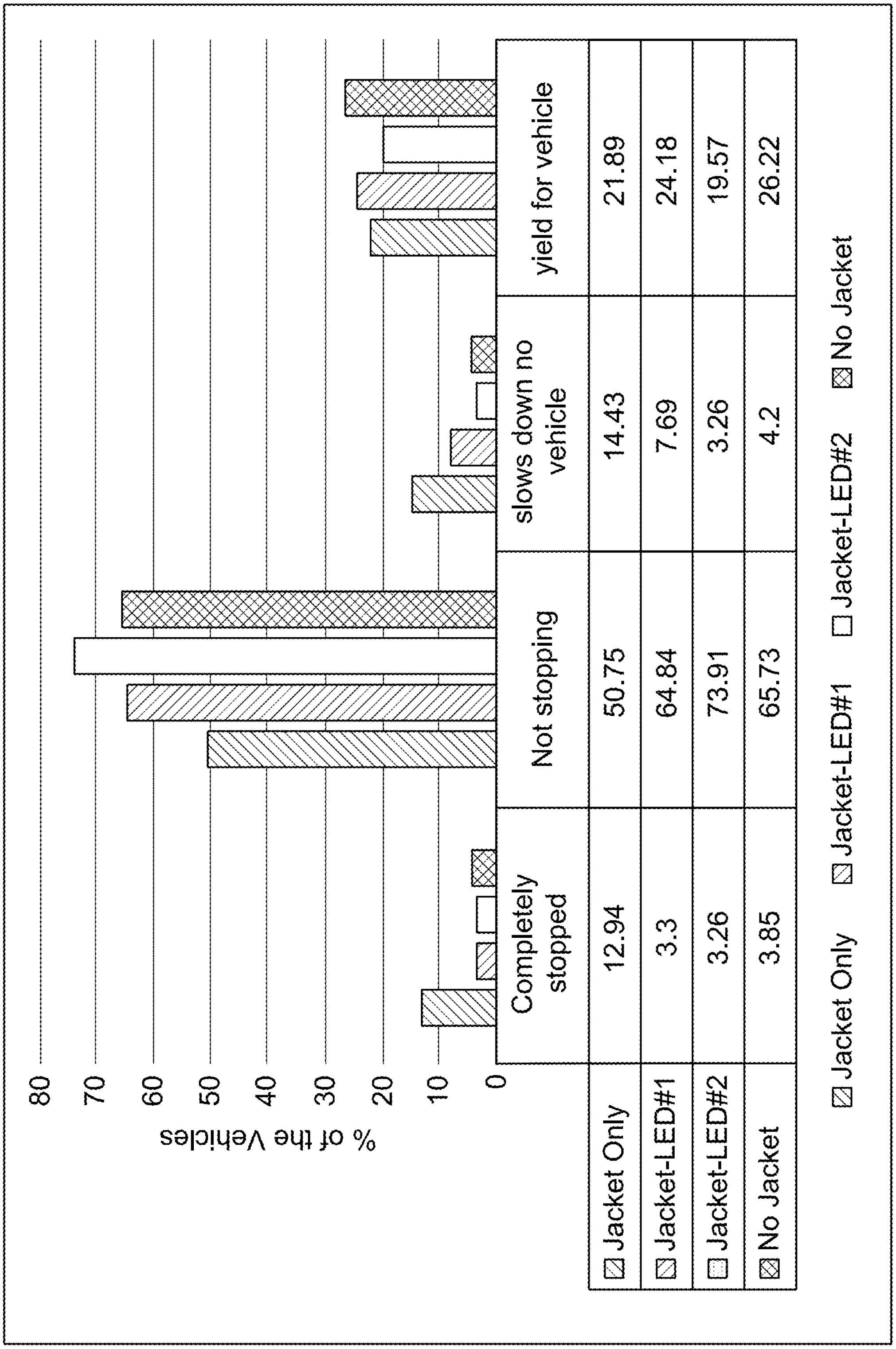
FIG. 21A is an exemplary graph representing comparison between the orange jacket and the green jacket at different interventions in each behavior, for testing of the traffic sign add-on adapted as the green jacket at a second site, according to certain embodiments.
Figure 21B:
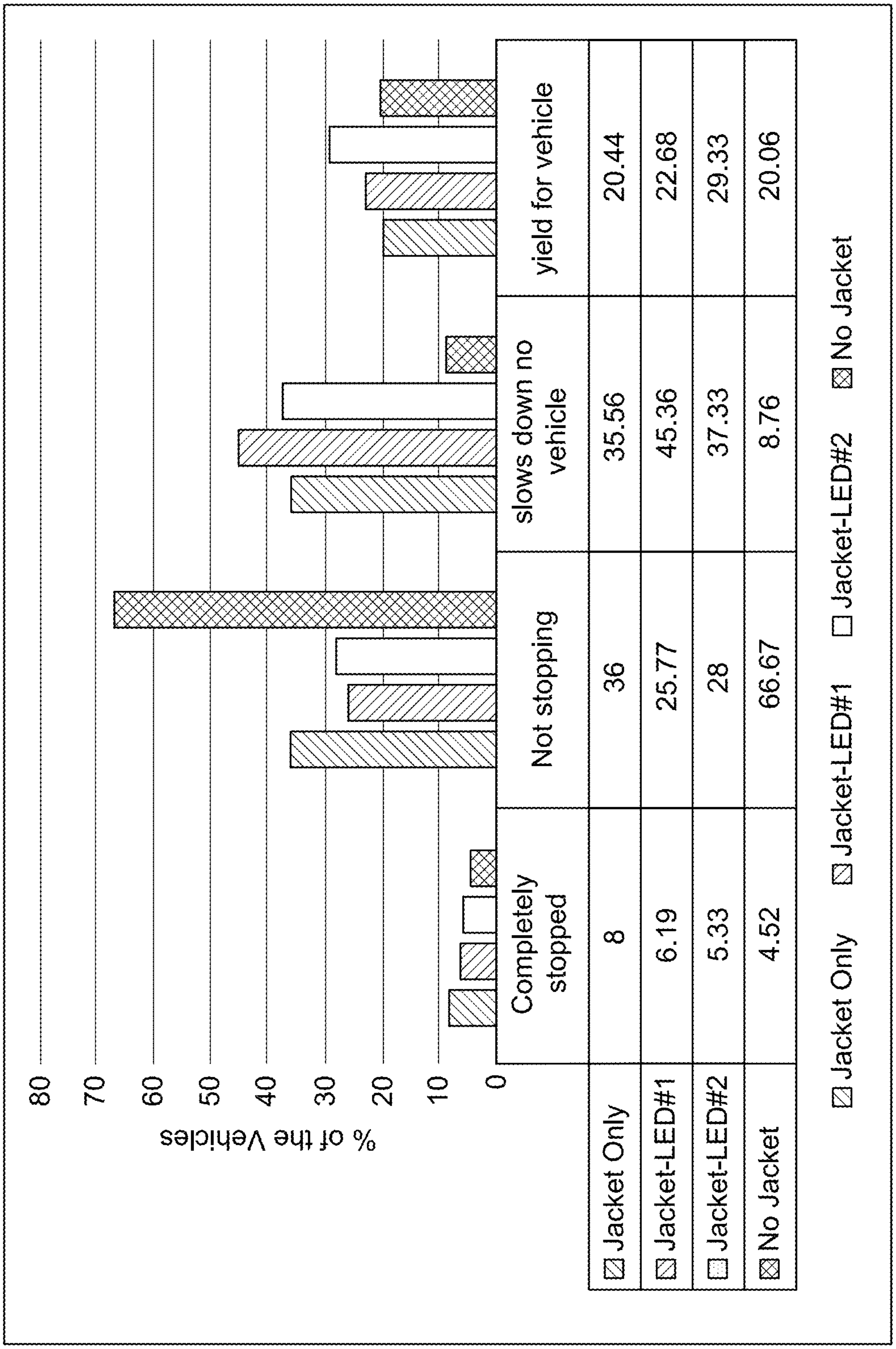
FIG. 21B is an exemplary graph representing comparison between the orange jacket and the green jacket at different interventions in each behavior, for testing of the traffic sign add-on adapted as the orange jacket at a second site, according to certain embodiments.

FIGS. 21A and 21B provide graphs 2100A and 2100B presenting the comparison of green and orange jackets, respectively. It may be noted that the green jacket has more completely stopped than the orange jacket. LED #2 shows similar effects as the LED #1 with respect to the percentage of vehicles that stopped.

Effectiveness of Add-Ons (Jackets) with Time

AlSahily Site

Figure 22A:
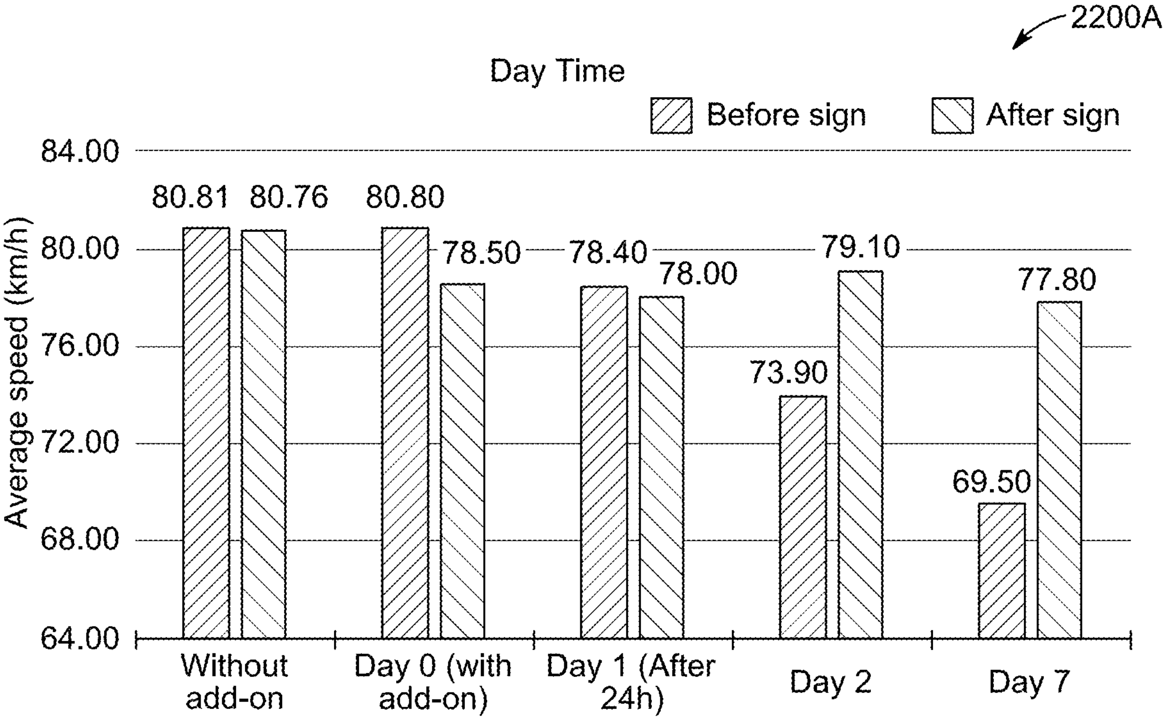
FIG. 22A is an exemplary graph representing effect of the green jacket only on the average speed for one week during the day, for testing of the traffic sign add-on at a second site, according to certain embodiments.
Figure 22B:
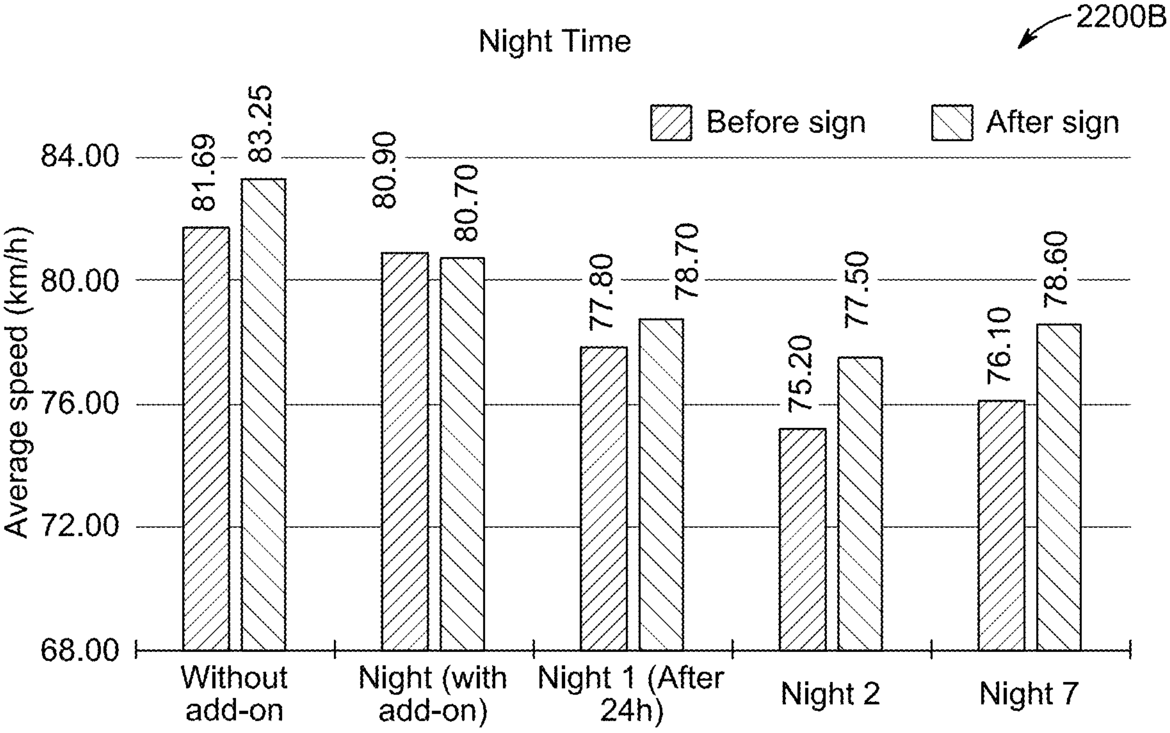
FIG. 22B is an exemplary graph representing effect of the green jacket only on the average speed for one week during the night, for testing of the traffic sign add-on at a second site, according to certain embodiments.

FIG. 22A provides a graph 2200A presenting the average speed over a period of seven days with the green jacket. The data was taken before and after the sign. There is a continuous decline in average speed from day zero to day one, and up to day seven before the sign, supporting the green jacket is continuously effective in capturing the attention of the driver; however, there is not a significant change in speed after the sign. FIG. 22B provides a graph 2200B presenting the average speed over a period of seven nights. There is a continuous decline in the average speed from night zero to night one, and up to night seven. A slight increasing trend was noticed at the 7th night, which indicates that the effectiveness of the green jacket with LED #2 increases up to the first seven days at night.

Figure 23A:
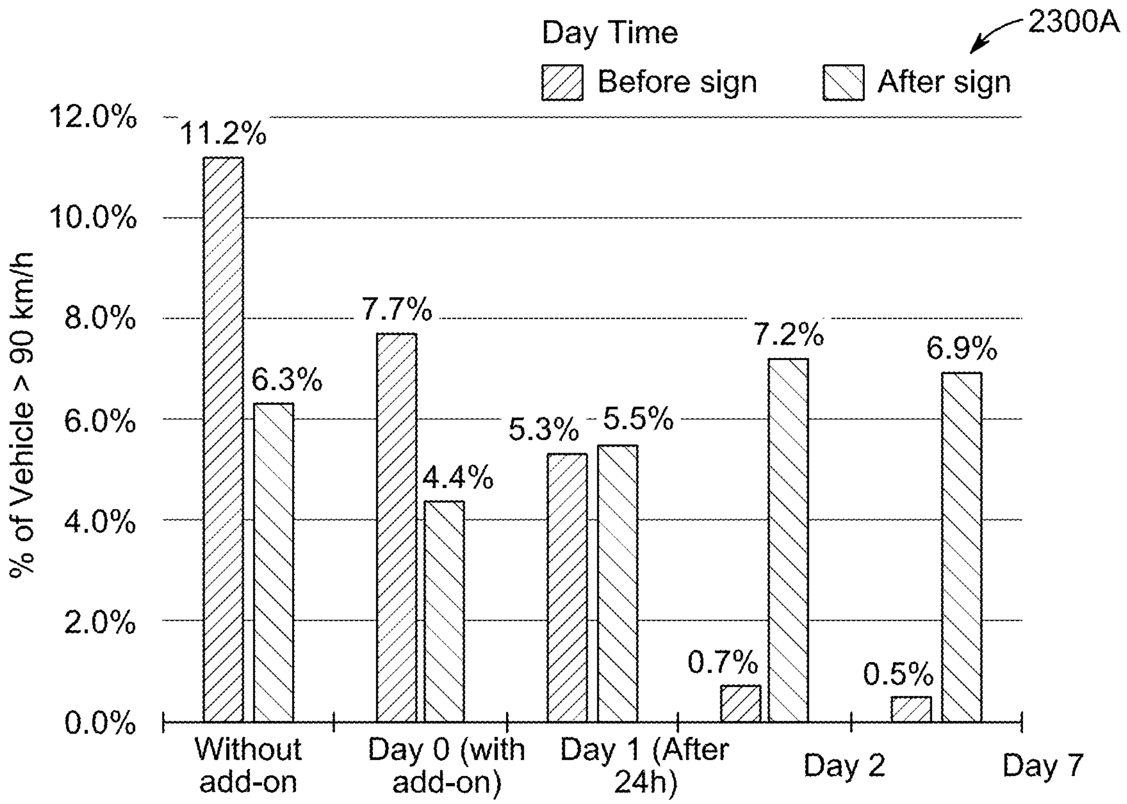
FIG. 23A is an exemplary graph representing effect of the green jacket with LED #2 on percentage of vehicle violating the speed-limit during the day, for testing of the traffic sign add-on at a second site, according to certain embodiments.
Figure 23B:
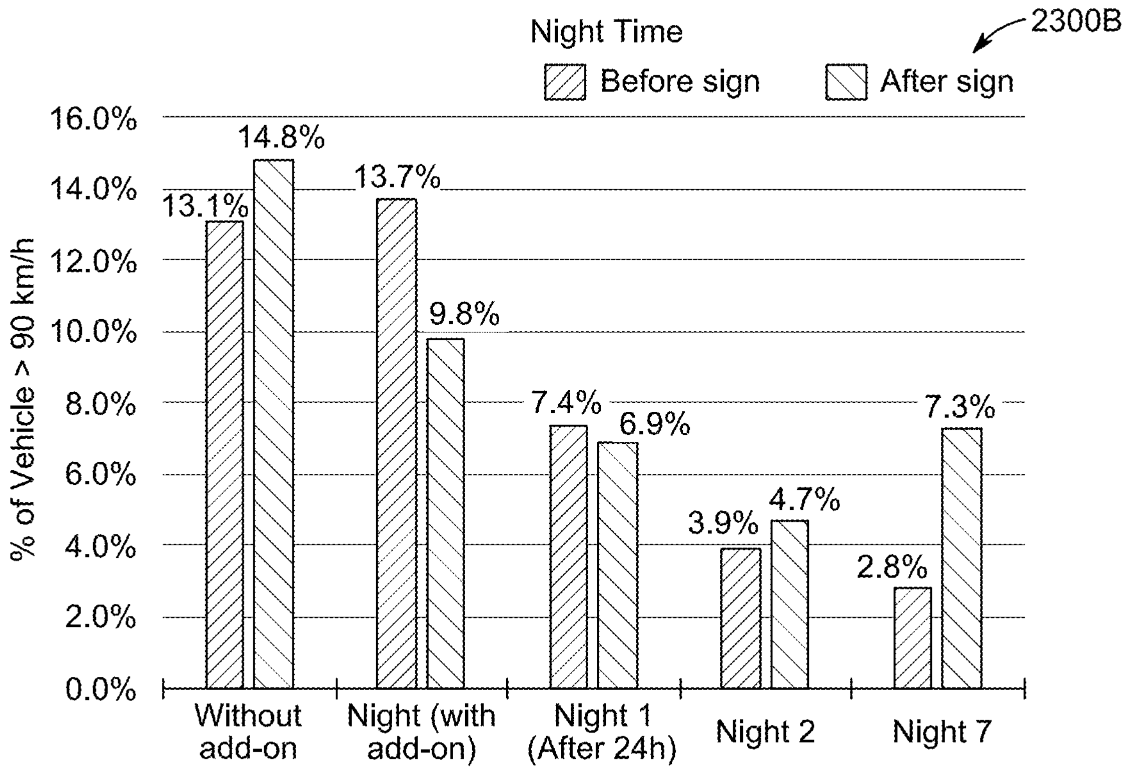
FIG. 23B is an exemplary graph representing effect of the green jacket with LED #2 on percentage of vehicle violating the speed-limit during the night, for testing of the traffic sign add-on at a second site, according to certain embodiments.

FIG. 23A provides a graph 2300A presenting the percent of vehicles exceeding the speed limit over a period of seven days. The data was taken before and after the sign. There is a continuous decline in the number of violations from day zero to day one, and up to day seven before the sign; however, after the sign, the trend is different. The percentage of vehicles violating the speed limit after the sign starts to increase after 24 hours to reach stable value. FIG. 23B provides a graph 2300B presenting the percent of vehicles exceeding the speed limit over a period of seven nights. The data was taken before and after the sign. There is a continuous decline in the number of violations from night zero to night one, and up to night seven before and after the sign. The green jacket with LED #2 is continuously effective in reducing speed before the sign.

Aljaser Site

Figure 24A:
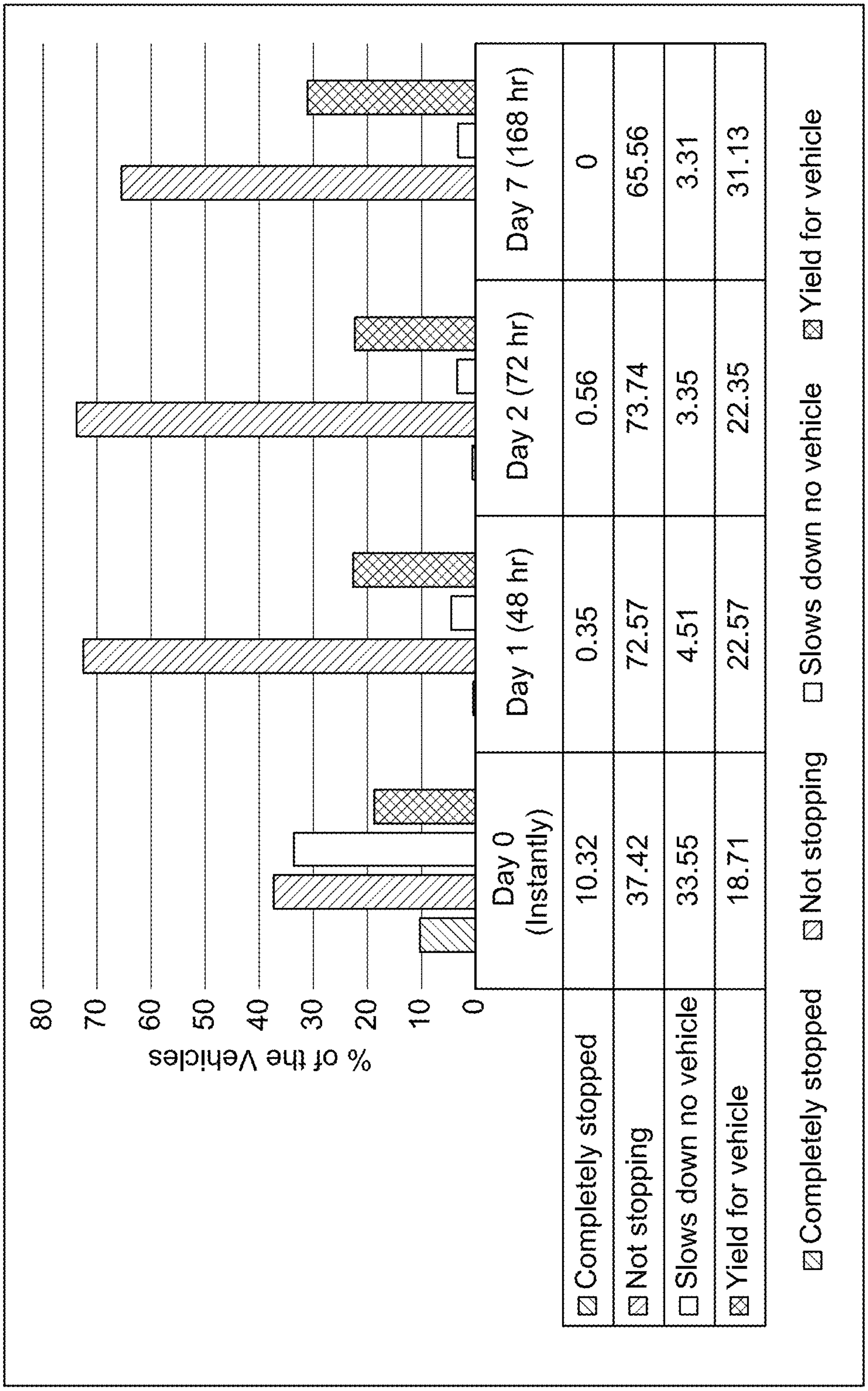
FIG. 24A is an exemplary graph representing effect of the orange jacket only on percentage of the vehicle for one week during the day, for testing of the traffic sign add-on at Aljaser site, according to certain embodiments.
Figure 24B:
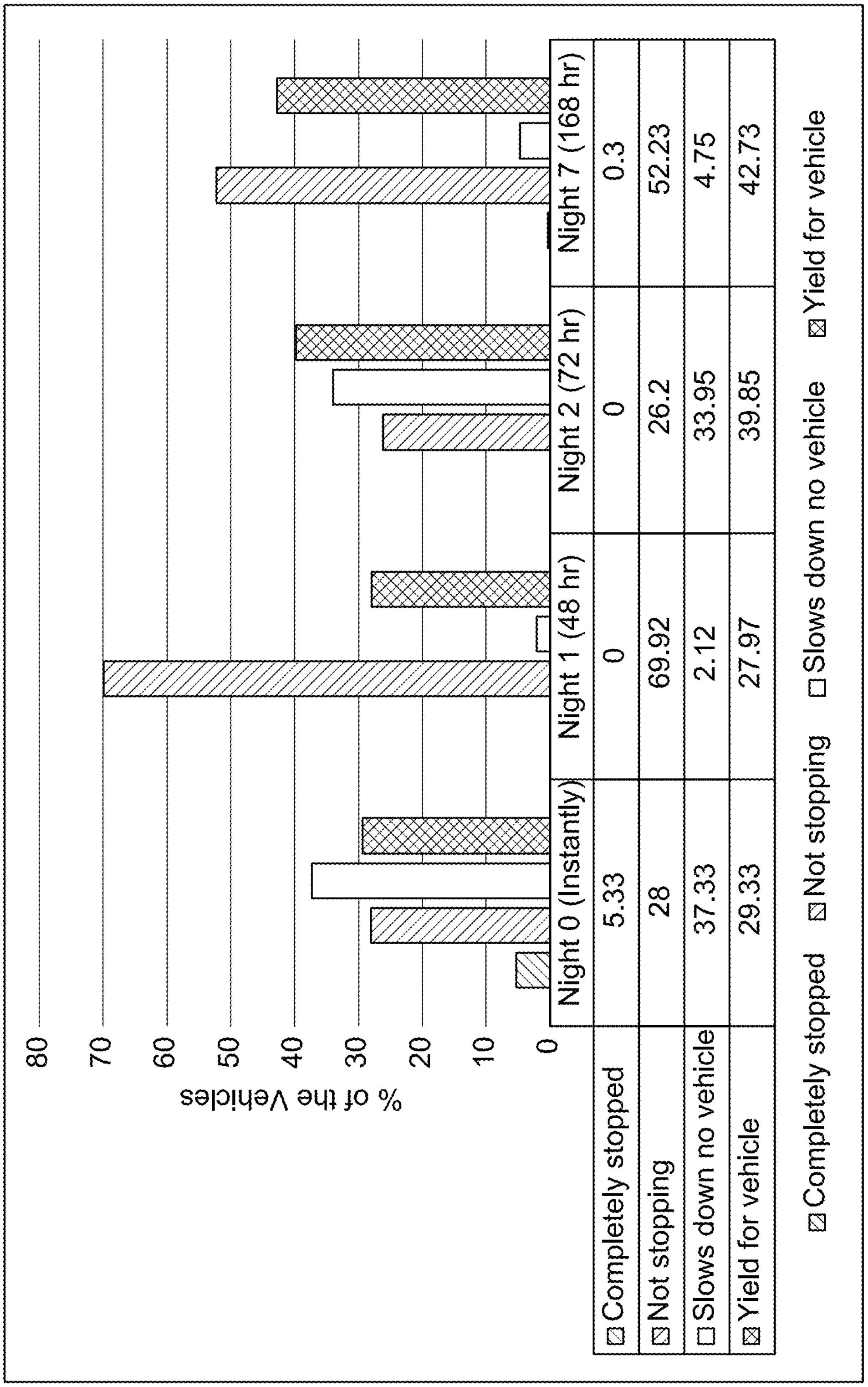
FIG. 24B is an exemplary graph representing effect of the orange jacket with LED #2 on percentage of the vehicle for one week during the day, for testing of the traffic sign add-on at Aljaser site, according to certain embodiments.

FIG. 24A provides a graph 2400A presenting the percent of vehicles that completely stop, do not stop, slow down when no vehicles are around the site, and slow down when vehicles are around the site with no jacket at a stop sign with the orange jacket over a period of seven days during the day. The percent of vehicles that completely stop have decreased to zero by day seven. FIG. 24B provides a graph 2400B presenting the percent of vehicles that completely stop, do not stop, slow down when no vehicles are around the site, and slow down when vehicles are around the site at a stop sign with the orange jacket with LED #2 over a period of seven days during the night. The percent of vehicles that completely stop have decreased to zero by day seven by using the LED #2.

The experimental data validated the two colors of the traffic sign add-on with different LED sequences for speed limit signs and stop signs. During the day, the two colors indicate their effectiveness by decreasing the number of vehicles exceeding the speed limit posted on the speed limit sign. After the sign, the orange jacket decreases the percentage of violation by 30%. The green jacket was seen to be more effective than orange jacket and resulted in reduction of violation by 50%. During the night, the LEDs added more visibility to the jacket and increased the percentage of compliance with the signs. The LED #2 (twinkling illumination sequence) decreases the percentage of violation better than LED #1 (constant illumination sequence). In addition, the LED #2 reduced the average speed better compared to LED #1. Before the speed limit sign, the green traffic sign add-on reduces the average speed day after day up to the seventh day by approximately 10 km/h and the percentage of speed violation decreased to almost zero on day 7. The LED #2 pattern reduces the average speed at uniform rate until the seventh night, where it starts to rise. The percentage of speed violation decreases from 11.2% to 7% after 24 hours, down to 3% after 48 hours, and down to 1% speed violation after 120 hours. Similar trends at night were observed; however, there was no continuous decline in average speed and percent of vehicles violating the speed limit after the sign.

For the stop sign, the traffic sign add-on increases the compliance during the day and night compared to the sign without the add-on. During the day, the orange jacket shows a better affinity for compliance than the green jacket by approximately 17%. Addition of the LEDs boost the compliance by adding more visibility to the sign during the night. The LED #2 pattern increases the compliance by 17.65% while the LED #1 increase by 7%, which indicates the LED #2 pattern has better compliance. The orange traffic sign add-on with the LED #2 pattern was found to increase compliance during day and night at day 0. After 24 hours the result showed no compliance up to day 7 during day and night.

Figure 25:
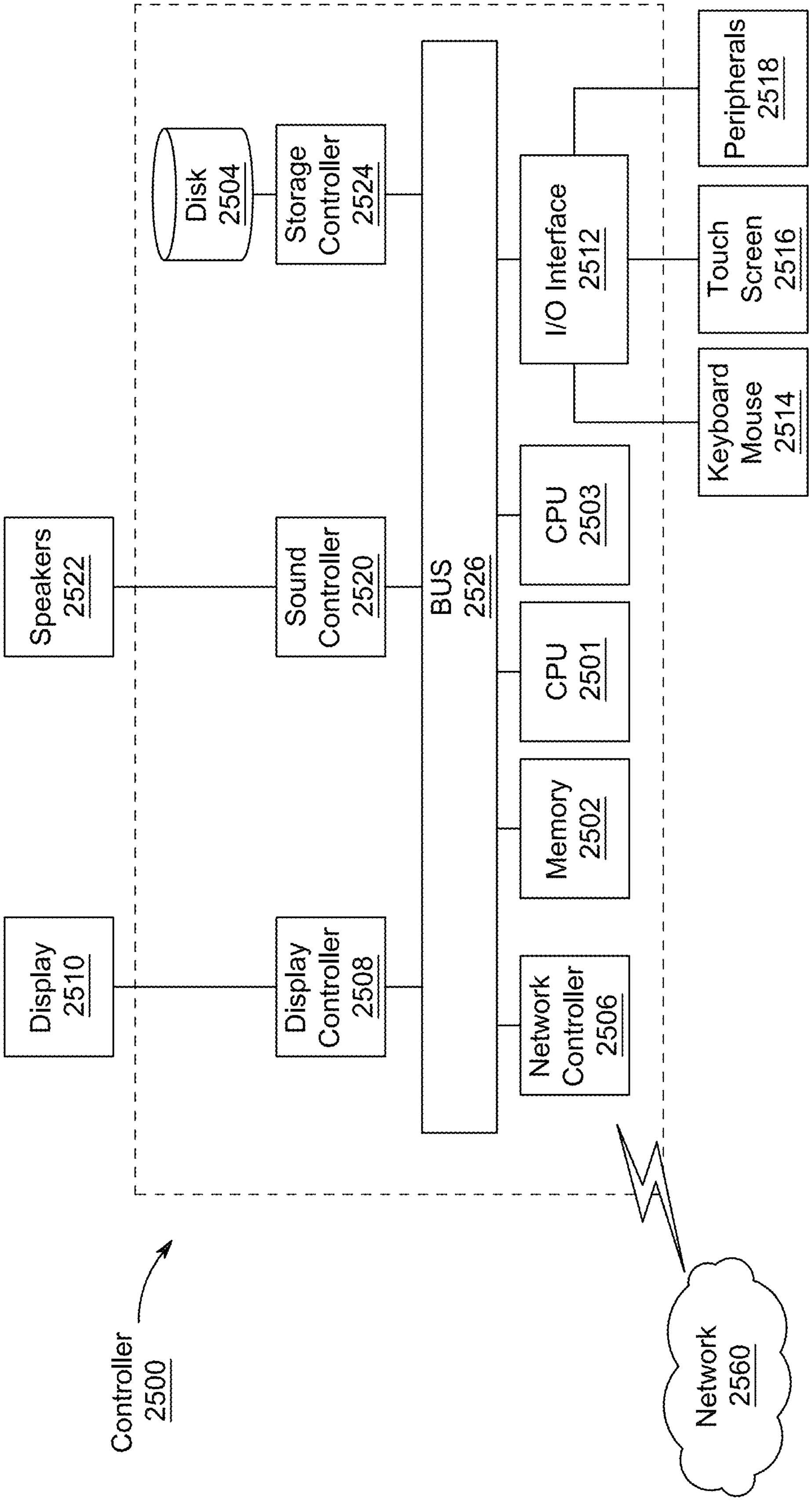
FIG. 25 is an illustration of a non-limiting example of details of computing hardware used in the computing system, according to certain embodiments.

Next, further details of the hardware description of the computing environment according to exemplary embodiments is described with reference to FIG. 25. In FIG. 25, a controller 2500 is described as representative of control systems for the traffic sign add-on 100 in which the controller 2500 is a computing device which includes a CPU 2501 which performs the processes described above/below. The process data and instructions may be stored in memory 2502. These processes and instructions may also be stored on a storage medium disk 2504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 2501, 2503 and an operating system such as Microsoft Windows 7, Microsoft Windows 10, Microsoft Windows 11, UNIX, Solaris, LINUX, Apple MAC-OS, and other systems known to those skilled in the art.

The hardware elements to achieve the computing device may be realized by various circuitry elements, known to those skilled in the art. For example, CPU 2501 or CPU 2503 may be a Xenon or Core processor from Intel of America or an Opteron processor from AMD of America or may be other processor types that would be recognized by one of ordinary skill in the art. Alternatively, the CPU 2501, 2503 may be implemented on an FPGA, ASIC, PLD or using discrete logic circuits, as one of ordinary skill in the art would recognize. Further, CPU 2501, 2503 may be implemented as multiple processors cooperatively working in parallel to perform the instructions of the inventive processes described above.

The computing device in FIG. 25 also includes a network controller 2506, such as an Intel Ethernet PRO network interface card from Intel Corporation of America, for interfacing with network 2560. As can be appreciated, the network 2560 can be a public network, such as the Internet, or a private network such as an LAN or WAN network, or any combination thereof and can also include PSTN or ISDN sub-networks. The network 2560 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 2508, such as a NVIDIA Geforce GTX or Quadro graphics adaptor from NVIDIA Corporation of America for interfacing with display 2510, such as a Hewlett Packard HPL2445w LCD monitor. A general purpose I/O interface 2512 interfaces with a keyboard and/or mouse 2514 as well as a touch screen panel 2516 on or separate from display 2510. General purpose I/O interface also connects to a variety of peripherals 2518 including printers and scanners, such as an OfficeJet or DeskJet from Hewlett Packard.

A sound controller 2520 is also provided in the computing device such as Sound Blaster X-Fi Titanium from Creative, to interface with speakers/microphone 2522 thereby providing sounds and/or music.

The general purpose storage controller 2524 connects the storage medium disk 2504 with communication bus 2526, which may be an ISA, EISA, VESA, PCI, or similar, for interconnecting all of the components of the computing device. A description of the general features and functionality of the display 2510, keyboard and/or mouse 2514, as well as the display controller 2508, storage controller 2524, network controller 2506, sound controller 2520, and general purpose I/O interface 2512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 26.

Figure 26:
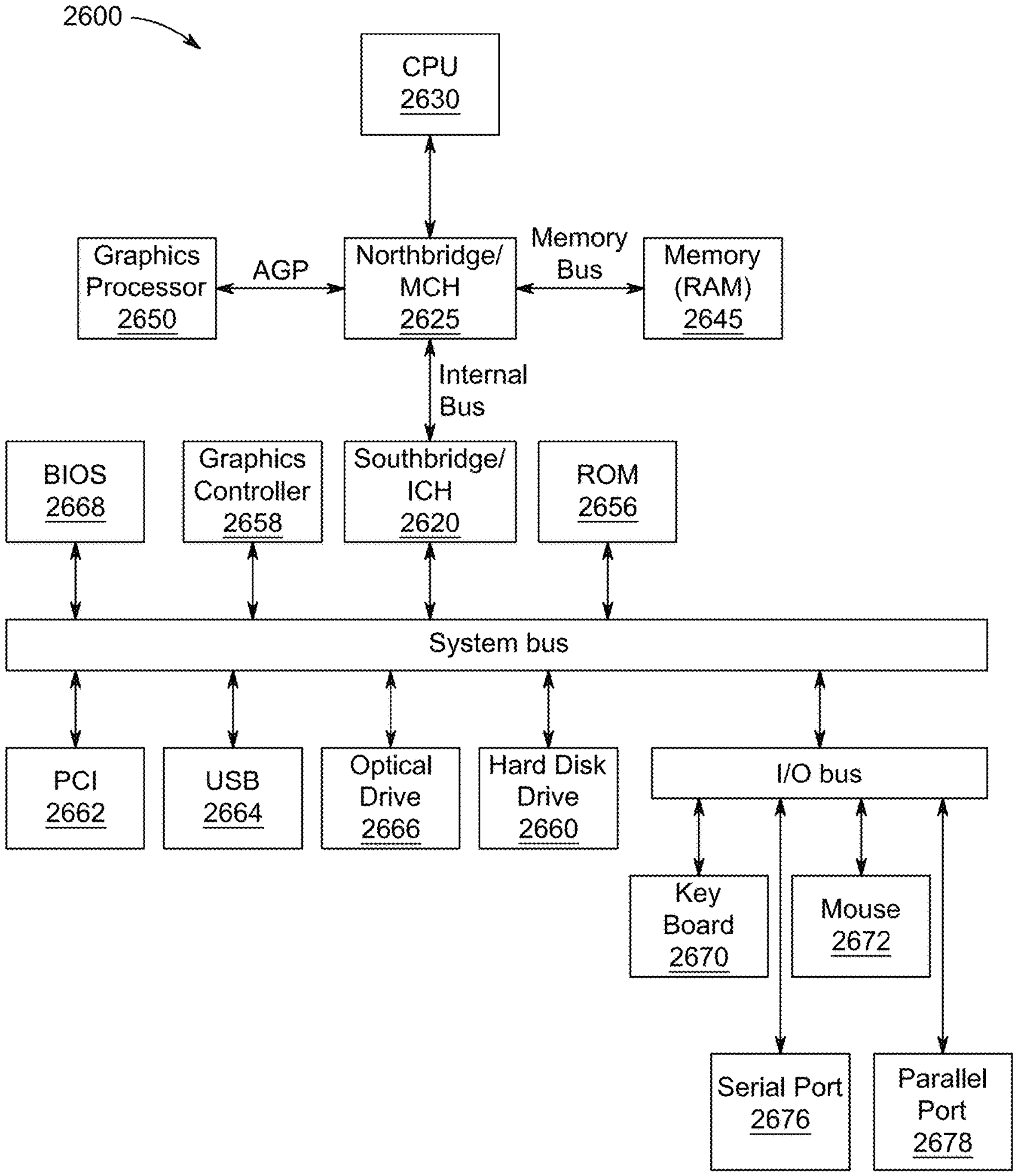
FIG. 26 is an exemplary schematic diagram of a data processing system used within the computing system, according to certain embodiments.

FIG. 26 shows a schematic diagram of a data processing system, according to certain embodiments, for performing the functions of the exemplary embodiments. The data processing system is an example of a computer in which code or instructions implementing the processes of the illustrative embodiments may be located.

In FIG. 26, data processing system 2600 employs a hub architecture including a north bridge and memory controller hub (NB/MCH) 2625 and a south bridge and input/output (I/O) controller hub (SB/ICH) 2620. The central processing unit (CPU) 2630 is connected to NB/MCH 2625. The NB/MCH 2625 also connects to the memory 2645 via a memory bus, and connects to the graphics processor 2650 via an accelerated graphics port (AGP). The NB/MCH 2625 also connects to the SB/ICH 2620 via an internal bus (e.g., a unified media interface or a direct media interface). The CPU Processing unit 2630 may contain one or more processors and even may be implemented using one or more heterogeneous processor systems.

Figure 27:
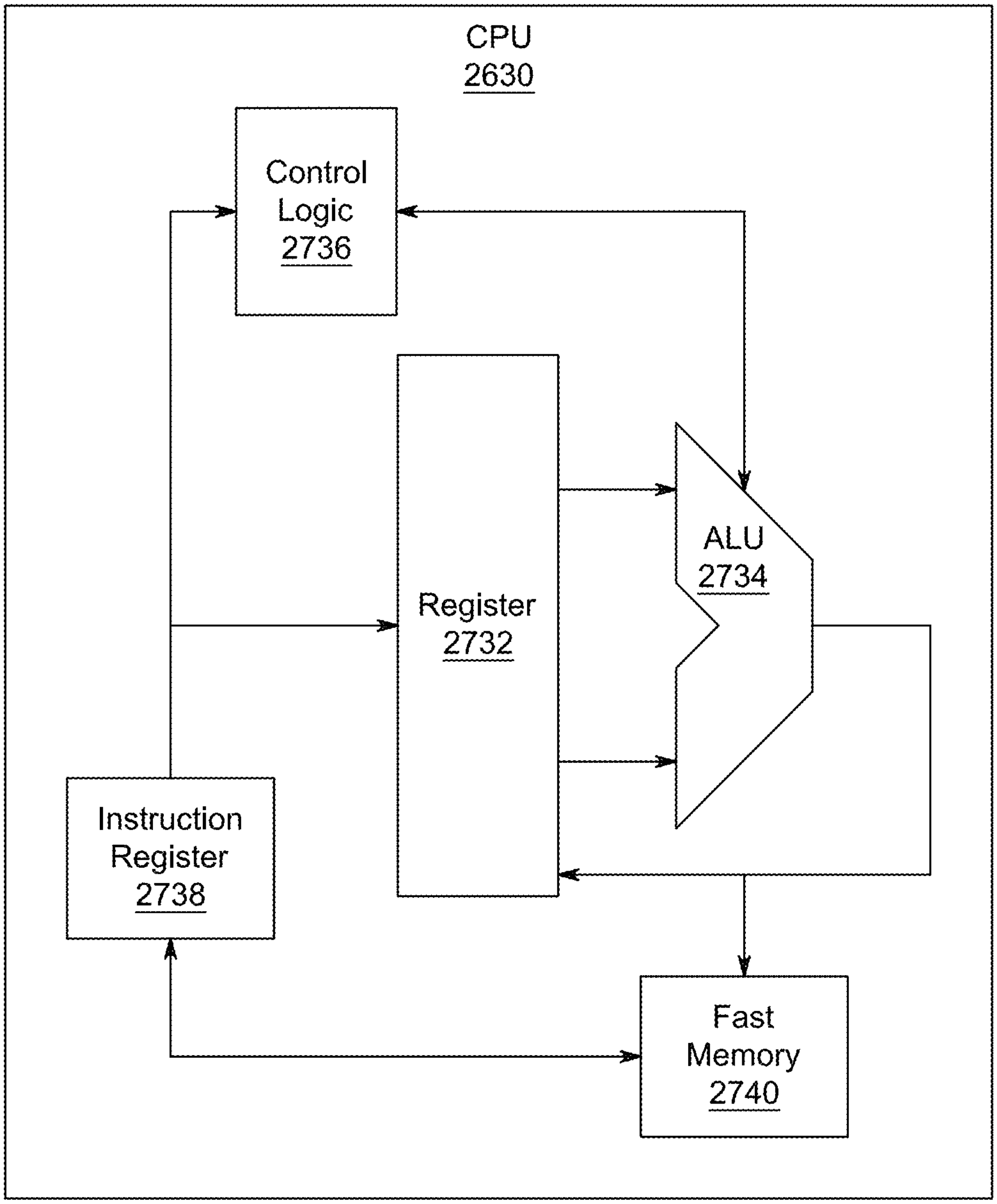
FIG. 27 is an exemplary schematic diagram of a processor used with the computing system, according to certain embodiments.

For example, FIG. 27 shows one implementation of CPU 2630. In one implementation, the instruction register 2738 retrieves instructions from the fast memory 2740. At least part of these instructions are fetched from the instruction register 2738 by the control logic 2736 and interpreted according to the instruction set architecture of the CPU 2630. Part of the instructions can also be directed to the register 2732. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 2734 that loads values from the register 2732 and performs logical and mathematical operations on the loaded values according to the instructions. The results from these operations can be feedback into the register and/or stored in the fast memory 2740. According to certain implementations, the instruction set architecture of the CPU 2630 can use a reduced instruction set architecture, a complex instruction set architecture, a vector processor architecture, a very large instruction word architecture. Furthermore, the CPU 2630 can be based on the Von Neuman model or the Harvard model. The CPU 2630 can be a digital signal processor, an FPGA, an ASIC, a PLA, a PLD, or a CPLD. Further, the CPU 2630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 26, the data processing system 2600 can include that the SB/ICH 2620 is coupled through a system bus to an I/O Bus, a read only memory (ROM) 2656, universal serial bus (USB) port 2664, a flash binary input/output system (BIOS) 2668, and a graphics controller 2658. PCI/PCIe devices can also be coupled to SB/ICH 2688 through a PCI bus 2662.

The PCI devices may include, for example, Ethernet adapters, add-in cards, and PC cards for notebook computers. The Hard disk drive 2660 and CD-ROM 2666 can use, for example, an integrated drive electronics (IDE) or serial advanced technology attachment (SATA) interface. In one implementation the I/O bus can include a super I/O (SIO) device.

Further, the hard disk drive (HDD) 2660 and optical drive 2666 can also be coupled to the SB/ICH 2620 through a system bus. In one implementation, a keyboard 2670, a mouse 2672, a parallel port 2678, and a serial port 2676 can be connected to the system bus through the I/O bus. Other peripherals and devices that can be connected to the SB/ICH 2620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 28:
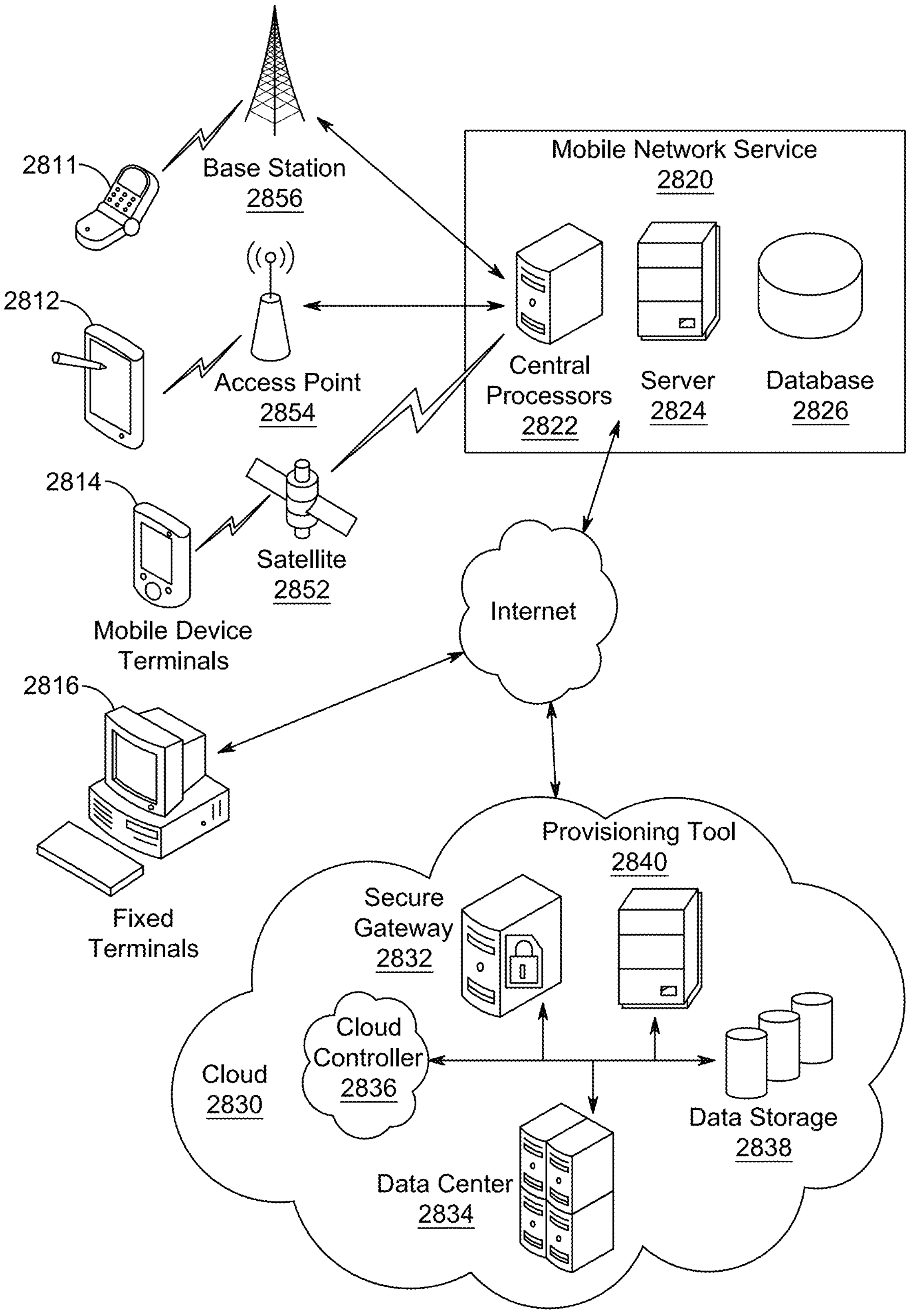
FIG. 28 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 28, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the disclosure may be practiced otherwise than as specifically described herein.

The invention claimed is:

1. A traffic sign add-on, comprising:
a front layer,
wherein the front layer is made of a first fabric,
wherein the first fabric has one or more reflective sections,
a back layer,
wherein the back layer is made of a second fabric,
wherein the back layer has a slot extending along a long dimension of the back layer from a bottom end to a top end wherein a zipper is disposed in the slot, wherein the zipper is capable of closing to seal the slot,
wherein the front layer and the back layer are connected along peripheral longitudinal edges and form a substantially flat form,
wherein the front layer and the back layer are configured to accommodate a circumference of a pole of a traffic sign coaxially with the long dimension of the back layer, wherein peripheral latitudinal edges at the bottom end and the top end of the front layer and back layer are at least partially unconnected,
wherein the front layer and the back layer are substantially co-dimensional when the slot is sealed with the zipper,
wherein the front layer has a fabric lining made of a third fabric and the third fabric has a same length and a same width of that of the front layer.

2. The traffic sign add-on of claim 1, wherein the fabric lining is located between the first fabric and the second fabric.

3. The traffic sign add-on of claim 1, wherein the fabric lining is attached to the front layer with stitches.

4. The traffic sign add-on of claim 1, wherein the third fabric is the first fabric without the one or more reflective sections.

5. The traffic sign add-on of claim 1, wherein:
the front layer of the first fabric comprises at least four pieces of the first fabric,
wherein the back layer comprises at least two pieces of the second fabric,
wherein a first piece of the at least two pieces of the second fabric is attached to a second piece of the at least two pieces of the second fabric by the zipper,
wherein the at least two pieces of the second fabric are attached to one or more of the at least four pieces of the first fabric.

6. The traffic sign add-on of claim 5, wherein the at least two pieces of the second fabric are attached to one or more of the at least four pieces of the first fabric by a hook and loop fastener along one or more edges.

7. The traffic sign add-on of claim 1, further comprising:
one or more light-emitting diodes,
wherein the front layer and the back layer have a hook and loop fastener along one or more edges,
wherein the one or more light-emitting diodes are attached to the hook and loop fastener,
wherein the one or more light-emitting diodes protrude from the hook and loop fastener to an outside of the traffic sign add-on.

8. The traffic sign add-on of claim 7, including a photovoltaic panel attached to the light-emitting diodes.

9. The traffic sign add-on of claim 7, wherein:
the back layer is covered with a flexible photovoltaic cell on an outer surface and a flexible battery on an inner surface,
wherein the flexible photovoltaic cell charges the flexible battery, and
wherein the flexible battery provides power for the one or more light-emitting diodes.

10. A method of traffic accident reduction, comprising:
placing the traffic sign add-on of claim 7 on the pole of the traffic sign,
wherein the front layer is an outermost layer and facing an outside of the pole,
wherein the traffic sign is a speed limit sign or a stop sign, and
illuminating the light-emitting diodes.

11. The method of claim 10, wherein the light-emitting diodes are continuously illuminated.

12. The method of claim 10, wherein the traffic sign add-on extends at least 90% a length of the pole of the traffic sign.

13. The traffic sign add-on of claim 1, wherein a constriction device is located at a top end of the front layer and the back layer and a bottom end of the front layer and the back layer, wherein the constriction device holds the traffic sign add-on in place.

14. A traffic sign add-on, comprising:
a front layer,
wherein the front layer is made of a first fabric,
wherein the first fabric has one or more reflective sections,
a back layer,
wherein the back layer is made of a second fabric,
wherein the back layer has a slot extending along a long dimension of the back layer from a bottom end to a top end wherein a zipper is disposed in the slot, wherein the zipper is capable of closing to seal the slot,
wherein the front layer and the back layer are connected along peripheral longitudinal edges and form a substantially flat form,
wherein the front layer and the back layer are configured to accommodate a circumference of a pole of a traffic sign coaxially with the long dimension of the back layer,
wherein peripheral latitudinal edges at the bottom end and the top end of the front layer and back layer are at least partially unconnected,
wherein the front layer and the back layer are substantially co-dimensional when the slot is sealed with the zipper,
wherein the first fabric comprises a first material and a second material, wherein the second material is configured in a rectangular form and is located in a middle of a front face of the first material, and
wherein the second material extends along the long dimension of the first material from a bottom end to a top end.

15. A traffic sign add-on, comprising:
a front layer,
wherein the front layer is made of a first fabric,
wherein the first fabric has one or more reflective sections,
a back layer,
wherein the back layer is made of a second fabric,
wherein the back layer has a slot extending along a long dimension of the back layer from a bottom end to a top end wherein a zipper is disposed in the slot, wherein the zipper is capable of closing to seal the slot,
wherein the front layer and the back layer are connected along peripheral longitudinal edges and form a substantially flat form,
wherein the front layer and the back layer are configured to accommodate a circumference of a pole of a traffic sign coaxially with the long dimension of the back layer,
wherein peripheral latitudinal edges at the bottom end and the top end of the front layer and back layer are at least partially unconnected,
wherein the front layer and the back layer are substantially co-dimensional when the slot is sealed with the zipper, and
wherein the front layer and the back layer are separated by one or more add-on structures which are located perpendicular to the pole of the traffic sign.

16. The traffic sign add-on of claim 15, wherein the one or more add-on structures are cube-shaped and located at a top end and bottom end of the pole of the traffic sign.

17. The traffic sign add-on of claim 15, wherein the front layer and the back layer are connected along the peripheral longitudinal edges and to the one or more add-on structures to form a rectangular shape.

* * * * *